(12) United States Patent
Dabney et al.

(10) Patent No.: US 7,921,052 B2
(45) Date of Patent: Apr. 5, 2011

(54) EFFICIENT ONLINE AUCTION STYLE LISTINGS THAT ENCOURAGE OUT-OF-CHANNEL NEGOTIATION

(75) Inventors: Esther Dabney, Atlanta, GA (US); Greg Easterly, Atlanta, GA (US); Brad Mohs, Dunwoody, GA (US); Michael Mullis, Atlanta, GA (US); Mike Winn, Atlanta, GA (US)

(73) Assignee: Autotrader.com, Inc., Atlanta, GA (US)

( * ) Notice: Subject to any disclaimer, the term of this patent is extended or adjusted under 35 U.S.C. 154(b) by 1506 days.

(21) Appl. No.: 10/659,746

(22) Filed: Sep. 11, 2003

(65) Prior Publication Data

US 2004/0128224 A1 Jul. 1, 2004

Related U.S. Application Data

(60) Provisional application No. 60/437,153, filed on Dec. 31, 2002.

(51) Int. Cl.
*G06Q 40/00* (2006.01)
(52) U.S. Cl. .......................................... 705/37; 705/35
(58) Field of Classification Search ................ 705/37
See application file for complete search history.

(56) References Cited

U.S. PATENT DOCUMENTS

| | | | |
|---|---|---|---|
| 4,799,156 A | 1/1989 | Shavit et al. |
| 5,408,283 A | 4/1995 | Lee |
| 5,699,526 A | 12/1997 | Siefert |
| 5,721,906 A | 2/1998 | Siefert |
| 5,727,129 A | 3/1998 | Barrett et al. |
| 5,778,367 A | 7/1998 | Wesinger |
| 5,803,500 A | 9/1998 | Mossberg |
| 5,818,914 A | 10/1998 | Fujisaki |
| 5,835,896 A | 11/1998 | Fisher |
| 5,842,178 A | 11/1998 | Giovannoli |
| 5,845,265 A | 12/1998 | Woolston |
| 5,890,138 A | 3/1999 | Godin |
| 5,905,974 A | 5/1999 | Fraser et al. |
| 5,951,643 A | 9/1999 | Shelton et al. |
| 5,954,798 A | 9/1999 | Shelton et al. |
| 5,987,440 A | 11/1999 | O'Neil |
| 6,012,045 A | 1/2000 | Barzilai |
| 6,021,398 A | 2/2000 | Ausubel |

(Continued)

FOREIGN PATENT DOCUMENTS

WO WO0034899 6/2000

(Continued)

OTHER PUBLICATIONS

Yahoo Auctions (Dec. 2002).*

(Continued)

*Primary Examiner* — Thomas Dixon
*Assistant Examiner* — William Rankins
(74) *Attorney, Agent, or Firm* — Nixon & Vanderhye P.C.

(57) ABSTRACT

Online auction-style listing and transaction system provides new features including for example allowing sellers to issue offers to sell before auction-style listing completion to encourage direct negotiation between seller and buyer for an out-of channel transaction; postponing auction-style end upon receipt of a last-minute bid to prevent sniping; allowing sellers to contact buyers registering adverse ratings before the ratings are published; allowing sellers to terminate listings before end of auction-style listing and/or to move the listing to a classified ad from an auction-style listing; and other features.

18 Claims, 52 Drawing Sheets

U.S. PATENT DOCUMENTS

| | | | |
|---|---|---|---|
| 6,023,686 A | 2/2000 | Brown | |
| 6,026,403 A | 2/2000 | Siefert | |
| 6,044,363 A | 3/2000 | Mori | |
| 6,055,518 A | 4/2000 | Franklin | |
| 6,058,379 A | 5/2000 | Odom | |
| 6,058,417 A | 5/2000 | Hess | |
| 6,085,169 A | 7/2000 | Walker | |
| 6,085,176 A | 7/2000 | Woolston | |
| 6,085,179 A | 7/2000 | Halm | |
| 6,108,639 A | 8/2000 | Walker | |
| 6,151,589 A | 11/2000 | Aggarwall | |
| 6,151,601 A | 11/2000 | Papierniak et al. | |
| 6,167,386 A | 12/2000 | Brown | |
| 6,202,051 B1 | 3/2001 | Woolston | |
| 6,216,114 B1* | 4/2001 | Alaia et al. | 705/37 |
| 6,223,167 B1 | 4/2001 | Alaia | |
| 6,243,691 B1 | 6/2001 | Fisher et al. | |
| 6,249,772 B1 | 6/2001 | Walker | |
| 6,266,652 B1 | 7/2001 | Godin | |
| 6,269,343 B1 | 7/2001 | Pallakoff | |
| 6,285,989 B1 | 9/2001 | Shoham | |
| 6,324,538 B1 | 11/2001 | Wesinger, Jr. | |
| 6,332,129 B1 | 12/2001 | Walker | |
| 6,356,878 B1 | 3/2002 | Walker | |
| 6,366,891 B1 | 4/2002 | Feinberg | |
| 6,381,594 B1 | 4/2002 | Eichstaedt et al. | |
| 6,408,283 B1 | 6/2002 | Alaia | |
| 6,415,264 B1 | 7/2002 | Walker et al. | |
| 6,415,269 B1 | 7/2002 | Dinwoodie | |
| 6,415,270 B1 | 7/2002 | Rackson | |
| 6,415,320 B1 | 7/2002 | Hess | |
| 6,480,855 B1 | 11/2002 | Siefert | |
| 6,489,980 B1 | 12/2002 | Scott et al. | |
| 6,502,096 B1 | 12/2002 | Siefert | |
| 6,519,600 B1 | 2/2003 | Siefert | |
| 6,546,425 B1 | 4/2003 | Hanson et al. | |
| 6,850,940 B2 | 2/2005 | Wesinger | |
| 6,865,575 B1 | 3/2005 | Smith et al. | |
| 6,934,634 B1 | 8/2005 | Ge | |
| 7,028,002 B2 | 4/2006 | Wakabayashi et al. | |
| 7,130,815 B1* | 10/2006 | Gupta | 705/26 |
| 7,461,022 B1* | 12/2008 | Churchill et al. | 705/37 |
| 2001/0027433 A1* | 10/2001 | Fujiwara et al. | 705/37 |
| 2001/0034694 A1* | 10/2001 | Elias | 705/37 |
| 2001/0037281 A1 | 11/2001 | French et al. | |
| 2002/0042769 A1* | 4/2002 | Gujral et al. | 705/37 |
| 2002/0065707 A1 | 5/2002 | Lancaster et al. | |
| 2002/0065763 A1* | 5/2002 | Taylor et al. | 705/37 |
| 2002/0073158 A1* | 6/2002 | Dalal et al. | 709/206 |
| 2002/0103740 A1* | 8/2002 | Maroney | 705/37 |
| 2002/0116287 A1* | 8/2002 | Schubert et al. | 705/26 |
| 2002/0147663 A1* | 10/2002 | Walker et al. | 705/26 |
| 2002/0161691 A1* | 10/2002 | Nishi | 705/37 |
| 2002/0185551 A1* | 12/2002 | Lieber | 239/346 |
| 2002/0188551 A1* | 12/2002 | Grove et al. | 705/37 |
| 2003/0055744 A1* | 3/2003 | Walker et al. | 705/26 |
| 2003/0110047 A1* | 6/2003 | Santosuosso | 705/1 |
| 2003/0135425 A1* | 7/2003 | Leavitt | 705/26 |
| 2003/0216959 A1* | 11/2003 | Vitti | 705/14 |
| 2004/0059596 A1* | 3/2004 | Vaidyanathan et al. | 705/1 |
| 2004/0199496 A1 | 10/2004 | Liu et al. | |
| 2004/0236690 A1* | 11/2004 | Bogosian et al. | 705/42 |
| 2005/0021444 A1 | 1/2005 | Bauer et al. | |
| 2005/0234804 A1* | 10/2005 | Fang et al. | 705/37 |
| 2005/0289043 A1* | 12/2005 | Maudlin | 705/37 |
| 2006/0026071 A1 | 2/2006 | Radwin | |
| 2006/0122812 A1 | 6/2006 | Tinseth | |
| 2006/0195428 A1 | 8/2006 | Peckover | |
| 2007/0073758 A1 | 3/2007 | Perry et al. | |
| 2008/0126243 A1* | 5/2008 | Alsberg et al. | 705/37 |

FOREIGN PATENT DOCUMENTS

| | | |
|---|---|---|
| WO | WO0078557 | 12/2000 |
| WO | WO0133447 | 5/2001 |
| WO | WO0133448 | 5/2001 |
| WO | WO0133449 | 5/2001 |
| WO | WO0141013 | 6/2001 |
| WO | WO0145001 | 6/2001 |
| WO | WO0145002 | 6/2001 |
| WO | WO0150221 | 7/2001 |
| WO | WO0155936 | 8/2001 |
| WO | WO0161601 | 8/2001 |
| WO | WO0165338 | 9/2001 |
| WO | WO0171452 | 9/2001 |
| WO | WO0182107 | 11/2001 |
| WO | WO0182115 | 11/2001 |
| WO | WO0186566 | 11/2001 |
| WO | WO0195297 | 12/2001 |
| WO | WO0207058 | 1/2002 |
| WO | WO0225401 | 3/2002 |
| WO | WO0233618 | 4/2002 |
| WO | WO0235427 | 5/2002 |
| WO | WO0244860 | 6/2002 |

OTHER PUBLICATIONS

Auto Trader (Dec. 19, 2002).*
AutoTrader.com http://ads.autotrader.com/auctionstyle/demo.html.*
Yahoo! Auctions Tour http://auctions.yahoo.com/phtml/auc/us/tour/2-2-list.html.*
Yahoo Auctions Tour, http://auctions.yahoo.com, (copyright 2002).
ebay Help: Community Standards :Policies and conduct, Real Estate Rules, Transaction Interference, Non-Binding Bid Policy, http://pages.ebay.com/help (copyright 1995-2003).
Auction-Style Listings powered by AutoTrader.com, Coming in 2003!, http://ads.autotrader.com/auctionstyle/demo.html.
eBay annual report filed Mar. 31, 2003.
"AutoTrader.com Launches 'Find Your Dealer' Feature," press release, 1 page (May 17, 2006).
Advanced Froogle Search—Ford Dealers, 5 pages (Sep. 24, 2006).
Google Search—22203 Ford Dealers, 2 pages (Sep. 23, 2006).
Yahoo Search—Ford Roswell, 3 pages (Sep. 22, 2006).
Google Search—Ford Roswell, 2 pages (Sep. 22, 2006).
Jeff D. Opdyke, "How You Can Haggle for That Ride . . . ," Book Excerpt, The Wall Street Journal Online, 3 pages (Apr. 16, 2006).
"Break down," The Economist, 2 pages (May 20, 1999).
Riva Richmond, "Click Here for Neighborhood Guide, Google, Yahoo Tweak Their 'Local Services' in a Bid to Attract Consumers," The Wall Street Journal Online, 3 pages (Apr. 27, 2006).
Office Action dated Dec. 24, 2009 in related U.S. Appl. No. 11/565,147.
Office Action dated Jun. 18, 2010 in related U.S. Appl. No. 11/565,147.

* cited by examiner

Example overall System Architecture

Example Overall System Flowchart

Example Registration Email Loop Verification

Example: Submit a Bid

Fig. 2

Beautiful 2000 Passat – Like New Condition!

2000 Volkswagen Passat GLS

View larger photo

| Mileage | 1400 |
|---|---|
| Exterior Color | Silver |
| Interior Color | Black |
| Body Style | Sedan |
| Doors | Four Door |
| Engine | 4 Cylinder Gasoline |
| Transmission | Automatic |
| Stereo | AM/FM Compact Disc Playr |
| Fuel Type | Gasoline |
| Drive Type | 2 wheel drive |
| Stock Number | |
| VIN | WVWMA23B1YE087977 |

Email this page to a friend
Print this page
Watch this item

| Vehicle History | Get a Vehicle History Report for this Volkswagen |
|---|---|
| Warranty | Free Warranty Quote for this Volkswagen |
| Loans | Get a loan for this Volkswagen<br><br>Financing at AnyTown Motors |
| Insurance Quotes | Get a free quote for this Volkswagen<br><br>Get an instant quote from Allstate |
| Parts & Accessories | Find Accessories |
| Inspections | Inspect Before you buy |

| Current Bid: | Minimum Bid: | Purchase Now: |
|---|---|---|
| $1500 | $1550 | $17500 |

Your Maximum Bid: U.S. $ [    ]  ( Place Bid )
or Purchase Now

Reserve price has not yet been met.

- Bids on this listing are conditional; the winning bid is binding subject to a satisfactory inspection by the winning bidder.
- Seller may end this Listing at any time.
- How does bidding work?

| Time Left: | 5 days, 23 hours+ |
|---|---|
| Start: | Nov-15 @ 12:58 EST |
| End: | Nov-21 @ 12:58 EST |
| Seller User Name: | Sales |
| Seller Rating: | View Seller's Ratings |
| High Bidder: | None |
| Number of Bids: | 0 view bid history |

AnyTown Motors

| Contact Name: | Contact Phone: | Contact Location: |
|---|---|---|
| Joe Salesperson | Get Phone Number | Atlanta, GA 30342 |

View Seller's Other Auction-Style Listings

Send Email to Seller

Your First Name: [          ]
Your Last Name: [          ]
Email Address: [          ]
Comments: (max 250 characters)
[          ]

At times, AutoTrader.com will offer information, special promotions, and discounts. Would you like to receive information on these specials?

◉ Yes  ○ No      ( Send Email )

From Fig 7C

Click "Browse" in the photo slot below to locate and upload photos. When you are finished, click "next." You can find detailed instructions and guidance on preparing and uploading image files here.

Main Photo

Photo To Appear Here
Suggested max. file size: 100KB
Suggested Image dimensions: 640x480 Pixels
File format: JPEG or GIF only

[ Browse... ]

COMMENTS

Enter additional comments about the vehicle in the field below.
To launch the Comment Builder, click here! (Max. 1,500 characters — about 300 words)

[ next ]

Fig. 7C-1

Welcome Auction-Style Demo Dealer dealers.autotrader.com

You are logged in as demo.    Logout home
tools
contact us

Print Car Info | Print Inventory | Online

Ad Manager - Preview Photo & Used Car Info

Ad Manager
View Inventory
Search Inventory
Add Inventory
Add Photos
Edit Dealer Info
Product Manager
Activity Report
Specials AutoTrader
AUCTION-STYLE

| YEAR | MAKE/MODEL | STOCK NO | VIN |
|---|---|---|---|
| 1999 | Jeep Wrangler SE 4x4 | | 1J4FY29P5XP400436 |

Car Info | Preview

More About T

Review this listing and click on the above tabs to make changes.

Auction-Style Demo Dealer
5775 Peachtree Dunwoody Rd

Atlanta, GA 30342
Contact:   Joe Salesperson

Price

Mileage

Exterior Color

Color Description

Interior Color

Body Style

Doors

Drive Train

Engine                                                                 4 Cyl

Fuel Used

Trans.

Stereo

Stock No.

Comments
4" Teraflex suspension lift 33" BFG Mud Terrain Tires 2 Hella 500 2 Hella Black Magics 2 10 inch subwoofers K&N Filter Bestop Sail Cloth Top(Highly Recommended)

We sell more Fords than any dealer on the east coast because of tremendous volume discounts.

Installed Options

VIN                                                                 1J4FY2

Have consumers bid on
Click here to create an Auctionau

Click here to save as classifi sa

Fig. 7D

Welcome Auction-Style Demo Dealer dealers.autotrader.com tools

You are logged in as demo.   Logout

| | Auction-Style Inventory | Print Inventory | Online User's Guide | home
tools
contact us

Ad Manager - Edit Auction-Style Listing Details

Got ideas - Click here to tell us!

Ad Manager
View Inventory
Search Inventory
Add Inventory
Add Photos
Edit Dealer Info

| YEAR | MAKE/MODEL | STOCK NO. | VIN |
|------|------------|-----------|-----|
| 1999 | Jeep Wrangler SE 4x4 | | 1J4FY29P5XP400436 |

Car Info | Auction-Style Info | Photos | Templates | Preview

Product Manager
Activity Report
Specials

More About This Page

Enter your Starting Bid, Reserve Price, Duration and other important information below. Make sure that the Terms of Sale Information (at the bottom of the page) is appropriate for this Listing. If not, click here.

AutoTrader

\* = *Required information*

LISTING CONTENT FOR THIS VEHICLE

Headline\* [good jeep]

*Please note:* Include vehicle highlights here, such as *low reserve, low miles, great condition.* Don't put Make, Model, and Year here because they are automatically included in the headline. Don't use HTML tags, asterisks, or quotes because they will interfere with vehicle searches.

*New!* Use our Headline Builder to add frequently-used headlines to this listing.

Type of Title  ⊙ Clear  ○ Salvage  ○ Other   If other, specify in Vehicle Description.

Currently Under Warranty  ⊙ No  ○ Yes  If yes, specify in Vehicle Description.

Listing Duration\* [6 days ▼]

Listing Start Time  Please select when you would like to start the Auction-Style Listing.
⊙ Start my Listing now
○ Start my Listing on this date
[Monday, Jul 21 2003 ▼]

Please select the time of day you would like to start the Auction-Style Listing.
[11 ▼] : [00 ▼] [AM ▼] Eastern Time

*Please note:* Listings may appear shortly before they are scheduled to begin.

From Fig 7E

PRICING FOR THIS VEHICLE

Use whole numbers, do not include commas or currency symbol such as $. *Example: 10000*

Starting Bid* $ `10000`
Tips

Reserve Price $ `_____`
Tips  *Warning:* Vehicle may sell for "Starting Bid" if reserve price is not set.

Purchase Now Price $ `_____`
Tips
*Warning:* Purchase Now is recommended ONLY for very rare cars or vehicles priced near wholesale. Setting Purchase Now too high will reduce lead activity.

LISTING PREFERENCES PREVIEW

Conditional Bids or Final and Binding — Conditional

Payment — Money Order/Cashiers Check, COD (cash on delivery), See Description

Shipping — Will ship.

Terms of Sale — Vehicles are pre-owned and are sold in "As Is" condition. However, some vehicles may still be covered under factory warranty or an extended warranty may be purchased. Ask for details! In-State buyers must also pay sales tax and registration fees. Out-of-State buyers may register and pay applicable taxes in their home state. Successful high bidder must contact us within 48 hours of the end of the listing and submit a 10% deposit within 3 days. Seller reserves the right to end the listing early without any liability to the seller. All bidders must have pre-approved loans/financing or must be able to pay cash for the vehicle. Financing must be secured prior to bidding. Payment must be made by certified check or funds transfer. Buyer is responsible for all shipping costs. Vehicles are pre-owned and are sold in "As Is" condition. However, some vehicles may still be covered under factory warranty or an extended warranty may be purchased. Ask for details. In-State buyers must also pay sales tax and registration fees. Out-of-State buyers may register and pay applicable taxes in their home state. Successful high bidder must contact us within 48 hours of the end of the listing and submit a 10% deposit within 3 days. Seller reserves the right to end the listing early without any liability to the seller. All bidders must have pre-approved loans/financing or must be able to pay cash for the vehicle. Financing must be secured prior to bidding. Payment must be made by certified check or funds transfer. Buyer is responsible for all shipping costs. Vehicles are pre-owned and are sold in "As Is" condition. However, some vehicles may still be covered under factory warranty or an extended warranty may be purchased. Ask for details. In-State buyers must also pay sales tax and registration fees. Out-of-State buyers may register and pay applicable taxes in their home state. Successful high bidder must contact us within 48 hours of the end of the listing and submit a 10% deposit within 3 days. Seller reserves the right to end the listing early without any liability to the seller. All bidders must have pre-approved loans/financing or must be able to pay cash for the vehicle. Financing must be secured prior to bidding. Payment must be made by certified check or funds transfer. Buyer is responsible for all shipping costs.

If this information is not correct, please Edit Your Auction-Style Preferences.

(save changes)  or  (next)

Fig. 7E-1

Welcome Auction-Style Demo Dealer dealers.autotrader.com

You are logged in as demo. Logout tools home
tools
contact us

Edit Auction-Style Preferences

Online User's Guide

Got ideas - Click here to tell us!

Ad Manager
View Inventory
Search Inventory
Add Inventory
Add Photos
Edit Dealer Info Product Manager
Activity Report
Specials AutoTrader.com
AUCTION-STYLE LISTINGS

| Dealer Info | Auction-Style Preferences | Billing Summary |

More About This Page

Create your Listing preferences and settings that tell bidders your terms and conditions of business.

AUCTION-STYLE LISTING CONTACT INFO

To change your Auction-Style Listing contact information, please call (888) 337-3370.

Contact Name   Jason E. Kean
Contact Title   Sales Guy
Contact Phone   4044444444
Contact Email   demodealer@autotrader.com

PAYMENT POLICY

Choose all you will accept
Enter more specific payment information in Terms of Sale below.

☑ Money Order/Cashiers Check  ☑ COD (cash on delivery)  ☑ See Terms Of Sale
☐ Personal Check                ☐ Discover                ☐ Other
☐ Visa / Master Card            ☐ American Express

Terms of Sale
What should I include?
Use Default Terms

Vehicles are pre-owned and are sold in "As Is" condition. However, some vehicles may still be covered under factory warranty or an extended warranty may be purchased. Ask for details!

In-State buyers must also pay sales tax and registration

SHIPPING POLICY

Will you ship cars?
◉ Yes, I will ship.
○ No, I will not ship.
○ See Terms Of Sale.

Who Pays for Shipping?
○ Seller pays shipping                ○ Buyer pays fixed amount
◉ Buyer pays actual shipping cost    ○ See item description

BID TYPES

Will you accept Conditional or Final and Binding bids?
◉ Will accept Conditional bids.
○ Will accept Final and Binding bids.

↑ From Fig 7F

HEADLINE BUILDER

If you want to use the Headline Builder to help create Listings, enter your custom headlines here. What's the Headline Builder?

- Headline 1: This car is beautiful!
- Headline 2: Like New!
- Headline 3: Showroom Condition!
- Headline 4: LOW MILES!!!!
- Headline 5: Don't miss this LOW LOW RESERVE!
- Headline 6: I am testing the headline field to make sure that the character
- Headline 7: A SWEET RIDE!!!
- Headline 8: CHECK OUT THIS DEAL!
- Headline 9: THIS ONE MUST GO!!!
- Headline 10: Call for Special Auction Cash Price

DESCRIPTION BUILDER

If you want to use the Description Builder to help create Listings, enter your custom descriptions here. What's the Description Builder?

- Description 1: All original miles
- Description 2: Never been in an accident
- Description 3: One owner, non smoking vehicle
- Description 4: New paint
- Description 5: Well Below Kelly Blue Book
- Description 6: Priced at Wholesale
- Description 7: Call and Make Offer
- Description 8:
- Description 9:
- Description 10:

DISCLAIMER

Enter your standard disclaimer. What can my Disclaimer include?

Disclaimer: Please expect normal wear and tear for used vehicles.
*500 character limit.*

WHY BUY FROM ME

Let shoppers know why they should do business with you. See an example.

Why Buy From Me: Our dealership has been in business for 40 years! There is no better customer service in the state! We sell more Fords than any other dealer on the east coast. Take advantage of our tremendous volume discount!
*500 character limit.*

[save changes]

AutoTrader.com - Ad Manager - Preview Auction-Style Listing - Microsoft Internet Explorer good jeep

1999 Jeep Wrangler SE 4x4

| Current Bid: | Next Minimum Bid: | Purchase Now: |
|---|---|---|
| None | $10000 | N/A |

Your Maximum Bid: U.S. $ [                ]   (Confirm Bid)

No Reserve price

- Bids on this Listing are Conditional; the winning bid is binding subject to a satisfactory inspection by the winning bidder. View Example
- Seller may end this Listing at any time.
- How does Bidding work? View Example

| | |
|---|---|
| Time Left: | 5 days, 23 hours+ |
| Start: | Jul-18-2003, 19:59 EDT |
| End: | Jul-24-2003, 19:59 EDT |
| Seller User Name: | demo1 |
| Seller Rating: | View Seller's Ratings |
| High Bidder: | None |
| Number of Bids: | 0 |
| Listing ID: | 00000 |

View larger photo

| Mileage | 80000 |
|---|---|
| Exterior Color | Dark Green |
| Interior Color | Black |
| Body Style | Sport Utility |
| Doors | Two Door |
| Engine | 4 Cylinder Gasoline |
| Transmission | Unavailable |
| Stereo | Unavailable |
| Fuel Type | Gasoline |
| Drive Type | 4 wheel drive |
| Stock Number | |
| VIN | 1J4FY29P5XP400436 |

☐ Email this page to a friend
☐ Print this page

| Vehicle History | Get a Vehicle History Report for this Jeep |
|---|---|

Seller Info
Auction-Style Demo Dealer

| Contact Name: | Contact Phone: | Contact Location: |
|---|---|---|
| Jason E. Kean | Get Phone Number | Atlanta, GA 30342 |

View Seller's Other Auction-Style Listings

Email Seller

Your First Name: [            ]
Your Last Name: [            ]
Your Phone Number: [            ]
Your Email Address: [            ]

From Fig 7I

Title:
Clear

Current Warranty:
No

Why Buy From Me?
Our dealership has been in business for 40 years! There is no better customer service in the state! We sell more Fords than any other dealer on the east coast. Take advantage of our tremendous volume discount!

Terms of Sale
Vehicles are pre-owned and are sold in "As Is" condition. However, some vehicles may still be covered under factory warranty or an extended warranty may be purchased. Ask for details! In-State buyers must also pay sales tax and registration fees. Out-of-State buyers may register and pay applicable taxes in their home state. Successful high bidder must contact us within 48 hours of the end of the listing and submit a 10% deposit within 3 days. Seller reserves the right to end the listing early without any liability to the seller. All bidders must have pre-approved loans/financing or must be able to pay cash for the vehicle. Financing must be secured prior to bidding. Payment must be made by certified check or funds transfer. Buyer is responsible for all shipping costs. Vehicles are pre-owned and are sold in "As Is" condition. However, some vehicles may still be covered under factory warranty or an extended warranty may be purchased. Ask for details. In-State buyers must also pay sales tax and registration fees. Out-of-State buyers may register and pay applicable taxes in their home state. Successful high bidder must contact us within 48 hours of the end of the listing and submit a 10% deposit within 3 days. Seller reserves the right to end the listing early without any liability to the seller. All bidders must have pre-approved loans/financing or must be able to pay cash for the vehicle. Financing must be secured prior to bidding. Payment must be made by certified check or funds transfer. Buyer is responsible for all shipping costs. Vehicles are pre-owned and are sold in "As Is" condition. However, some vehicles may still be covered under factory warranty or an extended warranty may be purchased. Ask for details. In-State buyers must also pay sales tax and registration fees. Out-of-State buyers may register and pay applicable taxes in their home state. Successful high bidder must contact us within 48 hours of the end of the listing and submit a 10% deposit within 3 days. Seller reserves the right to end the listing early without any liability to the seller. All bidders must have pre-approved loans/financing or must be able to pay cash for the vehicle. Financing must be secured prior to bidding. Payment must be made by certified check or funds transfer. Buyer is responsible for all shipping costs.

Payment Options:
Money Order/Cashiers Check, COD (cash on delivery), See Description

Shipping:
Will ship.
Buyer pays actual shipping cost.

Disclaimer:
Please expect normal wear and tear for used vehicles.

1999 Jeep Wrangler SE 4x4

Auction-Style Demo Dealer — 5775 Peachtree Dunwoody Rd, Atlanta, GA 30342 — 404-444-4444 — demodealer@autotrader.com

Example "closeness" testing

From: AutoTrader.com [mail to:auctionuser@autotrader.com]
Sent: Thursday, December 19, 2002 10:10 AM
To: <mike.winn@autotrader.com
Subject: Bidding is approaching Reserve Price for Listing ID: 13656

The current high bidder for this vehicle is willing to make a maximum bid that is close to your reserve price.

Listing ID:     13656
Description:    1999 Buick Regal
Headline:       This is a test In these circumstances, sellers and high bidders often find it useful to make contact and negotiate a mutually agreeable price.
It is not necessary to wait until the listing expires.

*   If you wish to contact the high bidder, click the "Reply" button on your email browser. You can also send an
    email to the high bidder through the selling tool's Bid History area
*   If you agree a price with the high bidder, you may use the Offer to Sell feature to issue them an offer at
    that price. If they accept this, the listing will end at that price.
*   You are under no obligation to contact the high bidder; you may do nothing and simply let the sale proceed.

The high bid shown on the listing is the current high PROXY bid. This has o connection to the MAXIMUM bid the high bidder
entered when placing their bid. This closeness notification is based upon the maximum bid, not the current proxy bid.

Please note that Reserve prices and maximum bids remain secret and are never revealed during an Auction-Style Listing.

Review this listing at:
http://www.autotrader.com/as/fyc/vdp.jsp?car_id-70621444&auction_id=13656

Sincerely,
AutoTrader.com

If you have a question related to Auction-Style Listings that isn't answered in our Help area at:
http://www.autotrader.com/help/index.jtmpl, then please contact our customer service team at 1-(800) 353-9350 8am-8pm EST.

Fig. 12A

```
From: "AutoTrader.com" <auctionuser@autotrader.com>
To: <mike.winn@mindspring.com>
Sent: Thursday, December 19, 2002 10:10 AM
Subject: High bid is close to Reserve Price for Listing ID: 13656

>
>The current high bid for this vehicle is close to the Listing's Reserve Price.
>
>Listing ID:        13656
>Description:       1999 Buick Regal
>Headline:          This is a test
>
>When this happens, sellers and high bidders often find it useful to make
contact and negotiate a mutually agreeable price.
>It is not necessary to wait until the listing expires.
>
>*  If you wish to make contact with your transaction partner, click the
"Reply" button on your email browser. You can
>   also send an email to them from the Auction-Style Listing or the Bid
History page.
>*  If you agree a price with your transaction partner, the Offer to Sell
feature offers a way for you to formalize
>   your agreement.
>*  You are under no obligation to contact your transaction partner.
>
>The high bid shown on the listing is the current high PROXY bid. This has no
connection to the MAXIMUM bid upon which this
>closeness notification is based.
>
>Please note that the Reserve Price and Maximum Bid remain secret and are
never revealed.
>
>An identical copy of this email has been sent to your transaction partner.
>
>Review this listing at:
>http://www.autotrader.com/as/fyc/vdp.jsp?
car_id=70621444&auction_id=13656
>
>Sincerely,
>AutoTrader.com
>
>If you have a question that isn't answered in our Rules of the Road at:
   http://www.autotrader.com/as/rules.jsp
>and FAQ at:
>http://www.autotrader.com/help/faq.jtmpl
>then please contact our customer service team at:
>http://www.autotrader.com/help/email.jtmpl?
contact_email=aslcustsupport@autotrader.com.
>
>Your security is our priority. If at any time you suspect misrepresentation or
fraud, please advise our Security Department immediately at:
>http://www.autotrader.com/help/email.jtmpl?
contact_email=aslsecruity@autotrader.com.
<
<If any link does not work, please copy it into your browser's address window
to see the page.
>
```

Fig. 12B

Welcome AutoTrader.com Demo Dealer dealers.autotrader.com tools

You are logged in as demo.   Logout

- home
- contact us

Auction-Style Inventory | Print Inventory | Online User's Guide

Ad Manager - Offer to Sell

- Ad Manager
  - View Inventory
  - Search Inventory
  - Add Inventory
  - Add Photos
  - Edit Dealer Info
- Product Manager
- Activity Report
- Specials

New at AutoTrader.com

1997 BMW Z3

Please click here to view this listing in a new window.

| Listing ID | Reserve Price | Current Bid | Start Date | Close Date | Time Remaining |
|---|---|---|---|---|---|
| 13657 | $25000 | $25000 | 12/17/2002 | 12/20/2002 | 1 d, 8 h, 51 min |

Bid History | Offer To Sell | Offer History | Email Bidder | Rating

More About This Page

To: smedley ▼

Offer Price: [ ]   Use whole numbers, do not include commas or currency symbol such as $.
Example: 10000

Message: [                    ]

If accepted by the addressee, this Offer to Sell obligates you to sell the car to this buyer at the price stated. Do not click "send" unless you want to create this obligation, since it cannot be undone after acceptance.   [ send ]

Fig. 13A

*"If it rolls, floats or flies... nadaguides
We Value It!"*

AutoTrader.com®
Your car is waiting.

Sign Out | My AutoTrader.com | About | Help

| Research & Compare | Find Your Car | Sell Your Car | New Cars | Finance & Insurance | Parts & Accessories | Collector Cars |

Home > Cars I'm Selling > Offer to Sell

Cars I'm Selling \ Offer to Sell \

(?) More About This Page

Confirm Your Offer to Sell

Car year, make, model: 1997 Chevrolet S-10 2WD
Listing ID: TRUUC28NOY101072
Time Left: 1 day + 17 hrs/45 min
Listing End Date: November 6, 2002
Bidder's User Name: Talking_HeadsXXXXX20
Offer Price: US$ 35999

This Listing is conditional
This offer is subject to a satisfactory
Inspection by the winning bidder.

Subject: 1997 Chevrolet S-10 2WD - Item #TRUUC28

Comments: **$35999 is a great deal! I'll even throw in floor matts
and the car will be detailed before it is in your hands.**

- This offer, once accepted, creates obligations you cannot cancel.
- Click "Send Offer" only if you are sure you want to sell at this price.
- Your Listing will be suspended for two hours after the offer is issued. Why?
- Only one Offer to Sell can be issued at a time, per car.

[ Send Offer ]
Or, Edit Offer

Home > Cars I'm Selling > Offer to Sell

Parenthood.com — *You Have Kids?*
Helping Families Grow

Find A Dealer | Collector Cars | About | Help | Employment Opportunities | Email Us
By using this service, you accept the terms of our User Agreement.
©2002 AutoTrader.com L.L.C.

Fig. 14

Offer to Sell Confirmation

| | |
|---|---|
| Car year, make, model: | 1997 Chevrolet S-10 2WD |
| Listing ID: | TRUUC2BNOY101072 |
| Time Left: | 1 day + 17 hrs/45 min |
| Listing End Date: | November 6, 2002 |
| Bidder's User Name: | Talking_HeadsXXXXX20 |
| Offer Price: US$ | 35999 |
| | This Listing is *conditional* <br> This offer is subject to a satisfactory inspection by the winning bidder. |
| Your First Name: | Tommy |
| Your Last Name: | Smith |
| Email Address: | Tommysmith@yahoo.com |
| Subject: | 1997 Chevrolet S-10 2WD - Item #TRUUC28 |
| Comments: | $35999 is a great deal! I'll even throw in floor matts and the car will be detailed before it is in your hands. |

Offer Sent to Bidder

[ Back to Cars I'm Selling ]

Fig. 15

```
From: AutoTrader.com [mail to:auctionuser@autotrader.com]
To: <mwinn3@hotmail.com
Sent: Thursday, December 19, 2002 10:28 AM
Subject: Time-Sensitive Offer to Sell on Listing ID: 13657

>
>This is an important, time-sensitive email that contains a formal Offer to Sell. Please give it
>your immediate attention. If you do not respond within two hours, the offer will expire.
>
>Offer to Sell:
>The seller offers to sell you the following vehicle under the terms and conditions stated in the Auction_Style
>Listing, the reference number of which is listed below, along with the agreed upon price.
>
>Listing ID:       13657
>Description:      1997 Ford Mustang
>Headline:         This is a test
>Offer Price:      $28,000.00
>Comments:         It's all yours for the taking
>
This offer to sell will expire at 12/19/2002 12:28:51.
>
>Review the offer In MyAutoTrader.com:
>http://www.autotrader.com/as/mat/login.jsp
>Review this listing at:
>http://www.autotrader.com/as/fyc/vdp.jsp?
>car_if=70621411&auction_id=13657
>
>What's the purpose of this email?
>This email contains a formal Offer to Sell. This set out the terms and conditions under which the Seller
>is prepared to sell you the car.
>
>What do I need to do?
>Read the email carefully, and decide if you want to buy the car at the offer price and under the terms and
>conditions stated in the seller's Auction-Style Listing.
>
>How long do I have to act?
>You have two hours from the time we send this email to consider and respond to this offer. If you do not
>respond within the time allowed, the offer will expire.
>
>What happens to the sale during this time?
>The sale is suspended and bidding is halted for tow hours while you consider and respond to this offer.
>
>The listing this email refers to have expired. Is this offer still valid?
>Yes. Offers to Sell are routinely issued on expired listings.
>
>I want to buy this car but cannot agree to all the terms of this offer. What now? Contact the seller
>immediately and ask whether they can issue an offer that will be acceptable to you (to email the seller,
>click the "Reply" button on your email browser). The seller will not be able to issue another
>offer to you unless you have declined this offer or it expires. Remember that most deals are agreed after
>some "give and take" on both sides.
>
>Sincerely,
>AutoTrader.com
>If you have a question that isn't answered in our Rules of the Road at:
>http://www.autotrader.com/as/rules.jsp
>and FAQ at:
>http://www.autotrader.com/help/faq.jtmpl
>then please contact our customer service team at:
>http://www.autotrader.com/help/email.jtmpl?
contact_email=aslcustsupport@autotrader.com.
>
```

Fig. 16

From: AutoTrader.com [mail to:auctionuser@autotrader.com]
Sent: Thursday, December 19, 2002 10:39 AM
To: <mike.winn@autotrader.com
Subject: Your Seller Offer has been declined on Listing ID: 13657

Your formal Offer to Sell has been declined and your listing has now resumed.

Listing ID:      13657
Description:     1997 BMW Z3
Headline:        This is a test
Offer Price:     $28000.0

Review this listing at:
http://www.autotrader.com/as/fyc/vdp.jsp?car_id=70621411&auction_id=13657

Sincerely,
AutoTrader.com

If you have a question related to Auction-Style Listings that isn't answered in our Help area at:
http://www.autotrader.com/help/index.jtmpl, then please contact our customer service team at 1-(888) 337-3370 8am-7pm EST.

For other inquiries, please call 1-(800) 353-9350 8am-8pm EST.

Your business security is our priority. If at any time you suspect misrepresentation or fraud,
please advise our Security Department immediately at:
http://www.autotrader.com/help/email.jtmpl?contact_email=aslsecurity@autotrader.com

Fig. 17

Welcome AutoTrader.com Demo Dealer dealers.autotrader.com — tools

You are logged in as demo. Logout

- home
- contact us
- Ad Manager
  - View Inventory
  - Search Inventory
  - Add Inventory
  - Add Photos
  - Edit Dealer Info
- Product Manager
- Activity Report
- Specials New at AutoTrader.com Auction-Style Inventory | Print Inventory | Online User's Guide

View Inventory - End Listing

| YEAR | MAKE / MODEL | STOCK No. | VIN |
|---|---|---|---|
| 1997 | BMW Z3 | B2073B | 4USCH7324VLB82994 |

End Listing

More About This Page

End Listing: Please select a reason for ending this Listing.
- ○ Cannot be sold due to defect/damage.
- ○ Listing error.
- ○ Moving car to Classified Ads.
- ○ Sold the car to a walk-in customer.
- ○ Sold the car to an Auction-Style lead.
- ○ Sold the car wholesale.

Cancel All Bids: Please select whether or not you wish to cancel your bids? Should I cancel all bids?
- ○ Yes, cancel all bids.
- ⦿ No, don't cancel bids.

Move to Classified: Would you like to move this car to Classifieds?
- ○ Yes.
- ⦿ No.

[submit]

RATE A SELLER

Fig. 20

.....Original Message....
From: AutoTrader.com [mail to:auctionuser@autotrader.com]
Sent: Thursday, December 19, 2002 12:04 PM
To: <mike.winn@autotrader.com
Subject: You've been rated on Listing ID: 3787

The high bidder for this car has submitted Seller Rating in respect to this transaction.

Listing ID:      3787
Description:     1997 Ford Mustang
Headline:        Great family car!

If you agree with this rating, you can immediately post it by clicking "Accept" on the review
page. This will make it view able by all users If you disagree with this rating, we suggest that you contact the winning bidder to resolve any outstanding issues.
You can then ask them to revise their rating.

Please note that you have seven days from the time this email was sent to you in which to resolve any
remaining matters and to request any revisions to the rating. After seven days, the rating becomes publicly view able on AutoTrader.com.

Since all users are able to see you rating, you should review them carefully. They may influence a user's decision about
whether to do business with you in the future.

Please review you seller ratings at:
https://tools.autotrader.com/admin

Review this listing at:
http://wwwautotrader.com/as/fyc/vdp.jsp?car_id71155169&auction_id=3787

Sincerely,
AutoTrader.com

If you have a question related to Auction-Style Listings that isn't answered in our Help area at:
http://www.autotrader.com/help/index.jtmpl.
then please contact our customer service team at 1-(888)337-3370 8am-7pm EST.

For other inquiries, please call 7-(800) 353-9350 8am-8pm EST.

Your business security is our priority. If at any time you suspect misrepresentation or fraud,
please advise our Security Department immediately at:
http://www.autotrader.com/help/email.jtmpl?contact_email=aslsecurity@autotrader.com.

Fig. 22

Welcome AutoTrader.com Demo Dealer dealers.autotrader.com tools

You are logged in as demo.  Logout

- home
- contact us

Ad Manager
- View Inventory
- Search Inventory
- Add Inventory
- Add Photos
- Edit Dealer Info

Product Manager
Activity Report
Specials

New at AutoTrader.com
AUCTION-STYLE LISTINGS

Auction-Style Inventory | Print Inventory | Online User's Guide

Ad Manager - My Ratings

My Ratings

More About This Page

All about Seller Ratings.

OVERALL RATING AVERAGE

Pending Ratings: 2    Posted Ratings: 1                    Average: New

The following ratings were posted in the past seven (7) days.
You have seven (7) days to rectify any negative ratings with the buyer.

PENDING RATINGS

| Rating Left By | Listing ID | Time of Rating | View Details | Average |
|---|---|---|---|---|
| rosenberg | 9481 | 12/16/2002 | View Details | ☆☆☆ |
| smedley | 3787 | 12/19/2002 | View Details | ☆☆☆ |

PUBLISHED RATINGS

| Rating Left By | Listing ID | Time of Rating | View Details | Average |
|---|---|---|---|---|
| lotboy | 13574 | 12/17/2002 | View Details | ☆☆☆ |

Fig. 25

EFFICIENT ONLINE AUCTION STYLE LISTINGS THAT ENCOURAGE OUT-OF-CHANNEL NEGOTIATION

CROSS-REFERENCE TO RELATED APPLICATION

Priority is claimed from provisional application No. 60/437,153 filed Dec. 31, 2002 entitled "Online Method And Apparatus For Auctioning Motor Vehicles And Other Items," incorporated herein by reference.

STATEMENT REGARDING FEDERALLY SPONSORED RESEARCH OR DEVELOPMENT

Not applicable.

FIELD

This technology relates to computer systems and methods for online transactions, and more particularly to electronic transaction systems and methods enhancing opportunities for increased efficiency by encouraging "out of channel" price negotiation and other transactional processes in the context of online auction-style listings. The technology herein also relates to improved techniques for using online transaction and/or database servers to efficiently market various items including but not limited to "big ticket" items such as new and used cars, trucks, motorcycles and boats.

BACKGROUND AND SUMMARY

Online auction-style listings have revolutionized the buying and selling of a wide variety of goods to end purchasers. The World Wide Web now provides efficient online markets for stamps, coins, sports cards, comic books, antique clocks, statuettes, and virtually every other type of collectible imaginable. Even relatively obscure items appealing to only small niches of the population can now be efficiently sold online to the highest bidder.

End users have also been using online auction-style listings to buy and sell other types of goods—for example, discount airline tickets, financial instruments, home electronics, motor vehicles and more. There seems to be a mystique surrounding online auction-style listings that generates buyer excitement and imposes a sense of time pressure. A national or international database of goods can create numerous buying opportunities. These are all ingredients for successful online transactions.

Such online auction-style listing transactions are relatively easy to participate in. The online service provider maintains and operates an online transaction server connected to a database of items for sale. Sellers generally pay a fee for the privilege of listing their items and having them included in the database. The seller is generally able to input a description of the goods including photos, and can set a minimum price that must be exceeded for the item to be sold. The seller may sometimes pay an extra fee to have a more extensive or more prominently featured listing. Sometimes, a seller may also set a fixed price (if a buyer agrees to the set price, the auction-style listing is cancelled and the item is immediately sold at that price to the buyer). The seller may input other terms of sale as well (e.g., type and timing of payment, shipping terms, etc.) The auction-style listings usually expire at a date and time certain (e.g., exactly 7 days after a listing is activated).

To bid on an online auction-style listing, a potential purchaser connects to the transaction server (e.g., over a network such as the Internet using an appliance such as a browser-based computing device) and searches the database for item listings of interest. To submit a bid, the potential purchaser (who must typically register with the online service provider) specifies a price he or she is willing to pay for the item. In "straight bidding," the transaction server establishes this inputted price as the current high bid if it exceeds all other bids. The buyer will be awarded the item at the close of auction-style listing if the bid exceeds any seller-established minimum or reserve price and the buyer is not outbid. If another bidder inputs a higher bid before the close of the listing, the buyer may receive a notice (e.g., by email) giving him a chance to better his or her bid. In a variation known as "proxy bidding", the bidder inputs the maximum amount he or she is willing to pay but the transaction processor only "uses" as much of this amount as is necessary to exceed any other bid(s) and any seller-imposed minimum price.

In such systems, the item is ultimately awarded to the highest bidder at the close of the listing (assuming the seller's minimum price is exceeded). The transaction processor closes the listing at the appointed predetermined time and sends notices to both the seller and the winning buyer. For successful auction-style listing completion, the service provider typically also charges the seller a success fee (e.g., a percentage of the final sales price and/or a flat fee).

To secure success fees-which may represent a substantial part of the service provider's income—service providers have generally designed their systems to push final price negotiation and successful transaction close toward online completion. Such service providers may generally allow the buyer and seller to work out payment, shipping and other transaction details independently (e.g., by exchanging emails) once the listing closes, but the service provider has a big incentive to keep the price negotiation and deal closure entirely within the context of the online transaction server. Some service providers have strict rules forbidding a potential purchaser from contacting a seller and offering to purchase a listed item outside of the service provider's transaction server.

These online auction-style listing arrangements have been very successful for wide arrays of goods. However, not all types of online auction-style listings have been as successful as hoped for. In particular, there are significant challenges to auctioning "big ticket items" including but not limited to cars, trucks, boats, motorcycles, campers, RV's and other motor vehicles.

One of the challenges to successfully conducting online "big ticket" auction-style listing transactions such as for motor vehicles relates to the relatively high cost and relative infrequency of such purchases. Most people do not buy a car or truck very often—usually only once every few years. And such purchases are relatively expensive—people tend to spend more on their car or truck than they do on almost any other purchase except (perhaps) their home. Purchasing a new car can be a trying experience—especially if the buyer is exposed to hidden or unexpected fees or does not receive expected options and features. Purchasing a used car with an unexpected defect (e.g., engine problems, scratched paint, interior damage or odor, leaky windshield, non-working instrumentation, etc.) can be a real disappointment. The buyer's anxiety about receiving less than he or she bargained for is heightened when the seller is a stranger, the transaction is taking place over a computer network and the buyer cannot inspect and test drive the vehicle.

These risks—which are elevated by the relatively high expense of these types of purchases—cause many or most people to be apprehensive about purchasing new or used cars and trucks online. Some buyers are willing to place initial bids at substantially below market value—believing for example that if they can get the vehicle for a low price they can afford to put some extra money into repairs. However, if the online auction-style listing price begins to creep up into the fair market value range (the type of transaction that makes business sense to most sellers), many potential purchasers are unable to tolerate the increased risk and stop bidding. Often, such potential purchasers "bail out" only a few hundreds of dollars short of the seller's minimum price-whereas he or she would likely have bought the vehicle if the buyer and seller had been negotiating directly without a computer intermediary.

The impersonal nature of the computer auction-style listing process is a difficult obstacle when it comes to competing transactions for vehicles and other expensive goods. Direct personal contact may not be essential or even important when selling fungible or less expensive goods. However, for big ticket items such as cars or trucks, real estate, etc. that may cost tens or hundreds of thousands of dollars and can potentially harbor hidden defects and/or fees, most buyers seem to need opportunities for direct, personal contact with the seller and most sellers seem to need opportunities to directly interact with the potential buyer. Generally, buyers need a chance to personally inspect cars and other big ticket items before making a purchasing commitment. In addition, any good car dealer or real estate agent knows that direct personal interaction with potential purchasers on price and other important terms is often the best way to close a deal. For these and other reasons, even though motor vehicle auction-style listing systems are now widely available on the Internet, most people continue to buy their next car or truck by visiting a dealer, "kicking the tires", test driving the vehicle, and negotiating a deal in person.

While the use of computer technology may have something to do with the impersonal nature of certain online transactions, It is certainly possible to create an online environment that is quite user friendly and which encourages direct, rather than strictly online communication between users. Rather, it appears that for the principal reasons why at least some online auction-style listing and transactioning services in the past have been relatively impersonal and therefore unsuccessful for big-ticket items relates to business model choices made by the system designers. For example, if the online service provider chooses to monetize the representation of information to facilitate connections between buyers and sellers, it may be that the computer systems should then be designed to conceal at least some kind of identity or contact information to prevent the buyers and sellers from simply directly contacting one another and thereby avoiding payment of fees to the online service provider. Similarly, if an online service provider desired to monetize successful completion of transactions online, it will generally go to great lengths to put a reliable transaction tracking system in place or even require transactions to be completed online through the online transaction processor. Sellers of big ticket items, such as cars, boats and real estate, on the other hand, know full well that direct contact with potential buyers is important to closing profitable deals. The inherent risk to buyers in purchasing such big-ticket items sight-unseen often leads to realized sale prices below market value, making online transacting a money-losing or low margin proposition. For at least this reason, sellers of so-called big ticket items have in the past generally been displeased with the results they obtain using existing online transactioning and auction-style listing services.

Another disadvantage of certain online auction-style listing systems has to do with a practice known as "sniping"—a way to bid a low-ball price at the very end of an online listing. In general, online auction-style listings are dissimilar from physical auctions in that listings end at a scheduled time, rather than when bidding has ceased. Such specific close times are beneficial to the online service provider who wishes to push the transaction toward closing and arrive at a successful high bid price so he can assess his success fee. However, sophisticated bidders sometimes take unfair advantage of predetermined auction-style listing closing prices by waiting until nearly the last second before submitting a winning bid on an item that would otherwise be sold at substantially below market value. "Sniping" can lead to bidder and seller disappointment and price inefficiency. For example, an astute bidder may observe that an item is about to be sold at well below market value. The astute bidder can wait until just a few seconds before the listing closes before submitting a winning high bid that is still substantially below market value but is higher than the previous high bid. If the astute bidder times his or her bid submission correctly, there will not be enough time remaining in the listing for the next-highest bidder to react and submit a higher bid to provide a more market-representative selling price. In other words, discrete end times for online auction-style listings encourage last-minute bidding, which in turn suppresses realized prices for sellers.

A "proxy bidding" process is one way to lessen the impact of "sniping" and arrive at a more efficient auction price. As explained above, in proxy bidding, the bidder states a highest bid price he or she is willing to pay, but the system submits only as much of this highest bid price as is necessary to achieve a winning high bid. Commonly, however, bidders do not rely entirely on the proxy bidding process but also expect to be able to better their bids if bidding is particularly active. Moreover, proxy bidding can confuse some bidders since the automatic bidding the transaction processor exhibits when handling proxy bidding is not intuitive.

In light of these and other considerations, attempts to conduct online auction-style listings of high-ticket items directly to end user/purchasers have not always been successful. In the context of motor vehicles, for example, most successful online auction completions tend to be for relatively inexpensive motor vehicles with low margins or for relatively scarce, hard-to-find vehicles. The vast majority of new and used vehicle sales are currently not occurring through online transaction systems. Some sophisticated dealers of high priced items may use online auction-style listings mostly as an advertising tool to draw in potential buyers—and some sophisticated buyers tend to use online auction-style listings to demonstrate interest and gather information before initiating direct, personal contacts with sellers. However, many buyers and sellers—even those who make extensive use of online auction-style listing systems to buy and sell certain types of lower cost items—are not using online auction-style listings to purchase their next car, truck, motorcycle, house or other relatively expensive item.

The illustrative non-limiting technology disclosed in this patent specification overcomes these and other problems by providing new online listing and transaction systems and methods that offer increased flexibility and provide a more suitable and efficient competitive bidding environment especially useful for (but not limited to) selling high-ticket items including cars, trucks, boats and other motor vehicles.

One exemplary, illustrative non-limiting feature provided by the technology herein relates to an openness in transaction handling that does away with restrictions on the ability of buyers and sellers to remove an ongoing auction-style listing from the domain of a computerized online transaction processor and instead encourages direct negotiating by email, telephone, in person or in any other convenient way. Under this approach, the goal of the online transaction process is to sell items to willing buyers—not necessarily to sell them online. Rather than using online auction-style listings to complete online transactions, one exemplary illustrative non-limiting arrangement presents online auction-style listings as enhanced interactive advertising—i.e., a type of classified ad that allows potential buyers to interact with the ad and express interest. Buyers are permitted and encouraged to submit bids, but the online transaction server provides various features that encourage buyers and sellers to negotiate price and other purchasing terms "out of channel"—that is, entirely out of the control of the online transaction processor. For example, one illustrative non-limiting feature informs buyers and sellers who are close in price without informing them how close they actually are, in order to encourage a deal. Upon receiving a "closeness" notification, the buyer may better his or her bid, the seller may lower his or her minimum price, or the buyer and seller may begin negotiating directly outside of the online transaction processor to close a deal. A seller can suspend an ongoing auction-style listing at any time for a limited time period while he or she negotiates with an interested buyer/bidder by for example, issuing a formal offer. If the negotiation results in a deal, the seller can simply terminate the auction-style listing early. This "closeness" functionality encourages many deals that might in other context not be made at all.

For example, in one exemplary non-limiting illustrative implementation, if the buyer places a bid or a maximum bid that is "close to" (within a particular percentage that is randomly selected within a range such as 2% to 16%, such as for example 9% to 16%) but does not equal or exceed the seller's minimum price, the electronic transaction system notifies at least one of the parties (i.e., the seller and/or the potential buyer or both) that the potential buyer has submitted a bid which is close to the seller's minimum price. For example, in one exemplary arrangement, the notification may be triggered by the current high proxy or straight bid (i.e., the maximum amount a bidder has indicated he is willing to pay) being within a predetermined range of the seller's minimum price (i.e., the minimum price the seller is willing to sell the item for). In one exemplary arrangement, the current high bid may be a proxy bid that is different from the prevailing maximum bid (e.g., if it is possible to submit bids that are less than the buyer's minimum price). The notification gives the seller and/or potential buyer an opportunity to establish contact and try to negotiate a mutually agreeable price. In one illustrative implementation, the system does not reveal the actual current high proxy bid (if proxy bidding is being used) or the seller's reserve price—but it informs the parties that those two values are within a predetermined range (which range may itself be kept secret and which may be changed from time to time to reduce predictability). This encourages the parties to contact each other and negotiate a price.

In an exemplary illustrative arrangement, upon receiving such a notification, the seller has the option of reaching out to the potential buyer by using the online transaction process to send the potential buyer an offer to sell at a specified price—and/or the potential buyer can reach out to the seller by sending the seller a price at which he is willing to purchase the item. In the exemplary embodiment, the formal offer to sell may be time-sensitive, i.e., it may expire within a certain amount of time. In such non-limiting arrangement, bidding on the item is temporarily halted while the receiving party considers the offer. If the offer is accepted, a contract of sale is formed and the item is removed from listing. If the offer is ignored or declined, it expires and bidding on the item resumes. If the offeree is unwilling to accept the offer but wishes to negotiate, he or she can submit a counter-offer—and the potential buyer and seller can continue to negotiate on price and terms until they reach agreement. This negotiation can be by email exchanges, chat, telephone, in person or any other convenient way. If agreement cannot be reached, bidding resumes so other buyers once again have a chance to bid.

This enhanced acceptance functionality as described above has the effect of taking the transaction "out of channel" by interrupting the ongoing auction-style listing and possibly placing it "on hold" while the seller and a potential buyer "step off to the side" to negotiate. Such untraditional behavior at real-life auctions would likely get buyers and sellers into trouble. However, we have discovered that untraditional approaches may be more effective and efficient in the context of online auction-style listing and transactioning of certain types of items such as motor vehicles or other high-ticket items. In such contexts, an online auction-style listing may function as a very effective, interactive classified advertisement to attract buyer interest, but a direct negotiation will usually be much more effective and efficient for developing a mutually agreeable price and closing a deal. Exemplary illustrative implementations meet this challenge by providing online transaction presentation and processing techniques that actively encourage out-of-channel price and other negotiations instead of the more traditional approach of maintaining control over the transaction.

Another interesting and advantageous non-limiting feature relates to the use of auction-style listings as interactive advertisements. Traditionally, auction-style listings have been used to drive online transactions towards an online closure. In contrast, in accordance with this non-limiting aspect, auction-style listings are used more as interactive advertisements that solicit potential purchaser interest and contact information. More than simply providing "leads" of some conventional interactive ads (e.g., indicating that the user has "clicked on" an online ad to indicate interest and to request additional information), this advantageous use of auction-style listings provides sellers with the ability to reach out and contact potential buyers who have expressed sufficient interest in possibly one-of-a-kind merchandise existing at a particular geographical location, that they have submitted a potentially binding bid offering to purchase the item for a particular specified amount. Such "leads" are much more valuable and useful to sellers than mere indications of interest in receiving additional information.

One example illustrative non-limiting implementation provides the following advantageous features among others:
  closeness functionality that automatically detects when buyer and seller are close to an agreeable price, and suggest to both of them to negotiate out of channel;
  ability to transform classified-style advertisements to auction-style advertisements easily and quickly by reusing content;
  local geographical search for items near potential buyer;
  headline builder and comment builder functionality to allow easy and efficient completion of listings based on standardized reusable text;
  selectable auction-style listing duration;
  fixed listing fee—no success fee;
  conditional or binding listings (e.g., set by the seller);
  automatic time extension to prevent "sniping";
  formal offer to sell functionality outside of bidding process and which suspends bidding temporarily;
  captions on images (e.g., to allow seller to describe actual condition of goods);

predetermined templates for listing presentation, where can upload and customize his or her own;

volume discounts for larger number of listings;

direct billing;

customer support and training;

dealer can cancel bids or block a bidder from bidding;

seller can end auction early (e.g., by canceling all bids, or by awarding item to highest bidder).

Additional non-limiting illustrative features of one example implementation include:

Auction-Style Listings—A unique new sales tool that lets sellers list and sell items auction-style to provide an easy to use, productive and relatively inexpensive way to sell items.

No Sell Fees—The sales made are the result of the seller's hard work. The system does not charge the seller a fee to sell an item. The seller pays only to list.

It's All Included—All the features sellers need to sell Auction-Style are included. Adding photos and setting a minimum or set price are included in the listing fee.

Drive Traffic—Sellers get more bang for their advertising buck. Sellers are free to add links to their own website or other inventory from an Auction-Style listing.

Know When it's Close—Whenever bidding on the seller's item is close to the seller's minimum price, the system automatically lets both the seller and the bidder know. The seller and bidder are then free to contact one another and seal the deal.

Close the Deal—service allows the seller to close the deal online more efficiently with an Offer to Sell feature. Sellers can use it to make a formal offer to the high bidder while the listing is live, or to any bidder after the listing has closed.

Get the Highest Bid—Auto Extension feature extends bidding (e.g., for a predetermined time period such as five extra minutes) if a bid is placed near (e.g., within the last five minutes of) the end of a listing. This way, last-minute bidders don't short-circuit bidding on a listing and "sniping" is prevented.

Manage Reputation Feature—Sellers can protect their online image. Whenever a buyer rates a seller on an online transaction, the seller has a certain time period (e.g., up to one week) to work with that buyer and get a positive rating.

Generate More Leads—Many people are uncomfortable bidding on a high ticket item they have never seen in person. Sellers can ease their mind and get more bids per listing by allowing Conditional Bids, which obligate the winning bidder to inspect the item at the listing's end, but does not bind them to buying the item if they are unhappy with it. This encourages more bidding and more direct one-on-one personal negotiations.

Volume Discounts—Sellers can earn discounts off the listing price if they commit to certain volume levels. The more the seller lists, the less the seller spends on every listing.

Sellers can use classified advertising products function in conjunction with Auction-Style listings to drive traffic to other inventory and web sites.

Easy to List—inventory management tools and Auction-Style listing templates make creating effective online advertisements for items a snap.

Unlimited Space to Advertise—Sellers can take advantage of unlimited ad space and free, unlimited photo hosting.

List When You Want—Sellers can start listings whenever they want, no matter when they have time to create listings. A Start Timer feature lets sellers set listings to start up to seven days in the future.

Flexibility—Sellers have flexibility with auction-style listing durations—for example, a seller can choose any number of days (e.g., between 3 and 10 in one exemplary implementation).

Control—If an item sells prior to the conclusion of an Auction-Style listing, or a seller wants to sell to the current high bidder who has already met the seller's reserve price, the seller is free to cancel or end the listing early.

More Local Buyers—Auction-Style Listings drive local leads—buyers search for items they want within a ZIP code range, meaning more of them can visit the seller to see what they are bidding on. A nation-wide audience still has access to listings via a special auction-style search result page tab.

Simplified Billing—Auction-Style Listings activity is included and summarized with other services (e.g., classified listing service) in one easy to read bill.

Package Offer—Sellers may choose to list Auction-Style listings for a non-contract rate on a price per listing basis. But sellers can get more listings for less with an Auction-Style Listings package. Sellers can choose and pay for the minimum number of listings per month that suits their budget and schedule and receive listing discounts that apply to all their listings, no matter how many cars or other items they list. As one example, if sellers have a 40-listing per month package and choose to list 50 cars or other items, they can qualify for a per listing discount on all 50 listings for the month, not just the first 40.

Inventory—Primary page where dealers manage their auction-style listings.

End Listing—Where dealer can terminate listings before the scheduled end.

Offer to Sell—Where dealer can make an offer to highest bidder, which if accepted the listing ends successfully. Offers can also be made to any bidder on a listing that ends without a winner.

My Ratings—Summary Page where dealer can review all their ratings, both pending and published.

Rating—Detail Page where dealer can view ratings on an individual listing.

mid-auction management functionality allowing sellers to end auctions early, move a listing between auction-style listing to static classified ad listing, decrease minimum price, interact with bidders as auction proceeds, and perform other functions.

functionality allowing final bargaining and price agreement to take place out of channel.

secondary notification function giving bidder and seller an indication that they are close to an agreeable selling price, without giving them all of the actual numbers.

dynamic control by sellers over minimum sell and "purchase now" prices during the auction.

dealer tools for identifying good auction-style listing item candidates mechanisms for motivating buyers to report auction purchases outside of the online transaction environment.

functionality allowing bidders to outbid themselves in proxy bidding.

Dynamic Display Ad—When a consumer is looking at a particular item on the site and clicks on the "See Our Specials" link it, he (or she) is taken to a page. These pages are dynamically created from the dealer's inventory. The items selected for the page include some of the same general type that were being looked at, others with similar pricing and a few that the dealer has identified as items that need to get special attention.

AuctionManager, AdManager, the Dealer Community and our Listing Tool together provide dealers a comprehensive set of tools to manage inventory on the web.

Dealer Activity Report—The system records all consumer activity related to every item listed by every dealer. It then processes all of that information on a weekly and monthly basis to produce on-line and paper reports that may be provided to dealers. These reports inform them exactly how many times their items have appeared in search results, how many times consumers have looked at each item and what additional actions (emailed, phoned, looked up a map to the dealer) the consumer did.

Summary of Exemplary Features of One Illustrative Non-Limiting Implementation

Illustrative General Auction Rules/Processes

Winning bids are considered a binding commitment on the part of the bidder to buy the item listed—unless the seller has misrepresented the item.

All terms of sale (shipping costs, document fees, etc.) are disclosed by the seller.

The Seller's description and photos accurately represent the item for sale.

It is acceptable for sellers to sell an item off-line, however:
The transaction is ineligible for feedback.
Any site-sponsored guarantees are voided.

The ability to accept series of items; in a motor vehicle context that means for example accepting all cars, all years, all makes (this includes non-VIN vehicles).

Illustrative Registration Processes

Buyers and sellers register for any auction-style activity.
Non-registered buyers may interact with auction-style listings and sellers, but must register in order to bid or transact online and/or place a rating about a seller after an online transaction.

Registration sets up a login name, public user name and password.

private sellers and bidders can use their email address as a login name.

Registrants choose their own public user name and password.

A password reminder utility is used.

Future log-ins authenticate user name and password.

Illustrative Seller Registration

Private seller registration uses a credit card and is automatic when placing a listing.

Dealers are registered with pre-existing data if they are an existing customer.

Registration of paying dealers does not require direct contact with an Internet Consultant—signups can be conducted in the field or online within the dealer community.

Paying dealers may be assigned their existing AdManager user name and password for simplicity.

Dealers that are new customers may register either via a sales representative or online via the dealer community.

All dealers who register will be contacted for confirmation and training by the auction-style support team.

Registration involves agreeing to terms of use.

Illustrative Seller Summary Page

Sellers have access to a summary page.

It displays all bidder email addresses and all current high-level data about the status of their auction-style listing(s).

Other information may also be displayed related to other non-auction-style products the seller has purchased.

For dealers, it will appear with the Dealer Community Area.

For private sellers, it appears within "MyAutoTrader.com."

Illustrative Buyer Registration

Online registration collects:
Name
Address
Telephone number
Email address (this becomes their login name)
User's preferred public user name and password
optionally, credit card number or other information can be used for age verification
Additional information.

Online registration can optionally be verified through an email conformation loop or by other means Registrants are asked to bid judiciously on the site.

System does not accept web-based email accounts or requests additional information for users with web-based email accounts in order to prevent spam bidding.

Illustrative Login Summary Page

Bidders have access to a login summary page.

It displays all their bidding activity:
Links to listings they have bid on,
Links to "watched" items they have identified,
Summaries of auction-style listings they have won or lost.

Illustrative Listing Management

Illustrative Listing Sources

Any item in a seller's inventory can be moved to an auction-style listing through Ad Manager.

Private sellers may post an auction-style listing from "Sell Your Item."

Inter-web site cooperation: a special tool for users to post certain types of items (e.g., classic or collector cars) listed as classified ads at ad server web sites.

An API allows other inventory sources to post vehicles to auction-style listing.

Illustrative Manager Tools

Illustrative FSBO And Dealer Listing Tools

Free Photo Hosting (Unlimited if Possible, a High Limit if Necessary).

Photo re-sizing capability.

Photo rearrangement capability.

Photo caption creation and editing feature.

Unlimited free-form text space for item and seller description in addition to the above.

A choice of presentation templates allowing sellers to "merchandise" their item without needing to know HTML.

Standard, editable terms of sale which are appended to the listing
Sellers may be given an area to clearly describe any extra fees they will levy on the sale of an item (e.g. documentation or prep fees, inventory taxes, etc.)
They will be given notice that not stating these fees up front in the auction-style listing is reasonable cause for a buyer to renege and/or post negative feedback.

Content augmentation (e.g., in a vehicle context, VIN decoding, a vehicle history report provider (e.g., Experian) and retail valuation service (e.g., NADA)). Sellers have the ability to order an item history report and have it easily included within the listing (i.e., without having to know how to copy the page and paste the HTML into listing form). Estimated warranty and transportation costs can be populated by a third party provider.

Ability to set a Minimum Price, a Purchase Now Price and a Reserve Price.

Ability to set their own preferred bidding increments.

An assortment of paid listing enhancements similar or identical to those available for classified advertisers (bold, highlight, etc.).

Listing preview/edit before posting capability.

Mid auction-style listing update/correction capability.

Illustrative Dealer Listing Tools Functionality

Ability to enter their seller details and terms of sale once and have them automatically populate all successive listings (while still being editable at any time).

Description and header building utilities (click the concept and the description gets written or bullet-pointed automatically).

An array of dealer-style templates, which aid in presentation.

Expanded seller contact information (hours, address, etc.).

Tools to identify good auction-style item candidates within their inventory (inventory match with "hot item" data of various kinds and also aged inventory).

Pricing guidelines (preferably based on fair market value data or at least general guidelines on where to set minimum sell price).

Management area where dealers can end a listing early, move a listing back to classified, generate Seller Offers, manipulate reserve price in mid-listing (if desired) and otherwise interact with bidders as the auction goes on.

Post-auction management system which allows dealer to relist, move items back to classified or remove items from inventory. This function should track results when item is removed from inventory (e.g., sold to bidder, sold outside auction, wholesaled, etc.).

Illustrative Other Listing Formats

Multiple winner listings which remain active until their time runs out or a pre-set number of bidders win at the dealer's asking price (e.g., a dealer sells 15 new identical items for $100 over invoice).

Price-limited auction-style listings, which have a longer (or no) preset duration and do not end until the seller's minimum sell price is met. These may cost more than standard listings.

Payment auction-style listings (lease or loan). Bidders must pre-qualify with the dealer to be allowed to bid on the listing, which will have a set lease or loan payment on a new or used item.

Reverse auction-style listings—where buyers post requests for items they are seeking and take offers from seller who have such an item. This function will be significantly different from the basic auction-style marketplace, and probably could not be included in the initial product release.

Sellers will receive all email addresses for all bidders in an auction where the reserve was not met.

Illustrative Off-Line Sales

Sellers can easily remove an item from auction-style listing.

Seller can indicate if the item was sold to a bidder outside the auction-style listing, to a walk-in customer or wholesaled.

Buyers encouraged to report off-line sales.
  This may include third party offers requiring a confirmation call.

Illustrative Bidding Activities

Registered bidders enter their bid on the Auction-Style Detail Page.

Email address (login name) and password are input for bidding.

Bidders are notified that they are making a binding offer to purchase the item subject to the item and terms of sale being described accurately in the listing by the seller.

The high bid and number of bids will be displayed on an Auction-Style Listing (Search Result Page) in real time—or as close as is possible.

High bids may be displayed with the bidder's public user name. A number can be displayed on the auction listing by the bidder's user name which indicates the number of unique items that bidder is currently bidding on. This can be used to aid sellers in judging how serious the bidder is about their item.

Any amount above the "starting bid" (sellers pre-set minimum bid) can be bid.

Bids higher than the "reserve" price (seller's minimum sell price) will trigger a notice that the bidder has reached a binding price.
  This "binding bid" notice will be displayed online to the bidder and also emailed to both the buyer and seller automatically and both will be encouraged to make contact.

Both high bidder and seller will also be notified if a subsequent, higher bid is submitted.
  The previous high bidder will have the option to return to the listing and submit a higher bid.

Bids in the last five minutes of an auction-style listing will automatically extend the duration of the listing for another five minutes.

Extensions will continue until bidding has stopped.

Auction-Style Management Tools (dealer and private seller) allow "restarting" the auction if a "winning" bid fails.

Bidders cannot retract a bid.

Sellers may elect to remove a buyer's bid. Sellers may also block that bidder from bidding on their auction-style listings in the future.

Bidding activity by each user monitored to minimize "spam" bidding.

Bounced back emails are tracked, the buyer is notified via the login page, and the seller is notified via email.

Illustrative Purchase Now

Sellers may set a "purchase now" price (no extra charge).

This price can be equal to or higher than the "reserve" price.

This price is available (displayed) as bidding occurs below this price.

When the "purchase now" price is met by a buyer, the auction closes automatically.

Illustrative "Deadbeat" Bidder Processing

"Deadbeat" bidders are those who make a winning bid, but do not complete the transaction.

Some bidders (reported "deadbeat" bidders) may be asked to place a deposit (e.g., $35—charged to the bidder's credit card) in order to bid.

Binding bids (those which meet or beat the "reserve" price) will trigger this charge.

This charge will be credited to the seller's account.

If the bidder purchases the item, this fee will be deducted from the final sale price.

If the bidder reneges on the bid, this charge is applied to the seller's re-listing fee.

Bidders who repeatedly become "Deadbeats" will be suspended from the site and not allowed to bid.

Illustrative Bidding Styles

Proxy bidding or straight bidding can be used.

A buyer sets the maximum bid amount.

Proxy bidding automatically increases the buyer's bid in pre-determined increments so that it remains the top bid.

Buyers may increase their maximum proxy bid.

When the seller's reserve price is met, buyer and seller are notified as defined above.

When the maximum bid amount is reached and is no longer the highest bid, an email is sent to the buyer as notification.

Sellers will be informed when a buyer's straight bid or maximum proxy bid is close to the minimum price and encouraged to contact the bidder.

Illustrative Seller Advantages

Sellers will be provided with the winning bidder's phone number and email address.

The seller may approach other bidders by email, if the item does not sell. These bidders are NOT obligated to respond.

Illustrative Shill Bidding Processing and Detection

Shill bidding is strictly forbidden.

Shill bidding is the practice of using a separate ID to bid on one's own listings or encouraging an associate to do so.

Bidding patterns must be tracked in order to identify shill bidding (e.g., a single bidder who frequently bids on an individual seller's listings).

IP address recognition and credit-card tracking ability are needed to link sellers who register with a separate bidding ID to bid on their own items.

Shill bidding will result in automatic suspension from using the auction and in the cancellation of all outstanding listings by that seller.

Illustrative Feedback Mechanisms

Buyers need not have a feedback rating.

Sellers will have a feedback rating.

This rating will be available in full detail from the listing for registered bidders only.

Non registered visitors will see only the top level feedback rating.

Seller ratings will be driven by buyer feedback.

Buyers will rate degrees of satisfaction with:
 the overall transaction,
 responsiveness,
 accuracy,
 other factors Private sellers will not build significant feedback, but will be listed as private sellers.

Illustrative Seller Initiated Feedback

Seller reports completed deal (through Dealer Community Area or Sell Your Item).

An email is generated to request feedback from the purchaser.

The email includes a URL to an online form for posting of feedback.

Illustrative Buyer Initiated Feedback

Buyers may initiate feedback for a seller.

Buyer must have been a bidder for that vehicle (verified through user name and password).

Illustrative Feedback Lag Time

Seller feedback is not instantly applied to a seller's rating.

All feedback is available for review by the seller for a certain time period e.g., seven (7) calendar days.

An email is sent to the seller when new feedback is posted (feedback included in email).

The seller may either allow the feedback to be posted immediately, or work with the buyer to satisfy their concerns.

If the buyer does not alter the feedback, it is automatically posted after a certain time period e.g., seven (7) calendar days.

A mediation team is used to sort out disagreements between buyers and sellers based on negative feedback.

Illustrative Negative Feedback Processing

A Security Team will contact any seller with substantial negative feedback.

Warnings may be issued at the discretion of the Security Team.

Continual negative feedback will be cause for the removal of the seller's access to the auction.

Sellers may alert the Security Team to any buyer who uses negative feedback to blackmail them.

Online service provider may remove that buyer's feedback, upon receipt of appropriate evidence.

Illustrative Trusted Seller Status

"Trusted Seller" status will be conferred on sellers who reach a certain rating.

This status will be displayed on all of that seller's listings.

Lower listing fees may be applied to those who attain this status.

Illustrative Reporting Services

Reporting

Dealer activity tracking including:
 # of items listed each week and month
 # of items "sold online" for week and month
 # of items reported sold offline each week and month
 # of seller offers sent, # accepted
 # of re-listings
 # moved to classified at auction end
 # removed from inventory at auction end
 # of active current and new dealers
 in motor vehicle context, make/model/year/VIN information of cars listed/sold
  pricing data on dealer's listings
  minimum sell price
  buy now price
  high bid price
 bidding activity by listing
  # of bids
  # of unique bids
  "locality" of bids (track bidder zip/city)
 feedback sessions initiated
 feedback sessions completed
 current feedback rating by seller
 billing summaries for auction product by dealer
all stats above summarized by Sales Rep/District/Region
all stats above summarized in entirety
for sale by owner (FSBO) stats similar to those listed above
ability to take "snapshot" of product activity (current count of items up for auction, sold items month to date, etc.)
consumer use data
 # of clicks/uniques to auction listings
 # of leads generated (same methodology as classifieds)
 # of leads driven to other ATC products (DDA, Site Link, etc.)
 # of service partner sessions/uniques
customer service date: registered, trained, calls
more Illustrative Security Procedures An Auction-Style Security Team (AST) will be formed It will begin as a unit within the Auction Department's customer service team.

The aggrieved parties will be encouraged to resolve disputes between themselves.

When necessary, the AST will determine which party is correct and resolve the issue as it pertains to use of the Auction-Style service (they may remove a users ability to bid or list, for example).

The AST may or may not issue suspensions from the auction at their discretion.

The AST will be responsible for ensuring that banned buyers or sellers do not return to the site during the period of suspension.

Collection of data on buyers' and sellers' history.

Analysis of bidding and listing activity.

The AST will need to determine if apparently unrelated buyers and sellers are connected.

Illustrative Data Services

Integration of third party services into the auction product. This involves data passing between online transaction site and the vendor. Third-party services can play a role in the auctions product. The following services may be provided in a motor vehicle context, for example:

VIN decoding/new car data provision

Vehicle history reports (should be easy to include within the seller's listing once purchased)

Retail price estimate (NADA, Edmunds)

Service contract cost estimation and/or bundled short-term warranty

Bundled transaction insurance.

Vehicle inspection report.

Escrow.

Shipping provider with online cost estimator function.

Online transaction insurance provider.

Auto insurance cost estimate.

Online payment provider (e.g., primarily for sending of deposits in non-local transactions).

Other.

Illustrative Lead Management

Lead generation is a primary benefit of the auction

The amount of leads generated can be overwhelming (many requests about the minimum selling price).

A lead management in the Dealer Community Area.

A lead-funneling system for delivering leads to a dealer's own system.

Illustrative Billing Processing

Dealers who opt to use the product will pay per-listing for the service (a price to list with no final value fee). It is possible they will be able to receive discounted insert fees by committing to a certain level of use per month (i.e., buying a "package").

Dealers can sign up for the a-la-carte service online within the Dealer Community to allow for paid sampling of the product.

Private sellers pay the same fee as dealer sellers. Measures should be in place to prevent or discourage dealer-sellers from using the FSBO Auction-Style function. Listing durations should be programmable (e.g., in range from 3 to 10 days) with no change in fee structure for duration.

BRIEF DESCRIPTION OF DRAWINGS

These and other features and advantages will be better and more completely understood by referring to the following detailed description of exemplary non-limiting illustrative implementations in conjunction with the drawings of which:

FIGS. 2, 3, 4, 5, 6A and 6B show exemplary illustrative pages a seller can use to input an auction style listing;

Figure 7A:
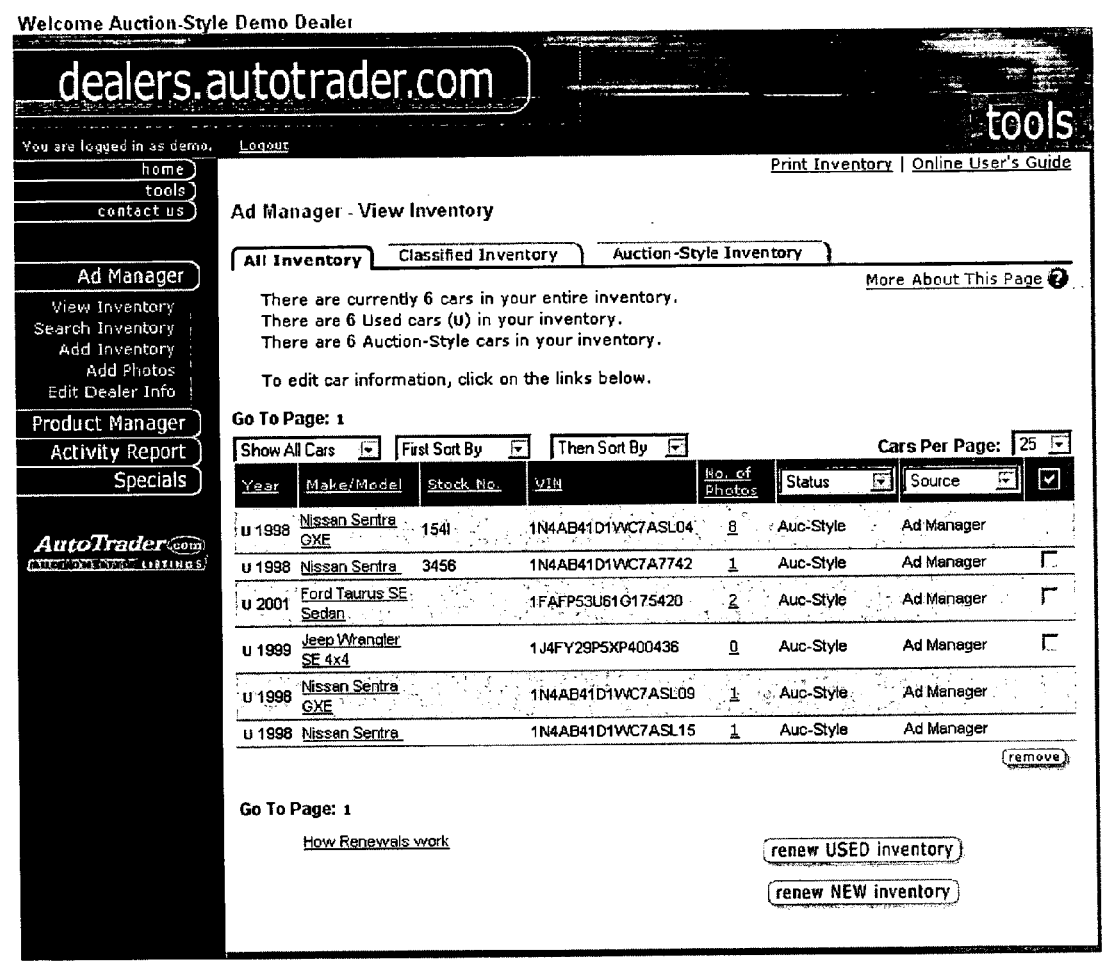

FIG. 7 shows an exemplary page a seller can use to manage inventory that he or she has placed for auction-style listing;

FIGS. 7A, 7B, 7C, 7C-1, 7D, 7E, 7E-1, 7F, 7F-1, 7G, 7H, 7I, 7I-1 show an example automobile listing creation;

FIGS. 8, 9 and 10 show example pages a user 90 can use to search and select auction-style listings;

FIGS. 11, 11A and 11A-1 show example illustrative steps to determine "closeness";

FIGS. 12A, 12B, 13A, 13B, 14, 15, 16 and 17 show exemplary "closeness" associated display pages and notifications;

FIGS. 18A & 18B show exemplary pages allowing a seller to end an auction-style listing before the auction has been completed;

FIG. 19 shows an example page of ratings associated with a seller;

FIGS. 20 & 21 show an example page that a buyer can use to edit a seller's rating;

FIG. 22 shows an example notification that system 50 generates and sends to a seller who has been rated by a buyer;

FIGS. 23, 24 and 25 show exemplary seller ratings pages accessible by seller.

DETAILED DESCRIPTION

Figure 1:
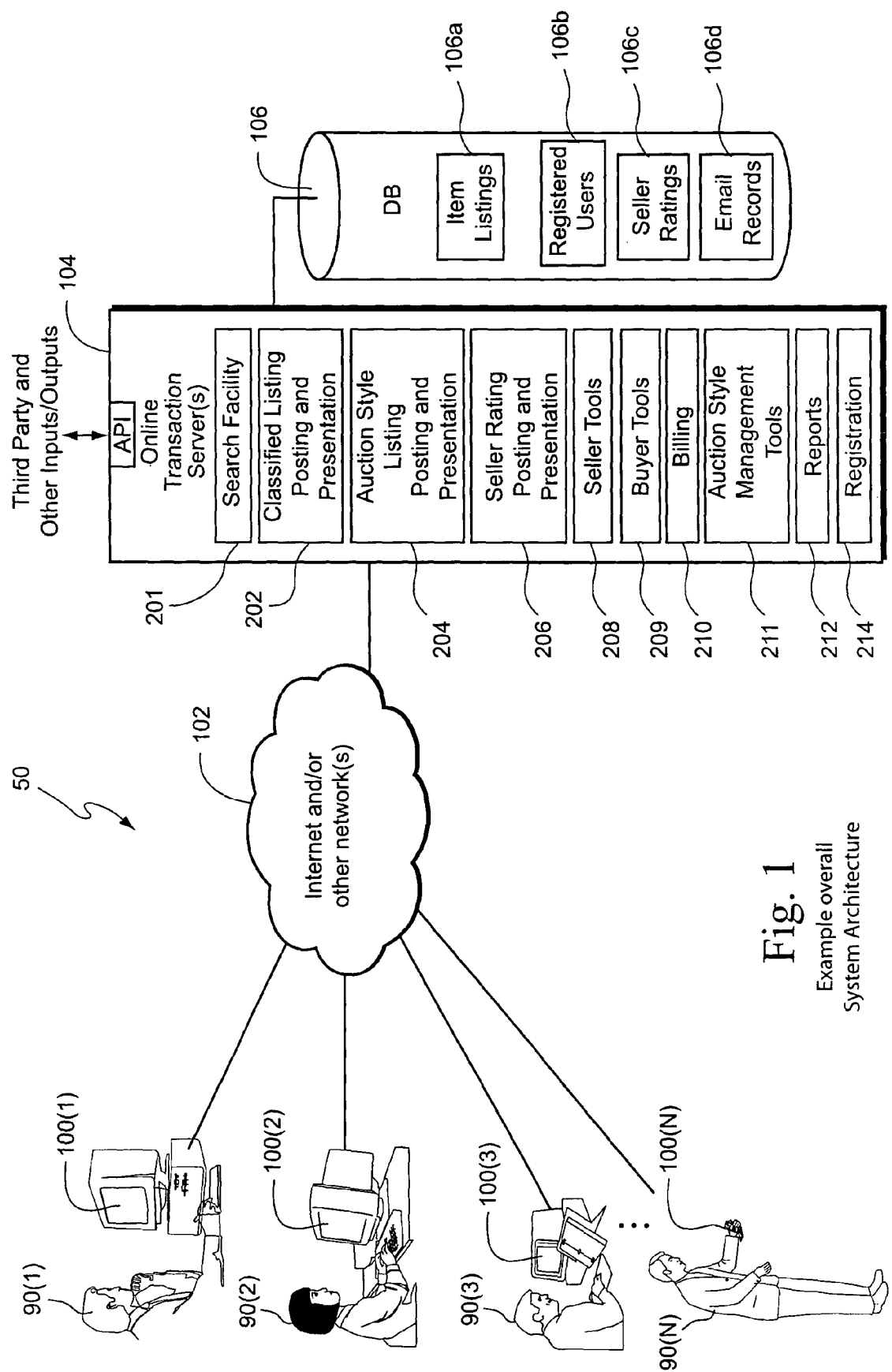
FIG. 1 shows an exemplary illustrative overall online transaction system 50 for providing online classified advertisements, auction style listings and other functionality.
Figure 1A:
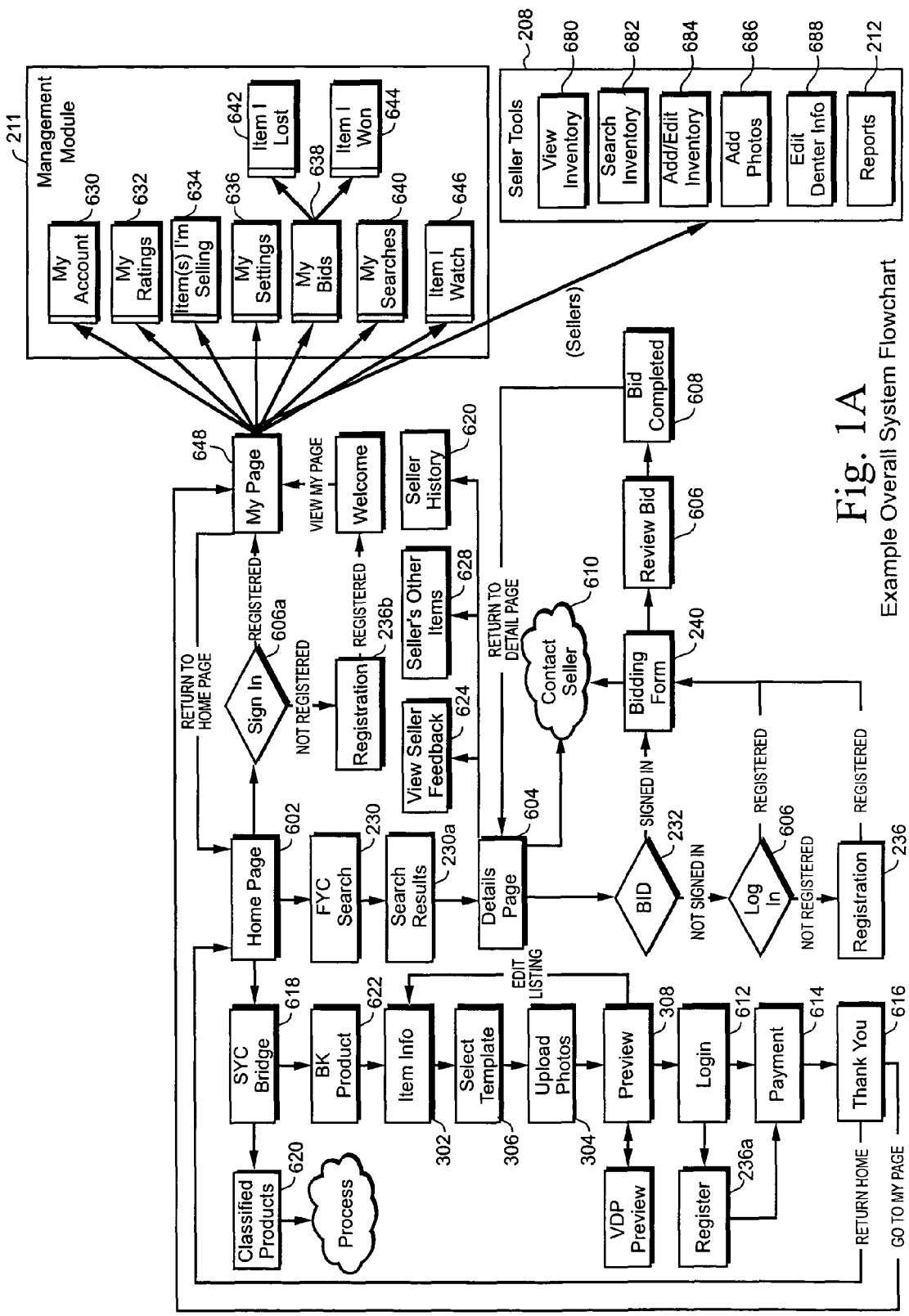
FIG. 1A shows example illustrative overall user process and work flow.

FIG. 1 shows an exemplary illustrative non-limiting overall online transaction system 50 for providing online classified advertisements and auction style listings and other functionality. FIG. 1A shows an example overall system flowchart of steps and workflow that system 50 performs.

As shown in FIG. 1, any number of remote users 90 use browser-based or other appliances 100 to communicate via the Internet or other network 102 with an online transaction server(s) 104. Appliances 100 may comprise personal computers, cellular telephones, pocket PC's, personal display appliances, web-enabled televisions or set-top boxes, or any type of appliance that can display information and collect and forward user input. Server(s) 104 stores information in one or more databases 106, and deliver stored information in the form of classified listings (202) and auction-style listings (204) to users 90 on demand or otherwise via the network 102 for display on user appliances 100.

If the user 90 is a seller, the user can insert a classified listing or an auction-style listing into the database 106a (FIG. 1A, left-hand side, blocks 612-622, 302-308). Other users 90 use a search facility 201 (FIG. 1A blocks 230, 604) to select and review listings (e.g., based on geographical proximity and/or other criteria), and may interact with such listings and other displays via keyboards, mice, touch screens or other well-known user input devices. Such real-time user interactivity allows users 90 to search for and select particular listings of items being offered for sale.

Users 90 may review selected listings and, in the case of auction style listings, submit bids (FIG. 1A blocks 232, 240, 606, 608). Server(s) 104 tracks auction-style listings and associated bids and allows sellers to manage their listings through use of seller tools (208) such as "view inventory," "search inventory," "add/edit inventory," "add photos," "edit dealer information," and report generation (see FIG. 1A blocks 680-688, 212). Server(s) 104 also facilitate direct communication between sellers and potential buyers via email or other forms of communication, to allow and encourage "out of channel" price negotiation and other contact. Server(s) 104 also allows buyers to rate sellers (206), and provide notification to sellers of such ratings in advance of posting so the sellers can protect their reputation by satisfying dissatisfied buyers who may then withdraw unsatisfactory ratings (FIG. 1A block 632). Server(s) 104 also provides billing services (210) to bill for listing services FIG. 1A block 614).

In one example illustrative non-limiting implementation, online auction platform 50 is used to provide online retail automotive and other auction-style services to enable dealers and private sellers to list items for sale in an online auction-style setting but other types of goods are also possible including for example real estate, boats, airplanes, or almost any other king of item. Sellers are able to set a minimum price and a "purchase now" price. Buyers have the ability to research sellers' items and past transactions via history reports, inspection service partners and seller ratings. The functionality is that of an open-ended, advertising and transaction mechanism—meaning it is designed to minimize system-imposed rules that could slow down the speed, frequency and efficiency of transactions. The illustrative implementation sacrifices ability to measure conversion rate in some regards to improve ease of use and success for its participants. Offline item sales—that is, sales resulting from online auctions that do not "close" online—are considered a good result even though the online service provider is not necessarily able to measure performance due to the out-of-channel nature of these transactions.

Exemplary illustrative online transaction platform 50 provides ease of use, focus on driving local transactions (on and offline), and integrates well with existing/future portfolios of classified listing products 106a, 202. For example, in an illustrative non-limiting implementation, sellers can easily move listings between classified and auction style listing presentations. The online platform 50 and associated services can be offered as both stand alone services and as part of a bundle of advertising products (e.g., including online and print classified advertising). Posting 203, 204, managing, reporting 202 and billing 210 are synchronized between auction and non-auction style listings in the exemplary illustrative implementation so each can leverage off the other.

The illustrative online platform 50 is simple to use for dealers and private sellers and buyers in all functional areas including for example registration, listing, management and bidding. A rating system 206 is used to rate sellers, with a "cooling off" delay time before ratings are posted and published. Third party services are offered to provide data on items available through auction-style listings.

Example Registration Process

Before participating in an online transaction using exemplary illustrative system 50, both sellers and buyers register with the server 104 (FIG. 1A blocks 236, 236a). Seller registration in one exemplary arrangement is broken into two processes, one for dealers and another for private sellers. Private sellers flow through the process integrated with classified listing service. Private sellers register as a last step, for example, of placing their listing (e.g., either on the same page as or after they have entered their credit card payment or other identification information, which in one exemplary arrangement is part of the registration process) (see FIG. 1A block 236a). Dealers may be registered using data that is manually collected by sales staff or via an online sign-up within a dealer community.

Dealers who do not use online classified listings but wish to sign up for online auction-style listings may be asked to provide various information (e.g., dealership name, contact info, address, phone, inventory size, franchise brands, contact names, etc.). Their registration-whether initiated in the field by dealer sales or online via a dealer community signup form—may be processed manually to generate customer support and training follow up. Private sellers are discouraged from posting fraudulent listings by, in one exemplary embodiment, a required submission of credit card information for listing fee payment before the listing is posted. Verification provider services may be used for additional security and fraud-protection if desired.

Seller registration in one exemplary illustrative implementation requests the registrant to acknowledge that the online transaction platform 50 is designed to drive item sales both online and offline. The onus of making sales is upon the seller, not the service 50.

Seller tools 208 including login-protected seller summary pages are used so sellers can view recent and historical activity on their auction-style listings. They are able to retrieve bidder email addresses and other information. Dealer sellers may access such interface in an online dealer community. Private sellers are able to access such functions in a consumer seller online summary area. Sellers are preferably, in one exemplary illustrative implementation, restricted from re-registering with a new user name to escape feedback ratings.

Bidder registration 214, in one exemplary arrangement, uses an online form that collects various bidder information such as name, address, telephone number, email, etc. Email addresses may be verified by an email confirmation loop sent to the user with a link that the user uses to come back and complete registration (see FIG. 1B). At registration time, bidders may be asked to bid judiciously and to agree not to bid without intent to buy. Credit card numbers are preferably collected for age verification and security. All registrants are issued a login ID which can be used to access auction-style functions. In one non-limiting implementation, user names may be free form, but are preferably screened for profanity or otherwise undesirable language. In one exemplary arrangement, the system refuses web-based email accounts which can be set up as junk accounts; in other arrangements more information is required to verify the validity of contact information of such users.

All registrants are, in one exemplary illustrative arrangement, asked to choose a password. A password reminder utility may be used to help with this process. By inputting user ID and password, bidders are given access to buyer tools 209 including a login summary page where they can view their bidding activity, links to listings upon which they have bid or may have an interest in bidding (e.g., a "watched item"), and to see summaries of auction-style listings they have won or lost.

Example Listing Process

System 50 may accept listings from multiple sources including, for example:

a dealer community listing tool allowing item data to be enhanced for auction-style/classified use (e.g., photos, item history, seller history ratings) and allow the item to be posted to the dealer's advertising product of choice;

an area within "sell an item" functionality which allows private sellers to post their item for auction-style listing;

an API interface capable of accepting listings from third parties.

For sale by owner and dealer listing tools 208 are preferable provided in one exemplary illustrative arrangement with a variety of listing functionality including for example:

- photo hosting (e.g., free, unlimited if possible, a high limit if necessary) with photo re-sizing and rearrangement capability;
- unlimited free-form text space for item and seller description in addition to the above;
- a choice of presentation templates to allow sellers to "merchandise" their item without needing to know how to write an html or other markup language;
- standard editable terms of sale and sale fees which may be appended to an item listing;
- an area in which sellers may clearly lay out any extra fees they will levy on the sale of an item (sellers may be given a notice that not stating such fees up front in the listing may be cause for a buyer to renege and/or post negative ratings);
- content augmentation by item tracking history, valuation, warranty, transportation costs, etc. (in one exemplary illustrative embodiment, item sales content is augmented by item identification information decoding, an item history report provider, retail valuation services, etc.);
- mechanisms to set a minimum price, a purchase now price and a minimum bid price;
- listing preview/edit before posting capability;
- generation of unique item identification information for use in reporting, tracking, etc.;
- mid-listing update/correction capability.

Dealer listing tools 208 may have the following additional illustrative listing functionality:

- ability to enter/edit global text such as seller details and terms of sale which automatically populate successive listings;
- description and header building utilities (e.g., click the concept and the description gets written or bullet-pointed automatically);
- ability to set a starting bid and bid increments (e.g., starting bids may be freely editable by all sellers);
- an array of dealer-style templates which aid in presentation;
- expanded seller contact information (e.g., hours, address, etc.);
- tools to identify good auction-style listing candidates within an existing inventory (e.g., inventory match with "hot item" data of various kinds and also aged inventory);
- pricing guidelines (preferably based on actual make/model/year data for items such as vehicles or at least general guidelines on where to set minimum sell price);
- mid-auction management area where dealers can end a listing early, convert between an auction-style listing and a classified advertising listing, make offers to buyers and otherwise interact with bidders as the auction-style listing goes on;
- notify sellers when a bidder is near or "close to" their minimum price (this function in one exemplary arrangement does not reveal perfect information about the positions of the two parties, but encourages sellers and buyers to work together to reach an acceptable deal);
- post listing management system which allows dealers to re-list, move items to classified listings, remove items from inventory, etc.; this function preferably, in one exemplary implementation, tracks results when an item is removed from inventory (e.g., a dealer should select "sold to bidder," "sold outside auction," "sent to wholesale," etc.).

In one illustrative implementation, sellers may be asked to pay a per-listing fee for auction-style listings. Dealers may be able to receive discounted insert fees by committing to a certain volume of use within a given time period. System 50 does not, in one exemplary illustrative arrangement, levy any success fee. Private sellers may pay the same fee as dealer sellers (except possibly buy and discount opportunities). Dealers are able to sign up for an a la carte service online within the dealer community to allow for paid sampling of the online listing service. Measures may be put in place to prevent dealer-sellers from using for sale by owner auction-style functionality if desired.

In one exemplary embodiment, listing durations can be selected by the seller to range from certain time periods (e.g., three to ten days) with no change in fee structure for duration. Various listing reporting formats are possible including for example:

- multiple winner listings which remain active until their time runs or a pre-set number of bidders win at the dealer's asking price (e.g., a dealer sells fifteen new Toyota Camrys for $100 over invoice);
- price-limited auctions which have a longer (or no) pre-set duration and do not end until the seller's minimum sell price is met. These may cost more than standard listings, possibly a per-day fee beyond the standard auction-style listing duration.
- Dutch auction-style listings, which allow dealers to post numerous identical or nearly identical items for auction-style listing;
- payment auction-style listings (lease or loan) wherein bidders are pre-qualified with the seller to be allowed to bid on the auction which will have a set lease or loan payment on a new or used item;
- reverse auction-style listings where buyers post requests for items they are seeking and take offers from sellers who have such an item.

FIG. 1A shows an illustrative flowchart and FIGS. 2, 3, 4, 5, 6A-6B, 7, 7A-7I show exemplary displays and associated processes a seller can use to place a new listing. From the home page (block 602), the seller can select between inputting a classified listing via a "sell your item" functionality or otherwise (blocks 618, 620 of FIG. 1C) or be routed directly to auction style listings (block 622 of FIG. 1C).

Figure 1B:
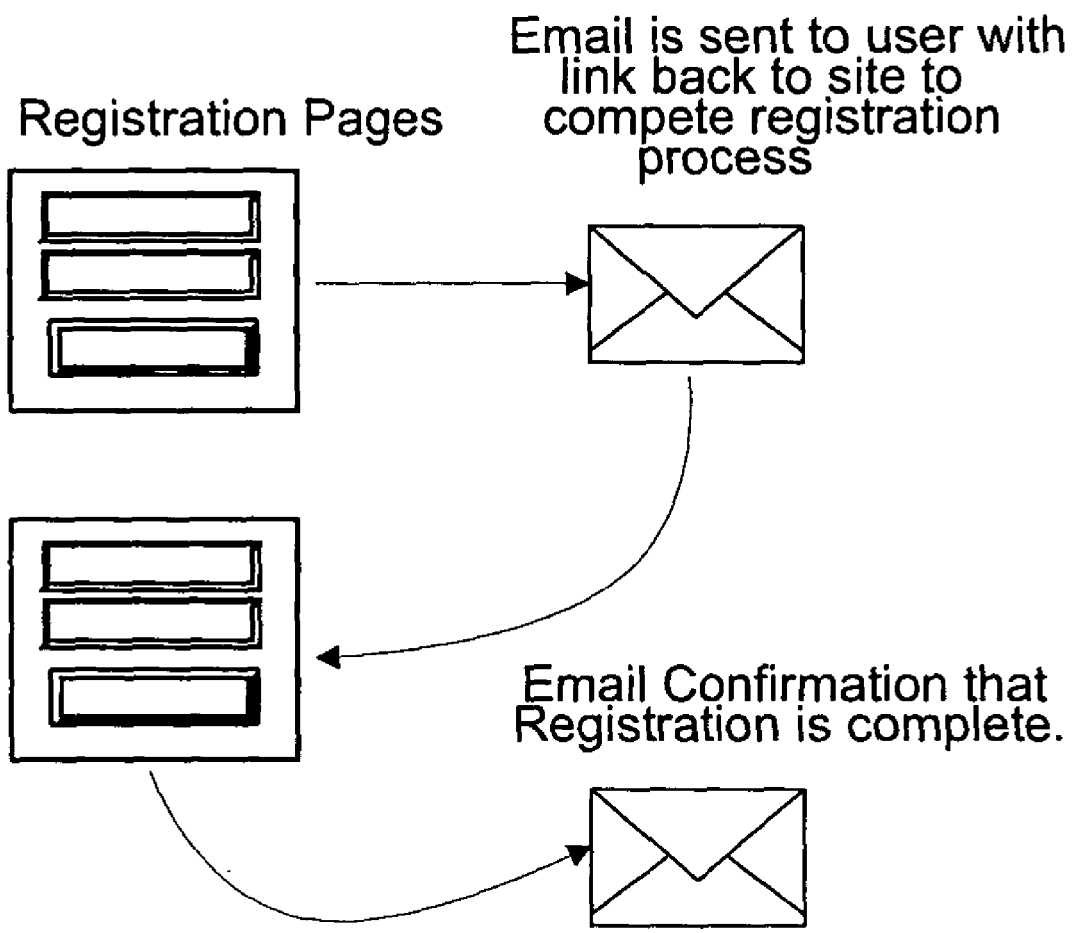
FIG. 1B shows example registration security check functionality.

As shown in FIGS. 1A and 1B, in one exemplary illustrative implementation of system 50, bidding on auction-style listings is straightforward. Bidders can access system 50 by pointing a web browser to a home page (FIG. 1A block 602) and searching listings (block 230) geographically by e.g. inputting their ZIP codes to retrieve (block 230a) specified types of items located close to them. Other searches (e.g., non-geographical item descriptions) are also possible. Bidders may view a detail page showing details such as photographs and text descriptions of the item and the auction-style listing associated with the item (FIG. 1A block 604). Once registered, bidders enter their bid amount on the auction-style item detail page (block 232). At this point, registered bidders may log in (block 606) and unregistered bidders may register (blocks 234, 236). They will then be asked to enter their email address and password (block 238, part of "log in" block 606). A bidding form is displayed that notifies the bidder that he or she is making a binding offer (although not necessary in the legally-enforceable contract sense) to purchase the item subject to the item and terms of sale being accurately described in the listing by the seller (block 240). Conditional listings are also possible which condition the binding nature on some condition precedent (e.g., successful inspection of the item). Sellers may be provided with an option to list in a final and binding format which may require bidders to accept items "as is" if they are the winning bidder. Sellers may generally be encouraged to use conditional listings to encourage high bidder participation rates. Buyers may review their bids (block 606) before completing and submitting them (block 608). Before placing a bid, buyers may contact the seller via email if they have any questions (block 610).

High proxy bid amounts are displayed in one exemplary arrangement, on the auction style listing in as close to real time as possible. The high bid may be displayed with the high bidder's chosen user name. All bidders are encouraged to protect themselves and may be educated in what "free" or low cost services are provided, e.g., item history reports, third party inspections, service contracts, transaction insurance, mediation and transportation services.

Bidders may be able to bid any amount above the seller's pre-set minimum bid. In the event a bidder's bid is higher than the seller's minimum sell price, both parties may be notified that they have reached a binding price by an indicator within the listing (seller's minimum price met notice). Both high bidder and seller will also be notified if a subsequent higher bid is submitted (an outbid notice). The previous high bidder may have the option to return to the listing and submit a higher bid. Bids near the end of an auction-style listing (e.g., within the last five minutes) may automatically extend the duration of the listing for another pre-set period (e.g., another five minutes). Each subsequent bid in the extended listing time may extend the auction time by another pre-set time period to ensure the most efficient price has been reached and to discourage "sniping."

"Purchase now" functionality may allow sellers to set a purchase now price which, when met, closes an auction-style listing automatically. "Purchase now" may be available to all sellers free of charge. "Purchase now" prices can be equal to or above an item's minimum price, and disappear once an item's minimum price has been met.

Proxy bidding may in some implementations be used to record a bidder's maximum bid amount and to automatically bid for bidders only to the point where they have beaten the next highest bidder. Proxy bids that meet the seller's reserve may result in the bid matching the reserve price and notifying buyer and seller that they have reached an agreeable price. Bidders may be allowed to out bid themselves (e.g., set a higher maximum bid amount). Proxy bidding may be augmented by an auction-style management interface and update emails providing buyer and seller with near-perfect information on bidding activity and how close the maximum bid amounts (e.g., rather than the publicly displayed proxy bid amounts) are to reaching an agreeable price. This mechanism encourages many additional potential transactions to occur because buyer and seller are informed that they are relatively close in price. In one exemplary arrangement, bidders are not able to retract bids whereas sellers have the option of canceling bids.

Users who bid and win auction-style listings and are reported as "dead beats" may be suspended from using system 50. Merely failing to complete a transaction is preferably, in one exemplary arrangement, not sufficient grounds for suspension (e.g., the item may have been misrepresented, extra unexpected fees may have been tacked on, etc.) Not responding to repeated attempts at contact by the seller after a successful auction may be cause for suspension.

System 50 also provides "blocked bidders" page freezed by sellers to specify (and unspecify) particular bidders that the seller blocks from bidding on auction-style listings. The seller may add and delete bidders at will from this list.

Shill bidding is preferably forbidden and aggressively policed. Functionality is provided to track bidding patterns (a bidder who frequently bids on a seller's listing), IP address recognition and other tracking ability to link sellers who register with a separate bidding ID to bid on their own vehicles. Shill bidding may result in automatic suspension from using the auction-style listings and cancellation of all outstanding listings by the seller with no credit for listing fees.

Figure 2:
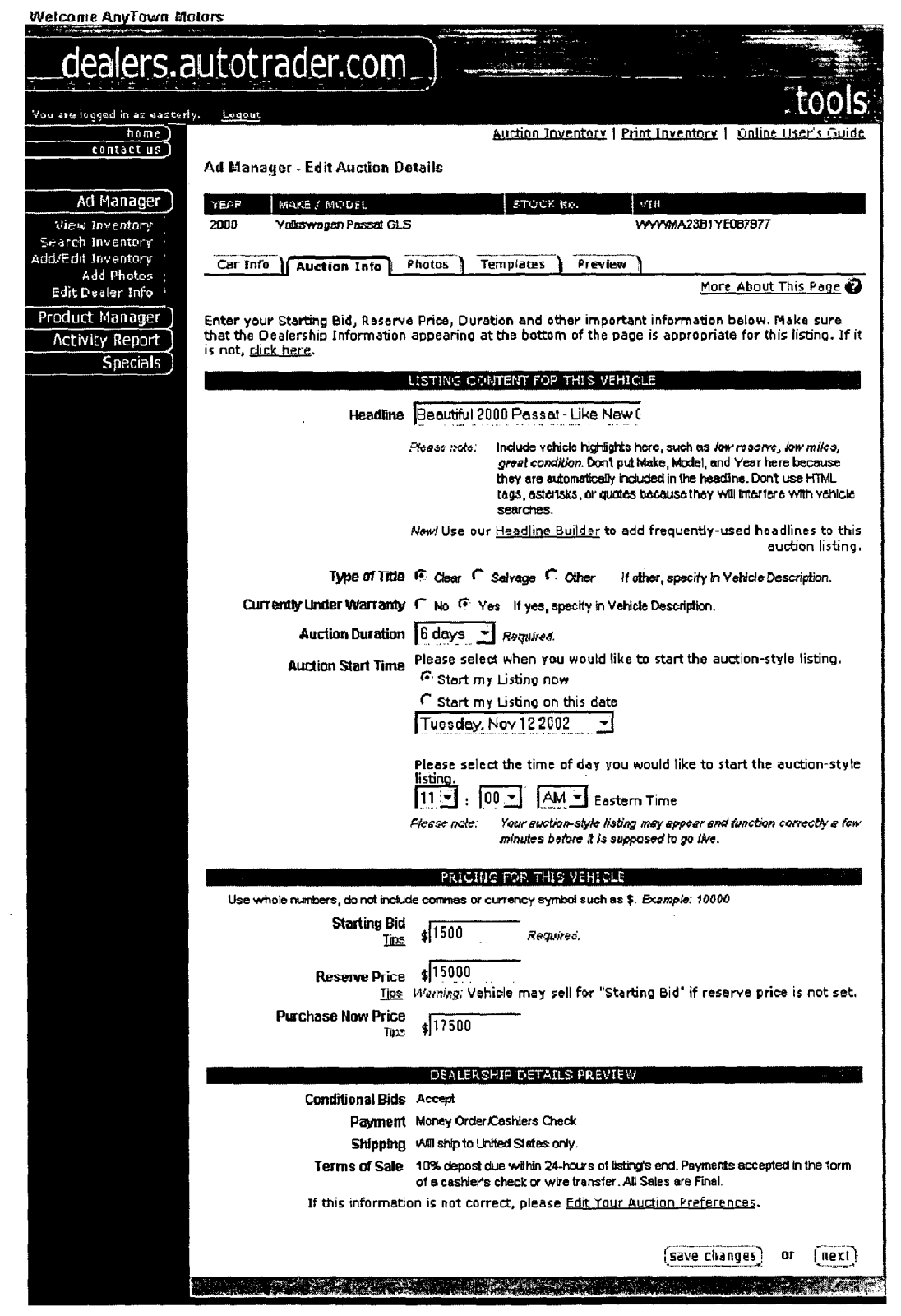

The FIG. 2 exemplary display is used by a seller to input various information about an auction-style listing including for example item description, auction duration and start time, starting bid, minimum price, purchase now price, whether conditional bids are acceptable, and other information (see block 302). Sellers can set up preferences and defaults for such items in advance using a "Edit your Auction Preferences" feature.

Figure 3:

FIG. 3 shows an exemplary seller input screen for allowing a seller to upload and preview photographs and associated captions for an auction style listing (see block 304).

Figure 4:
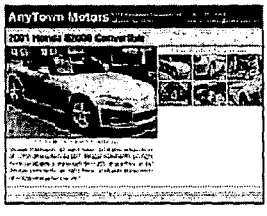

FIG. 4 shows an exemplary screen a seller can use to select or customize a template for the formatting/appearance of auction style listings (see block 306). In the exemplary embodiment, sellers are allowed to customize their own templates by inputting html, xml or other markup language tags, and may access a description builder tool to create a description and associated format.

Figure 5:

FIG. 5 shows an exemplary screen a seller can use to preview an auction style listing the seller has inputted (see block 308).

In one example implementation, once the seller has inputted all the information for an auction style listing, the seller may be asked to log in (block 612) (if not yet registered, the seller may be asked to register at block 236*a*) and agree to pay (or be billed by credit card or other payment mechanism) for the new listing (block 614). System 50 acknowledges the new listing and the payment (block 616).

Figure 6B:

FIGS. 6A and 6B together show an exemplary finished auction style listing that has been inputted into system 50 for display by users 90 via appliances 100 (block 310, FIG. 1B). Users 90 can access the screens shown in FIGS. 6A and 6B to place bids and/or to send a communication via email or other medium to the seller.

Manage Inventory

Figure 7:
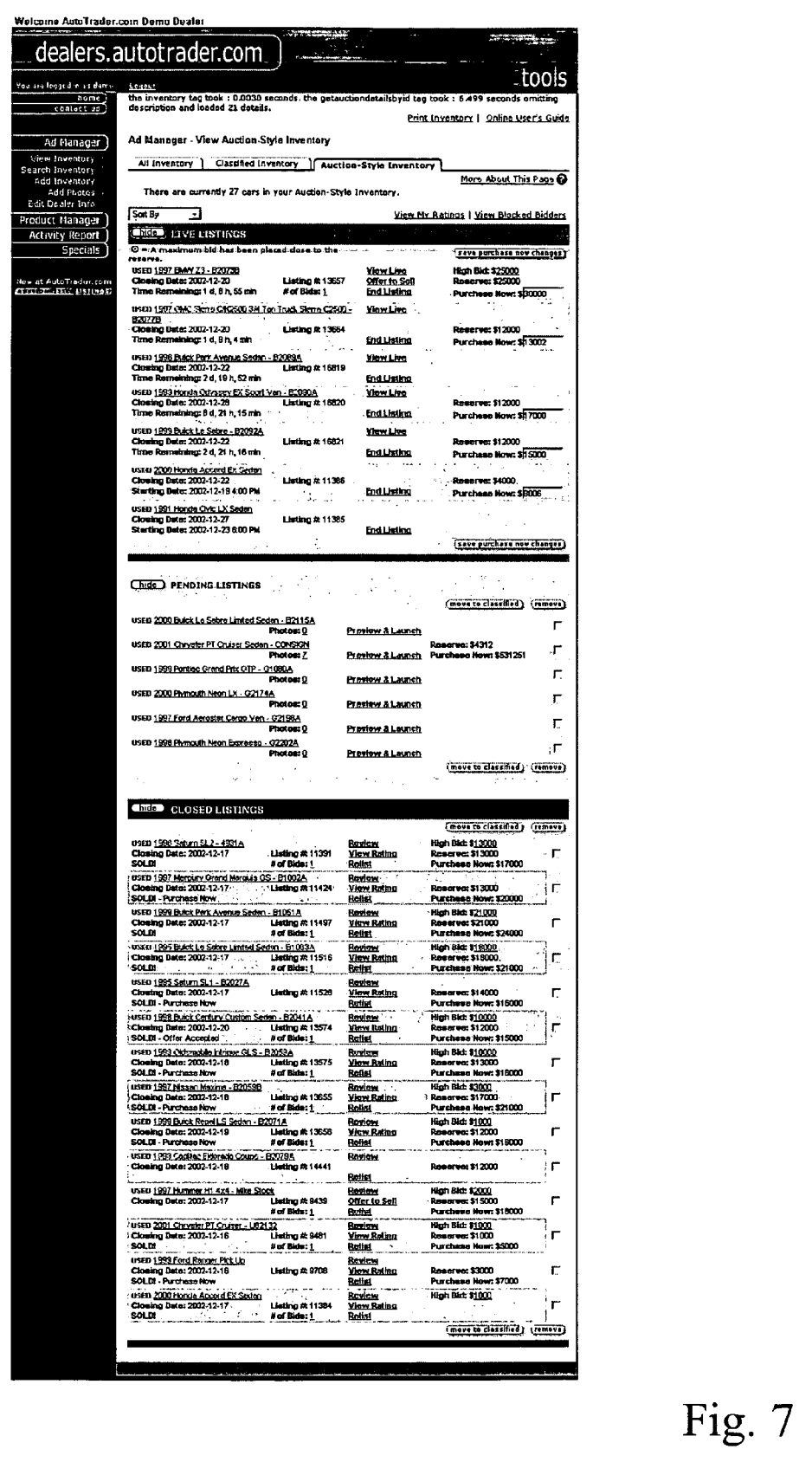

FIG. 7 shows an exemplary screen a seller can use to manage inventory (seller tools 308 of FIG. 1) that he or she has placed for auction-style listing using system 50. The exemplary display shows illustrative live listings, pending listings that have not yet been activated but are scheduled, and closed listings that previously were offered. The seller can easily select and move an auction-style listing into a classified style listing and vice versa.

The following describes a particular non-limiting example of how a seller might manage listing inventory and place and maintain an auction-style listing a Jeep Wrangler:

FIG. 7A shows an additional manage inventory page. Along the left-hand side of the page there are various options including "view inventory", "search inventory", "add inventory", "add photos", and "edit dealer info". In this particular example, the "view inventory" page is displayed with the "all inventory" tab selected to show all of the dealer's inventory stored in database 106*a*—both classified inventory and auction-style inventory listings. In this particular example, pull-down menus may be selected to "show all cars", "show used cars" or "show new cars". The resulting list may be sorted by first and second criteria selectable through using the pull-down menus based on a number of different characteristics including for example:
- New
- Used
- Year
- Make/model
- Stock number
- VIN
- Number of photos
- Status
- Source
- Price
- Other.

The list displays a variety of information as shown with embedded hypertext links that when selected bring up the "edit item info" page (also reachable under "add inventory" shown in FIG. 7D. The FIG. 7A page shows the dealer or other seller's entire inventory (both classified ads and auction-style listings). An exemplary illustrative implementation shown, the "ad manager" becomes the source for the entire inventory, ads and listings appearing there until they expire or are removed from inventory. Sellers may remove inventory from this page or renew listings for additional time periods. Note also in FIG. 7A the "source" indication that would indicate how the item was inputted to system 50 (e.g., via certified feed, an inventory polling system, via a window sticker company or other third party, etc.).

As shown in FIG. 7A, in this particular illustrative implementation the items are displayed in rows based on certain description information. However, in the exemplary implementation it is possible to change some of the information displayed in the rows. For example, the sixth column can be user-content-selected using a pull-down menu to display any of the following information: status, source, color, mileage, body style, expiration date of listing, price, or photos pending (how many photos have been uploaded but are not yet displayed). Similarly, the next column is user-selectable. The most right-hand column allows the user to select any or all of the rows (e.g., to remove the listing from the database). One particular implementation, one of the two content-selectable columns includes an "edit price" selection that displays the seller's minimum set price for each of the items listed in a format so the user can change those prices and then save the price changes. This allows the seller to change minimum prices at any time—even in the middle of an auction-style listing.

Figure 7B:
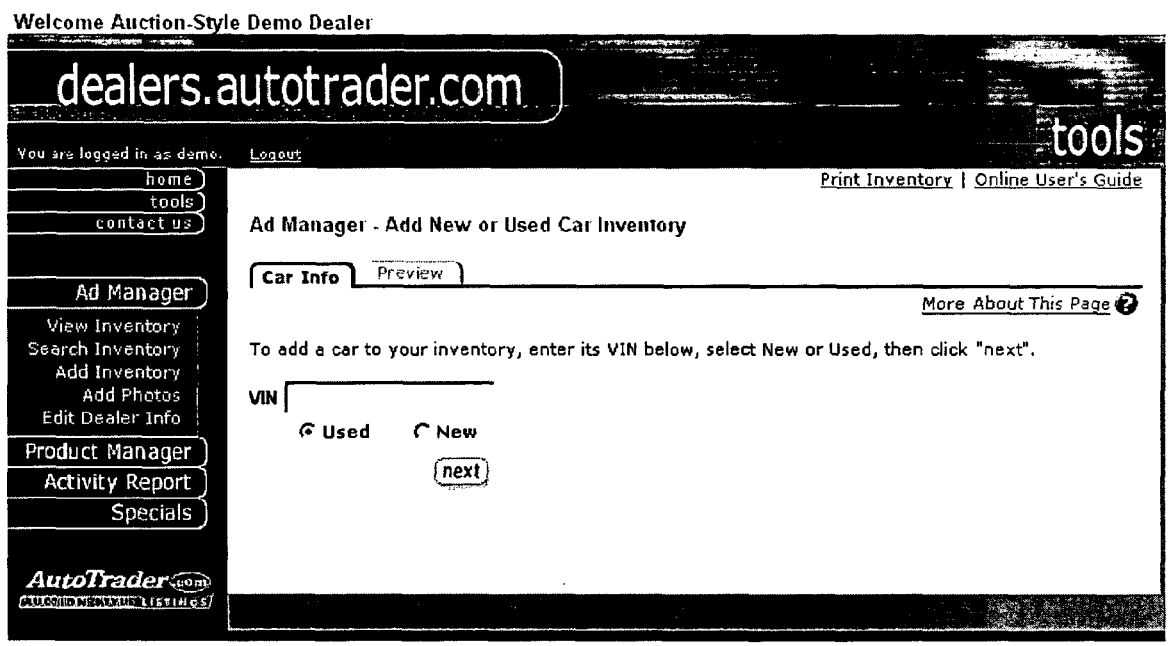

Clicking on the "ad inventory" link in this exemplary illustrative implementation moves the seller to the exemplary page shown in FIG. 7B. In this particular example, the item to be added is a motor vehicle and so the user is prompted to add the full vehicle identification number for that vehicle and to specify whether the vehicle is new or used. In an exemplary embodiment, the inputted vehicle identification number is decoded to insure it is valid and if it is not valid an error message is generated. Assuming the seller inputs a valid vehicle identification number, system 50 decodes the vehicle identification number and partially fills in the "edit car info" page shown in FIG. 7C. The seller is asked to specify the various different additional descriptions of the item, in the case of a motor vehicle information such as, for example:
- Trim level
- Stock number
- Mileage
- Retail Price
- Exterior and interior colors
- Color description
- Doors
- Stereo
- Engine
- Fuel
- Body style
- Drive train
- Transmission
- Installed options
- A free formed text comment
- Other In one exemplary arrangement, "comment builder" assists users in preparing comments by displaying a list of prepared comments. The user can click on any of the prepared comments displayed in this window and the selected comment will be inserted into the comment window. The user can save his own customized comments for later use in a personalized comment builder if desired.

Any of these fields are searchable by users looking for items. For example, in the context of a motor vehicle search, users may be able to search based on mileage, retail price, exterior color, number of doors, engine, body style, transmission, etc.

Figure 7C:
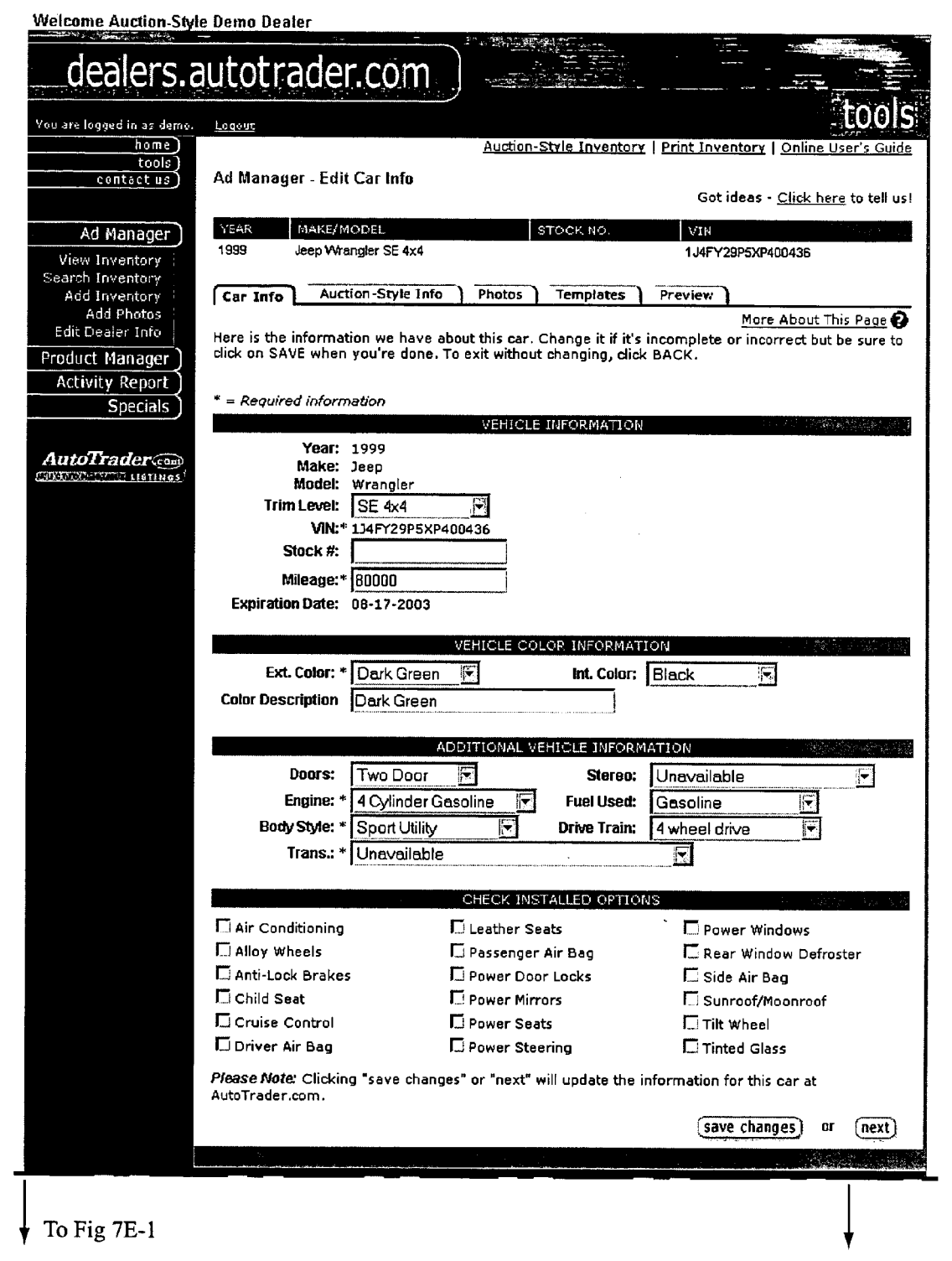

As shown in FIG. 7C, the seller is also able to at this point upload a main photo by "browsing" his local hard disk or other storage device and specifying a file name of an image format photo for display as the primary photo of the listing. After the seller has completed all of this information, he or she hits the "next". If the user has not filled in all of the required fields, an error message appears which requires the user to return to the page and complete the required information and try again.

Once the seller has completed all of the information, hitting the "next" button brings up a preview page as shown for example, in FIG. 7D. If everything looks good, the user can hit the "save changes" button and the item will be added and the user will be returned to the main inventory list. In the case of an optional feature to add multiple photos, all photos will be displayed on the "preview" page in one exemplary illustrative implementation.

At the bottom right-hand corner of FIG. 7D there are two buttons, one reading "click here to create an auction-style listing" and the other reading "click here to save as a classified listing". If the user selects classified, the information is saved into a classified-style listing. If the user selects auction-style listing, a page such as the one shown in FIG. 7E is displayed. This page prompts the seller to add auction-style information such as starting bid, minimum price, duration, and other information. In the context of a motor vehicle auction-style listing for example, the user may be asked to provide the "headline" (which also uses a headline builder if desired to add frequently used headlines). In this particular example, the user is also requested to specify a title type, whether or not the vehicle is under warranty and to select a listing duration (e.g., 3 days to 10 days). The user may also specify when to start the listing (e.g., immediately, or on a date and time certain that the user can selectively program. The user is also requested to input a starting bid (bids lower than this amount are not accepted) a minimum price (optional—the price below which the seller will not be obligated to sell the item—this will not be revealed to anyone) and a "purchase now price" (the price at which the seller is willing to immediately cancel the listing and sell the item at). In an exemplary implementation shown, the seller may also select between accepting conditional bids and selecting final and binding bids. A conditional bid in this context is a bid that is subject to a satisfactory inspection of the vehicle (a winning bidder in a conditional listing is obligated to inspect the item but not to buy it). The final and binding bid is one that obligates the winning bidder to buy the item at that price no matter what. Bidders are encouraged to satisfy themselves as to the condition and history of an item before making a final and binding bid. The user may also modify the terms of sale to customize them for particular reasons. Such terms editing will cause display of the "edit dealer info" screen shown in FIG. 7F. Such preferences may include for example payment type, shipping arrangements, customized headline and description builder info, standard disclaimer, and other information.

Figure 7G:
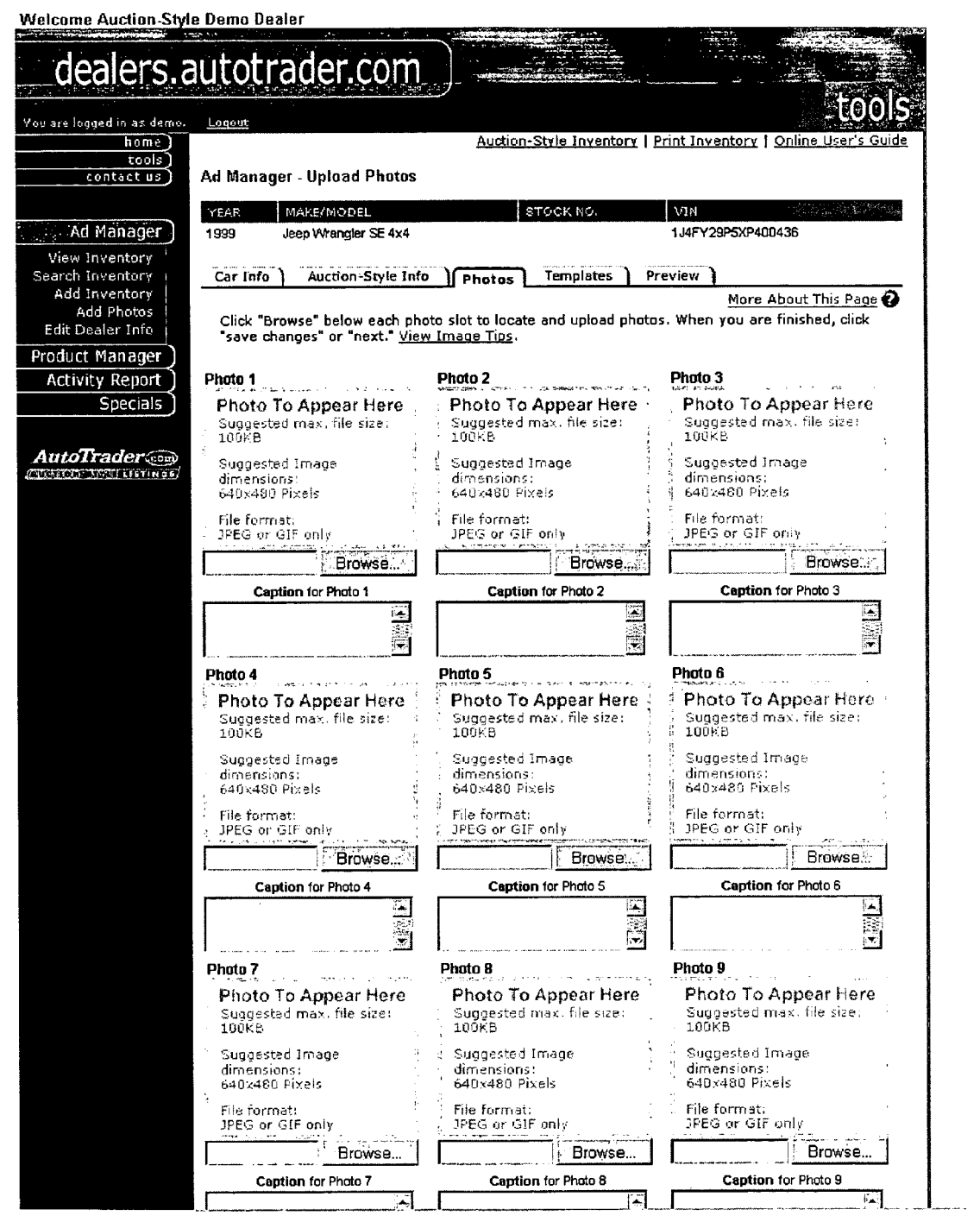
Figure 7H:
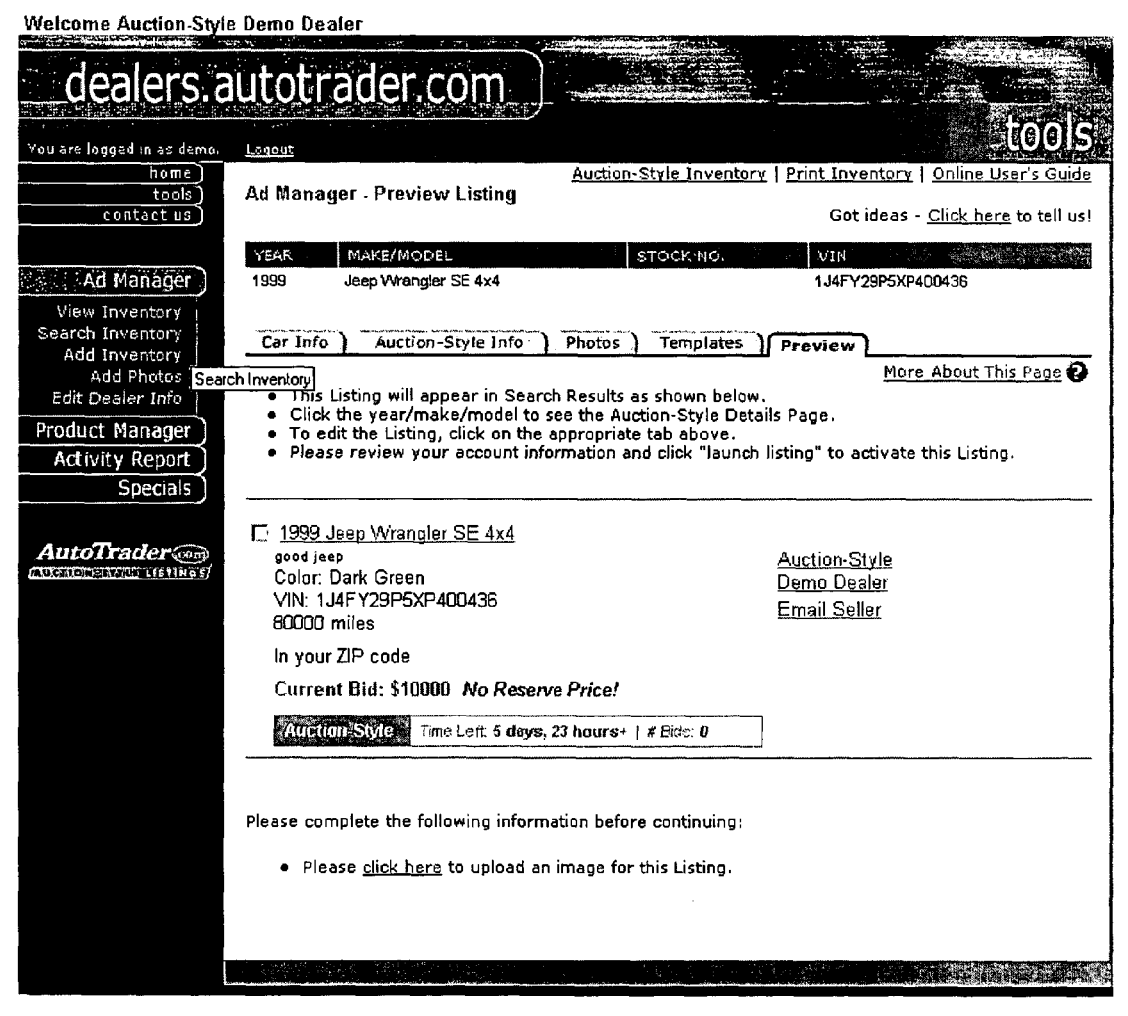

Once the user is satisfied with the auction-style information inputted, the user may select the "next" button to display an "upload photo" page of the type shown in FIG. 7G. In this particular example, the seller is able to upload as many as nine different photos and associated captions (e.g., to emphasize selling points or defects) using this page. The selection of the "next" button in the exemplary illustrative implementation brings up display of "auction-style template" page (FIG. 7H) that allows the seller to choose a template type and a description. In this context, templates are pre-designed formats for listings. The user may simply click on a particular template that has been pre-designed, or the user may design his or her own template by entering description and images, adding photos, etc. In the exemplary implementation, the user is permitted to input HTML or other markup language used to create web pages, and can use description builder to help specify text.

Figure 7J:
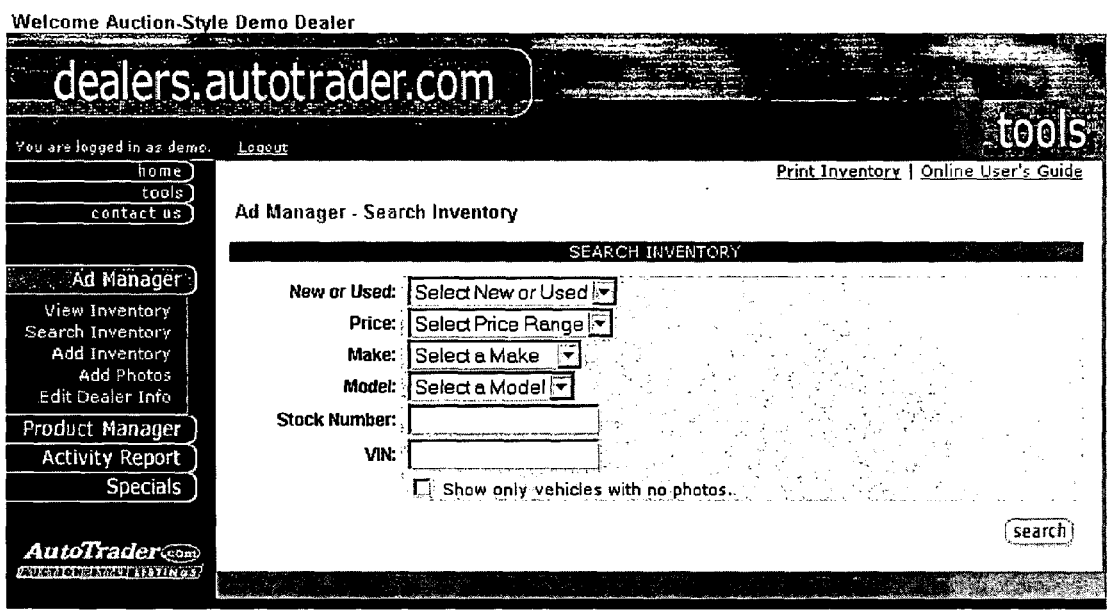
FIG. 7J shows an example seller inventory search.

In the exemplary implementation, clicking on the "next" button brings up a "preview listing" page of the type shown in FIG. 7I that allows the user to preview the listing, review billing information and activate the listing. The listing is displayed in this exemplary implementation as it will appear on the "search result" page used by users to search for vehicles. To see the listing's auction-style vehicle details page, one clicks on the item line. This page may also provide listing pricing, package deal, overage and other information. FIG. 7J shows an example listing preview (which may be displayed in a separate window if desired). If the user is satisfied, he may click the "launch listing" button to activate the listing.

FIG. 7J shows an example "search inventory" page that allows users to quickly search listings based on various criteria and provide customized sorting of results. Users may also print inventory at any time. In addition, sellers may edit their own contact information using "edit dealer info" functionality. Once again back to FIG. 7, the "view auction-style inventory" summary page shown there for the exemplary illustrative implementation displays all of the seller's listings broken down by type (live listings, pending listings, closed listings). The exemplary live listing display area allows the seller to go right to item description by clicking on the corresponding hypertext link to bring up the item detail page. The information displayed also includes closing date and time remaining for the auction-style listing, the number of bids and may also provide additional optional displays of "view live", "offer to sell", and "end listing". The seller can view bid history by simply clicking on the number of bids or on the high bid value if one is displayed. The seller may e-mail a high or winning bidder by clicking on the "e-mail" link on the bid history page. The seller may end a listing any time by clicking "end listing." The seller may create an offer to sell by clicking "offer to sell" next to a listing (the "offer to sell" option is displayed once there is at least one bid). The seller may also edit a listing if no bids have been made on the item. The seller may edit the "purchase now" price at any time by simply entering a new price and clicking on "save purchase now changes." The seller may append additional information to an item but may not edit the original once a bid has been placed. The seller may also remove listings at any time by simply clicking on a check box and clicking "remove." The seller may switch pending auction-style listings to classified ads by simply checking on check boxes and clicking "move to classified." The seller may re-list a closed listing by simply clicking "re-list." The seller may "view my ratings" at any time by clicking on that option which will bring up a display of the type shown in FIG. 19.

Example Search, Select and Bid

Figure 8:
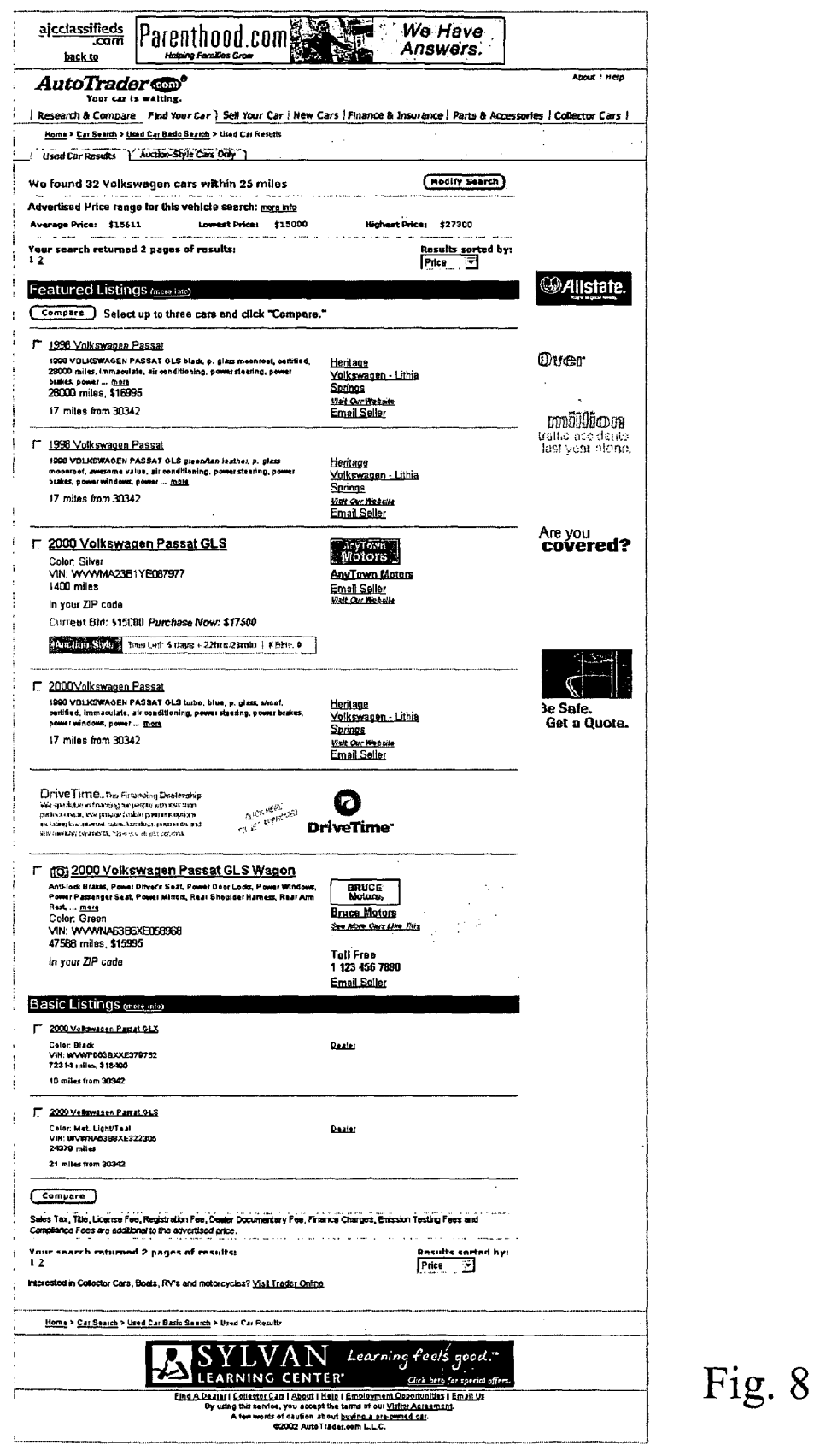
Figure 9:
Figure 10:
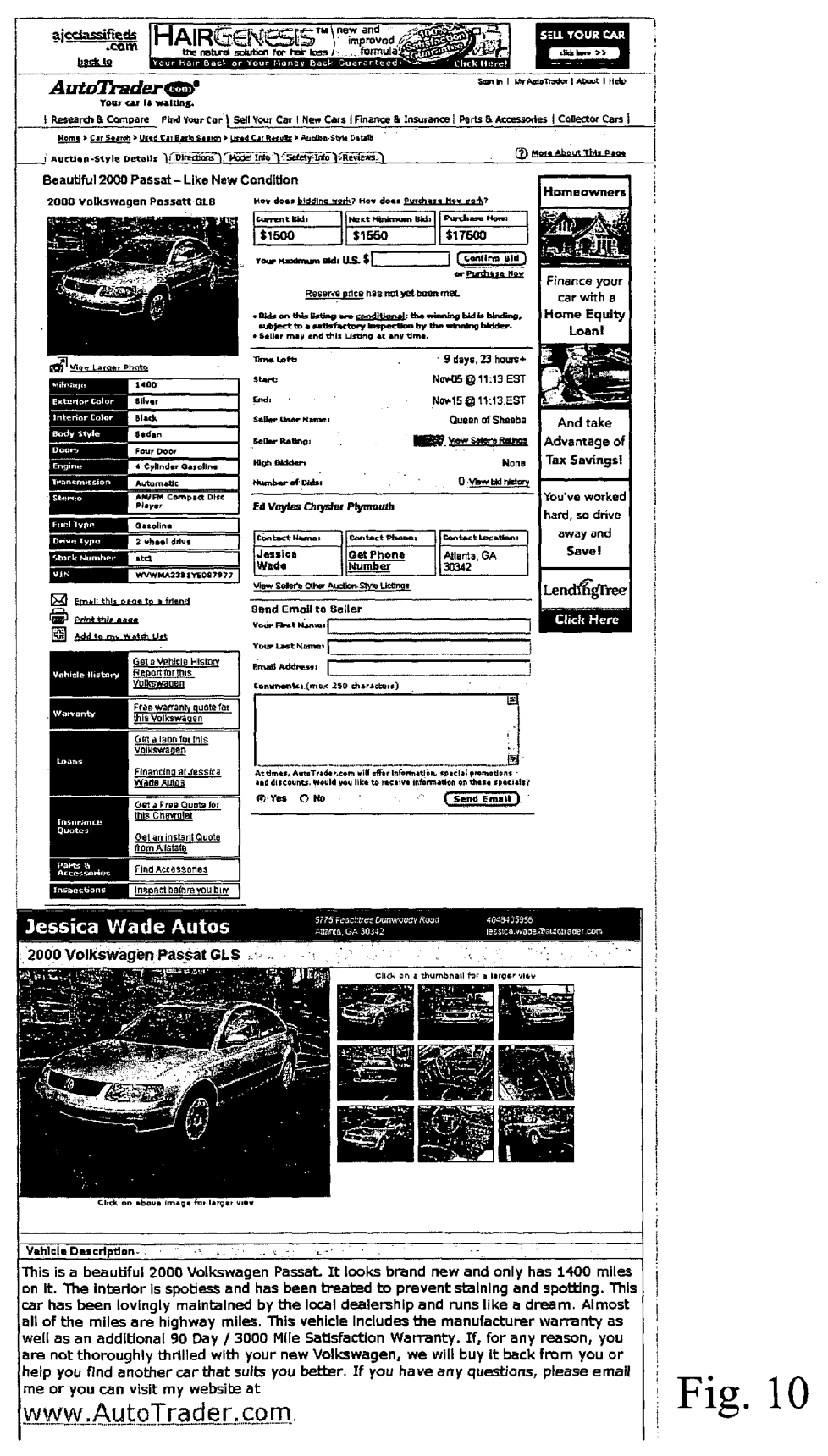

FIGS. 8-10 show example screens a user 90 can use to search and select item listings for review and bidding (FIG. 1A block 230). The user 90 can search for and display both classified and auction-style listings (see FIG. 8) or he or she can search only for auction-style listings (FIG. 9). Searching can be conducted by geographical proximity based on ZIP code for example, by item type or description, both, or based on other criteria. For example, in the context of a motor vehicle search:

make/model/year,
distance from buyer's ZIP code,
certified pre-owned,
body style;
color,
mileage,
doors,
engine,
fuel type,
drive type,
transmission,
other.

Search results can be compared automatically to provide a spreadsheet of equivalent information.

In one exemplary non-limiting implementation, ZIP code based searches are particularly advantageous because they facilitate the ability of potential purchasers to inspect the item and meet the seller.

FIG. 10 shows an exemplary auction style listing screen allowing the user 90 to submit a bid and/or email or otherwise contact the seller. Any number of additional photos or descriptive information may be appended to FIG. 10.

The exemplary illustrative non-limiting auction-style details page shown in FIG. 10 gives information about the item, the seller, current bidding and miscellaneous topics. In the exemplary illustrative implementation, the item's photo appears below a buyer-specified headline. To enlarge the photo, the user can click on "view larger photo." The summary of important details about the item are displayed immediately below to see more details, the user can scroll down the page. Multiple photos of the item may appear in thumbnail form. The user may click on any photo to see it larger. A photo caption may appear below each large photo. The seller's description "why buy from me" statement and terms of sale are displayed below the photos. The seller's user name and seller rating are also shown on the page. In the exemplary illustrative embodiment, the seller rating is shown as a number of stars with a maximum of five. In the illustrative non-limiting implementation, if the seller has fewer than five ratings, the word "new" appears. To see ratings in detail, the user simply needs to click on "view seller's ratings." The page also provides an easy way for a prospective buy to contact the seller by clicking "get phone number" or using the "e-mail seller" form. The location of the item is displayed under "contact location." The prospective purchaser can view the seller's other auction-style listings if any, by clicking on "view seller's other auction-style listings." The exemplary illustrative FIG. 10 page shows "current bid", "next minimum bid" and "purchase now." The current bid and next minimum bid amount may increase dynamically on line if other bidding activity is occurring. Notes show whether the seller's reserve price has been met, and whether bids on the listing will be final and binding or conditional.

If the prospective buyer wishes to place a bid, he or she enters an amount in the "your maximum bid" field box and clicks on "place bid." In the illustrative implementation, the bid is not yet final when the user clicks on "place bid"—the user has another chance to review it later. The exemplary illustrative arrangement, a winning conditional bid simply obligates the bidder to inspect the item (and to complete the purchase if the item is as described in the listing). A winning final and binding bid obligates the bidder to buy the item. Bidders choose the maximum bid they are willing to make for the item. This amount is kept secret. In one exemplary arrangement, the auction-style listings use a bidding system called proxy bidding. This system places bids on the bidder's behalf up to their maximum bid. The system 50 only ever bids the minimum necessary to make the prospective purchaser the high bidder. If the maximum bid is above the seller's reserve price, the system automatically enters a bid on the bidder's behalf equal to the reserve price. If the seller has set a reserve price (a minimum selling price) the system 50 can detect when a bidder is going to pay an amount for a car that is close to what the seller wants. When this happens system 50 e-mails both parties and suggests they negotiate directly. However, under such conditions, system 50 does not necessarily reveal the bidder's maximum bid or the seller's reserve price. In this example, the reserve price is set by the seller and typically represents the lowest amount they will accept for the item. The seller has no obligation to sell the item in response to a bid unless it equal or exceeds the reserve price. If a listing has no reserve price, the seller must sell the item at the winning bid price no matter what that may be. In one exemplary embodiment, system 50 indicates whether or not the reserve price has been met but may not necessarily make the reserve price public. The bidder with the highest bid outbids all others. Other bidders are notified when they are outbid, and can bid again. The highest bidder at the listing's end wins. If the seller has set a reserve price then the winning bid must also be at least equal to the reserve price. If it not, the seller need not sell to the winning bidder.

In the FIG. 10 exemplary illustrative page, the table at the center shows the time left in the listing's start and end times. Listings may end early or they may be extended. The current high bidder's user name is also shown above the "number of bids" made on the listing. The page also indicates if the current user is the high bidder. Additional tabs on the top of the page can be selected to display directions to the location of the item or additional research results (e.g., model information, safety information, reviews, etc.) Table of additional buyer services (e.g., history, shipping, warranty, inspections, loans, insurance quotes, parts and accessories, etc.) are also displayed for use by the prospective bidder. The example in arrangement, since the listing format is specified by the seller, the seller may include a variety of additional information about itself including for example, photographs of its dealer location etc. The prospective bidder can also select a "bid history" display which displays some of the information from the top of FIG. 10 along with an entire history of all bids placed.

As one example of how bidding works suppose Scott is selling an item auction style. He sets a starting price of $5,000.00 and a reserve price of $7,000.00. Vicky enters a maximum bid of $6,000.00. Hers is the first bid, so the system bids the starting price: $5,000.00. Nathan then enters a maximum bid of $8,000.00. Because Nathan's bid is above Scott's reserve price, the system enters a bid equal to the reserve price. Nathan is now the high bidder at $7,000.00 and Vicky is outbid. Because his reserve price has been exceeded, Scott is now obligated to sell his item to the eventual winning bidder. Esther then places a maximum bid of $8,500.00. Although there is a difference of $500.00 between Nathan and Esther's maximum bids, the system bids the least amount necessary to put someone ahead. The system therefore enters a bid for Esther of for example, $8001.00—and Nathan is outbid. Different increments may be used (e.g., increments of $50.00 as opposed to $1.00 if desired). Assuming there are no further bids, Esther wins with a bid of $8,001.00 (even though she is prepared to pay up to $8,500.00). Esther and Scott complete the transaction. If the winning bid had not or exceeded his reserve price, Scott would not be obligated to sell.

Suppose Scott creates a conditional listing with a reserve price of $7,000.00. Nathan bids on the listing. He understands that a winning bid obligates him to inspect the item and, if it was accurately described in the listing, to purchase it. When the listing ends, Nathan's bid of $7,050.00 wins. He contacts Scott and arranges to inspect the item. Nathan inspects the item but is concerned about some defect that was not mentioned in the listing. He concludes that the item was not accurately described in the listing and decides not to buy it. He immediately tells Scott. Scott offers to fix the item free of charge and offers Nathan an additional free premium. Nathan agrees. Scott has the item fixed and they complete the sale.

At auction-style listing end, system 50 in one exemplary arrangement delivers to the seller the contact information for the winning bidder (should one exist) and also allow the seller to access contact information (e.g., via email only) for non-winning bidders. Winning bidders' name, phone number, email address, city and state may be revealed to the seller.

Encouraging Out of Channel Negotiation

The illustrative implementation is designed to create a dynamic priced negotiation mechanism—i.e., a haggling tool for the buyer and seller. Auction-style management tools 211 in exemplary arrangement present nearly perfect information on buyer-seller activities in the marketplace without removing the protections inherent in a proxy or other bidding system. Proxy bidding (e.g., the system bids for the bidder up to a maximum amount specified by the bidder) may be used but with an additional layer of information delivered to buyers and sellers when they near a transaction. As an example, if a bidder's maximum actual bid is $10,000 and a seller's minimum sell price is $11,000, proxy bidding could make public a bid of only $5000 (enough to outbid the next highest bidder). System 50 may initiate a notification function to give both high bidder and seller an indication (but not actual numbers) letting them know they are close to an agreeable selling price. This communication can be facilitated by both email and by notifications within the bidder's and seller's login-protected auction-style activity pages. The fact that the auction-style marketplace provided by system 50 allows near-perfect information is desirably clearly stated in user agreements, buyer-seller frequently asked question reports (FAQs) and elsewhere to make it clear that proxy bids are not necessarily perfectly private.

Exemplary illustrative system 50 also allows sellers to make an offer to high bidders during an auction-style listing and to multiple bidders once an auction-style listing is closed. Such seller offers take place in the background, invisible to other bidders and sellers using system 50. If a bidder accepts the offer, the auction-style listing can be updated to indicate the winning bidder, the final price and the time of sale. Any "purchase now" offer on a listing with a live seller offer outstanding is preferably disabled in one exemplary embodiment to prevent two bidders from purchasing the same item.

System 50 may also in one exemplary arrangement allow sellers to change their "purchase now" price during an auction-style listing and/or accept an existing bid that has already been placed if it is above the seller's minimum price, ending the auction-style listing at that price. System 50 may also allow sellers to cancel bids from individual bidders and/or block bidders from bidding on their items.

In a case where a seller and buyer agree to a selling price outside the auction-style listing environment, seller tools 208 may provide sellers with a function that allows them to remove the item from auction-style listing and indicate that the item was sold to a bidder. Because there is no success fee contemplated in one exemplary non-limiting arrangement, there should be little incentives for sellers not to freely acknowledge use of the auction-style listing as a selling tool. Sellers may also elect to use a seller offer function if that bidder is the current high bidder and the auction-style listing is still live.

Sellers and buyers who transact offline may be notified that their purchase will be ineligible for ratings, but not otherwise pressured to transact online. In one example implementation, there are no penalties or suspensions implied or levied against buyers and sellers for successfully transacting offline after placing an online auction-style listing.

In one exemplary arrangement, a mechanism is used for motivating buyers to report out of channel auction-style item purchases. For example, in the context of a motor vehicle auction-style transaction setting, a limited powertrain warranty could be offered either free of charge or at a discount to buyers (whether they committed online or offline) if they communicate with system 50 to confirm their purchase within a certain amount of time. Such a warranty would allow the warranty provider an upsell opportunity on a more extensive service contract. Such a mechanism would provide buyer-side verification of the system 50's utility as an advertising/selling mechanism.

Sellers may be encouraged to work leads created during an online auction-style listing, especially in cases where the winning bidder does not complete the transaction. In one exemplary arrangement, sellers are not provided with the bidder's phone numbers unless they are the winning bidder. Subsequent bidders may be approached by the dealer via email (a less intrusive contact in general than a telephone call) and should in one exemplary arrangement not be obligated to respond.

Closeness

Figure 11:
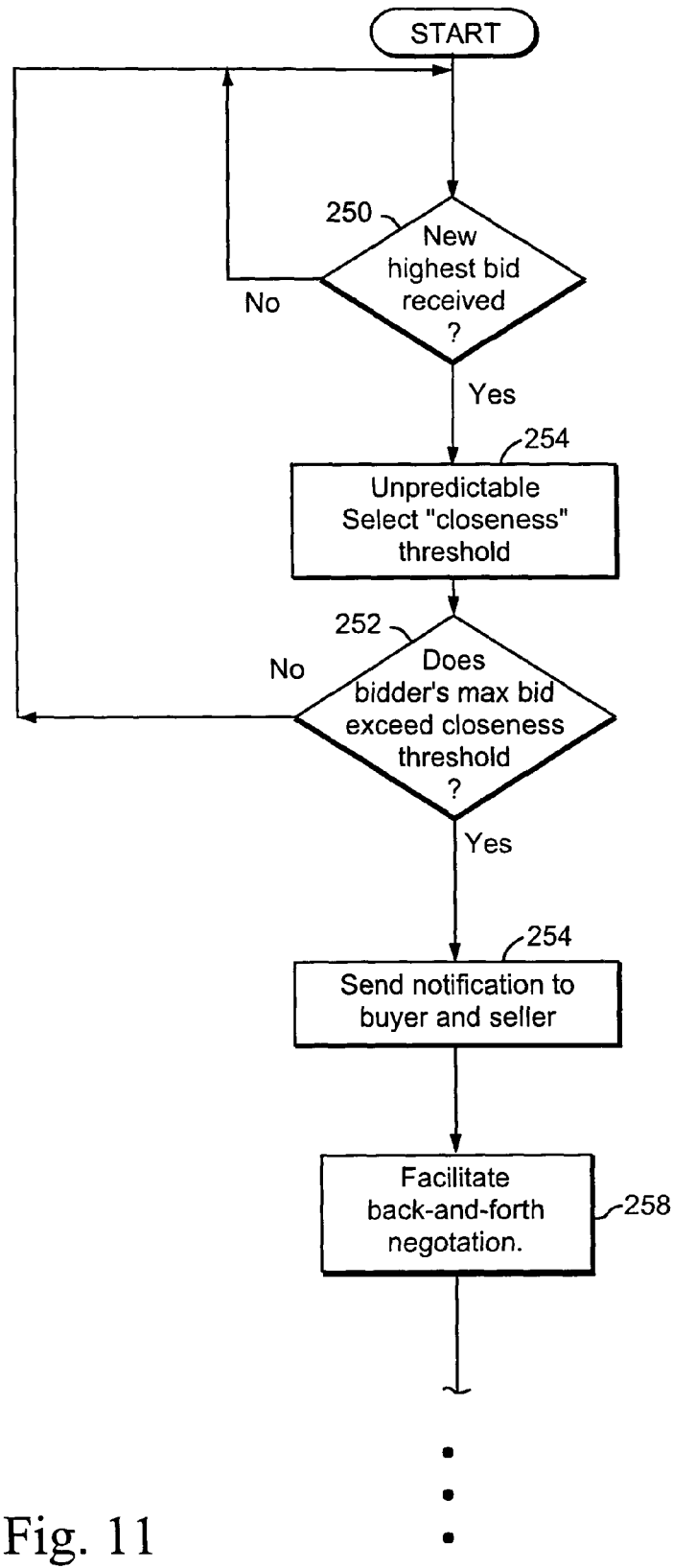
Figure 11A:
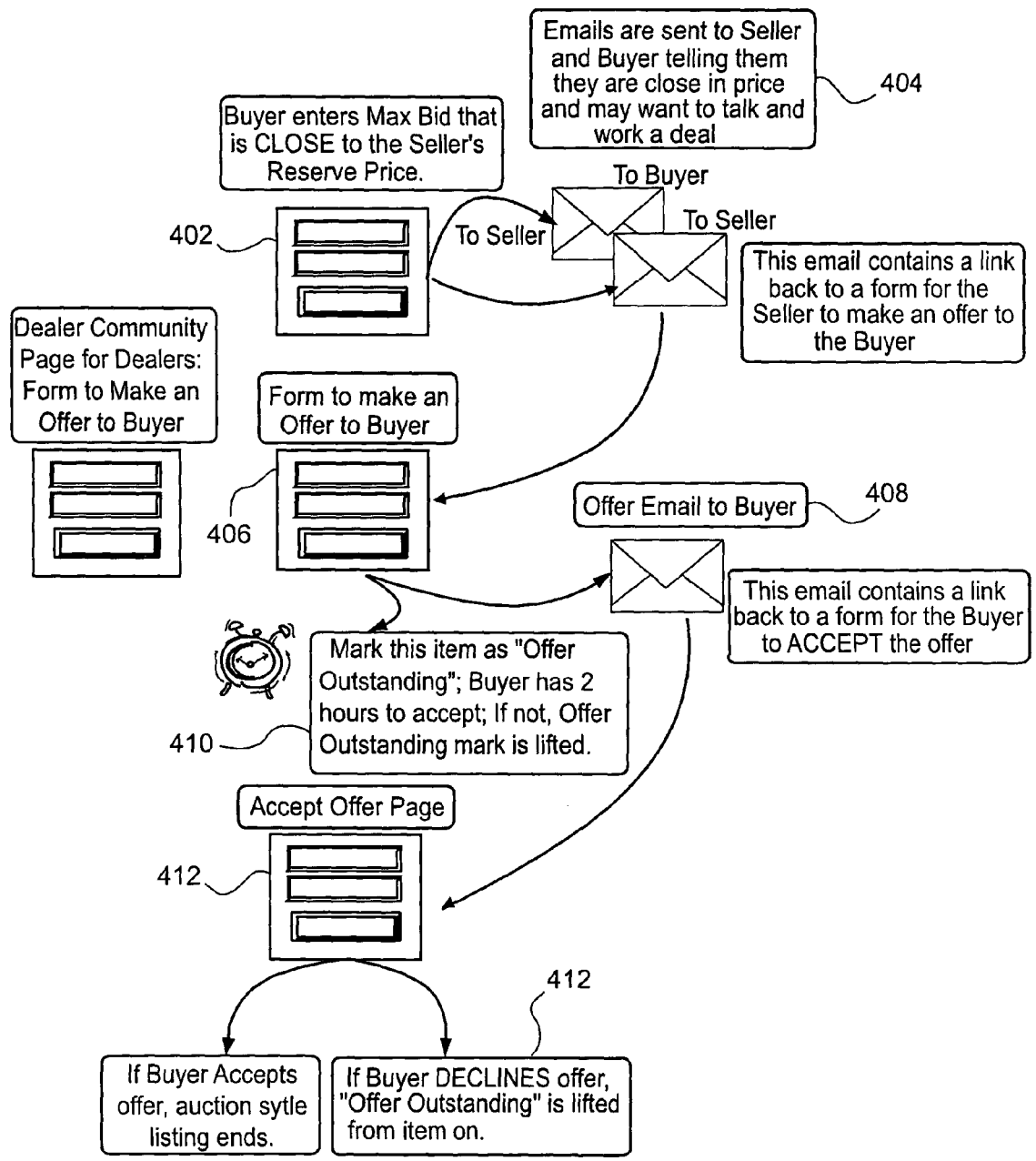
Figures 1, 11A:
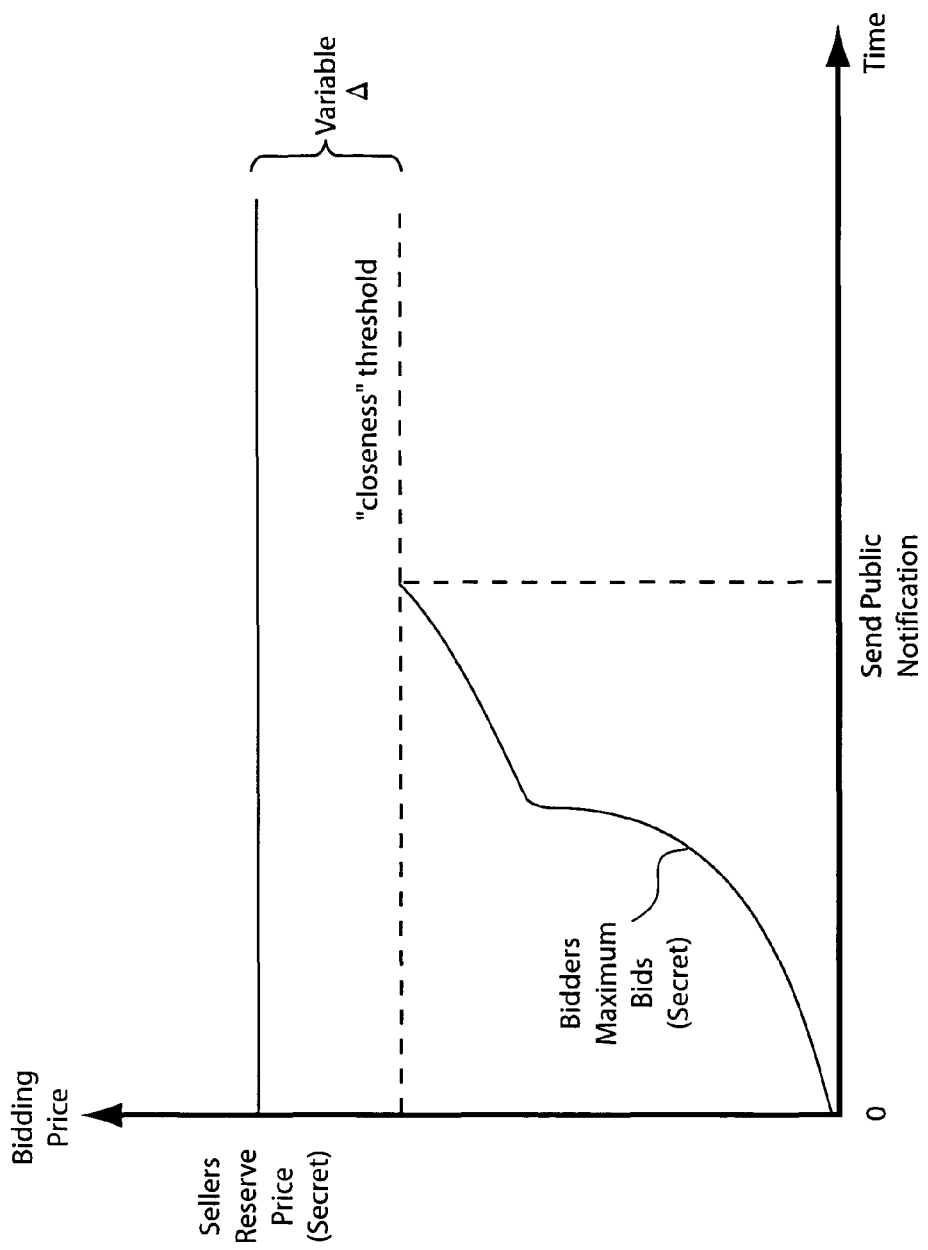

FIGS. 11, 11A and 11A-1 show how system 50 determines whether "closeness" as described above exists and associated "closeness" processing, and FIGS. 12A-17 show exemplary "closeness" associated display screens and notifications. In the exemplary embodiment, if a potential buyer submits a maximum bid (using straight, proxy or other bidding) that is "close" to the seller's minimum sell price, system 50 notifies both the seller and the high bidder that they are "close" and, in one specific implementation, encourages them to open communications with the other to try to negotiate a deal. As shown in FIGS. 11 and 11A, when a new high bid is received (block 250), system 50 determines whether the stated maximum bid is "close to" the seller's minimum price (FIG. 11 block 252; FIG. 11A block 402). Illustrative non-limiting implementations of system 50 use a randomized "closeness" threshold (e.g., some variable percentage of the reserve price) to prevent users 90 from predicting secret information. In one particular implementation, system 50 does not reveal the seller's reserve price to the potential buyer nor does the system reveal the buyer's maximum bid to the seller but only that the two are "close" without saying how close they actually are—and therefore in this non-limiting example uses two pieces of non-public (confidential) information (one piece of information that is confidential to the buyer and another piece that is confidential to the seller) to generate a "public" notification that does not reveal the underlying confidential information but simply encourages buyer and seller to contact each other to try to work out a deal. Other arrangements are possible—for example, in a straight bidding model, the bidder's high bid may be public information but system 50 keeps the seller's reserve price confidential while informing both bidder and seller that the bidder's bid is close to the seller's reserve price. Because the buyer and seller do not know exactly how close they really are, there is still room for haggling and negotiating—something that dealers of big ticket items like cars do very well. This non-confidential approach of driving negotiations outside of the online bidding context has the advantage of achieving potentially excellent results for both buyer and seller. One side effect is that it may degrade the online service provider's ability to track and/or monetize transaction completions.

In the illustrative arrangement, if the requisite degree of closeness exists ("yes" exit to block 252), system 50 displays this fact to the bidder immediately (e.g., via a "popup" or other web page notice) sends notifications (e.g., by email) to both the buyer and the seller indicating for example "you are close, you should talk and work a deal" (FIG. 11 block 254; FIG. 11A block 409; see FIGS. 12A, 12B showing illustrative emails). Additional pages accessible by buyer and seller may also be inserted to provide additional notification.

Mid Auction Functionality Including Formal Offers to Sell

In one exemplary illustrative arrangement, the seller at any time has an opportunity to issue an "offer to sell" to the potential buyer (FIG. 11A block 406), and the buyer has an opportunity to invite the seller to issue an offer to sell by sending the seller an email. To issue an offer to sell, the seller calls up a display of the type shown in FIGS. 13A, 13B (FIG. 11A block 406), and confirms the offer to sell using screens of the type shown in FIGS. 14, 15. This causes system 50 to generate a real-time (or close to real-time) email or other notification to the buyer containing the seller's offer to sell (see FIG. 11A block 408; FIG. 16). System 50 also, in one particular implementation, temporarily automatically suspends bidding on the item (FIG. 11A block 410) in response to issuance of the formal offer, to give the buyer and seller an opportunity to negotiate. If the buyer declines the seller's offer to sell (see FIG. 11A block 412; FIG. 17 email notification) or if a predetermined time expires after the seller has issued the offer to sell, system 50 resumes the listing and allows further bids to be submitted (see FIG. 17 email notification). Otherwise, system 50 allows the seller and potential buyer to communicate by email or other means to negotiate a price and close the deal e.g., by the buyer accepting the offer (FIG. 11A block 412) or counter-offering.

In one exemplary arrangement, once an offer is made an "offer outstanding" indication is added to the auction-style listing with a link to something that explains it. In a particular implementation, the auction style listing gets put on hold for a duration. If the offer is accepted, the auction-style listing ends. If the offer is not accepted, the auction-style listing continues. The seller in one exemplary arrangement comes in an closes the auction style listing when an offer is accepted. If nothing happens within a predetermined time period, system 50 takes the "offer outstanding" off of the listing and the auction-style listing continues (but in one exemplary arrangement does not extend beyond the original auction duration/time left).

Figure 11B:
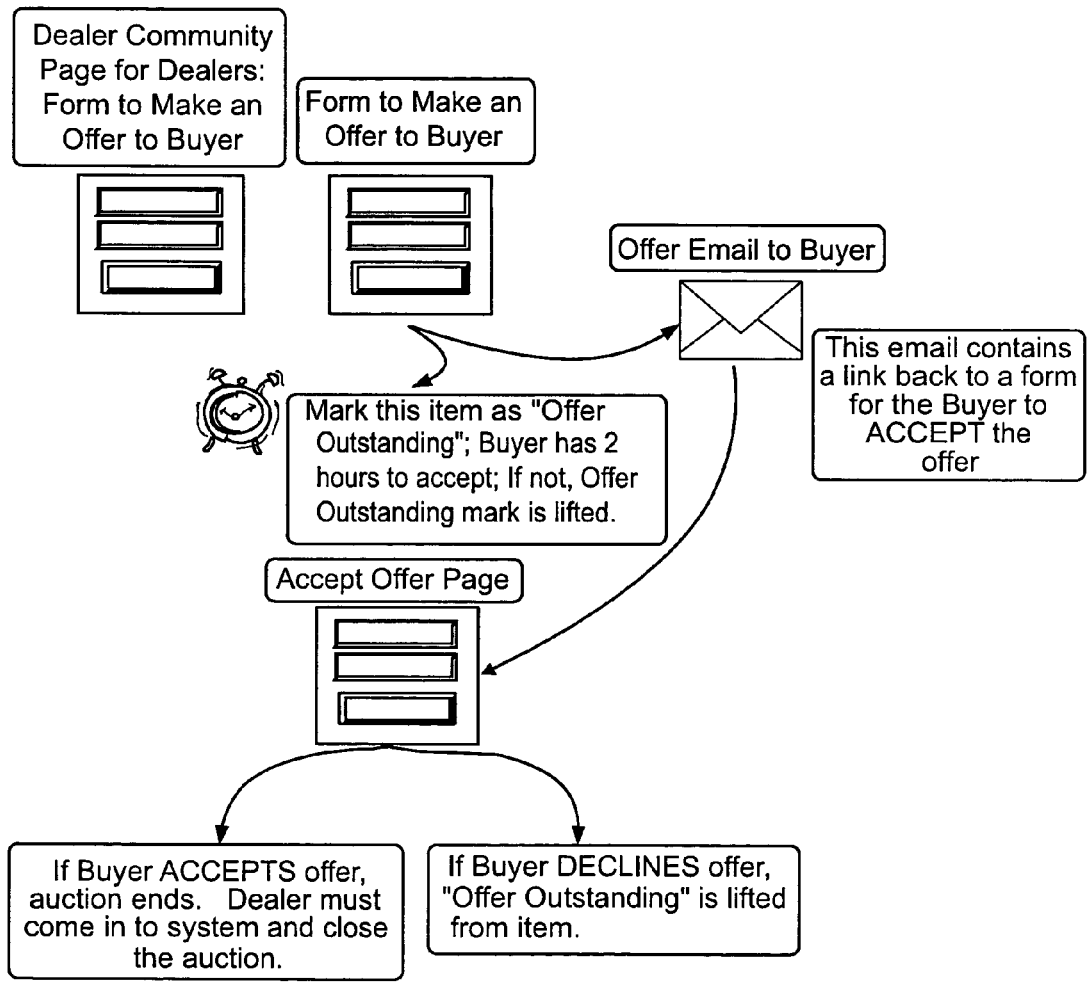
FIGS. 11B and 11C show example illustrative steps to make an offer outside of bidding.
Figure 11C:
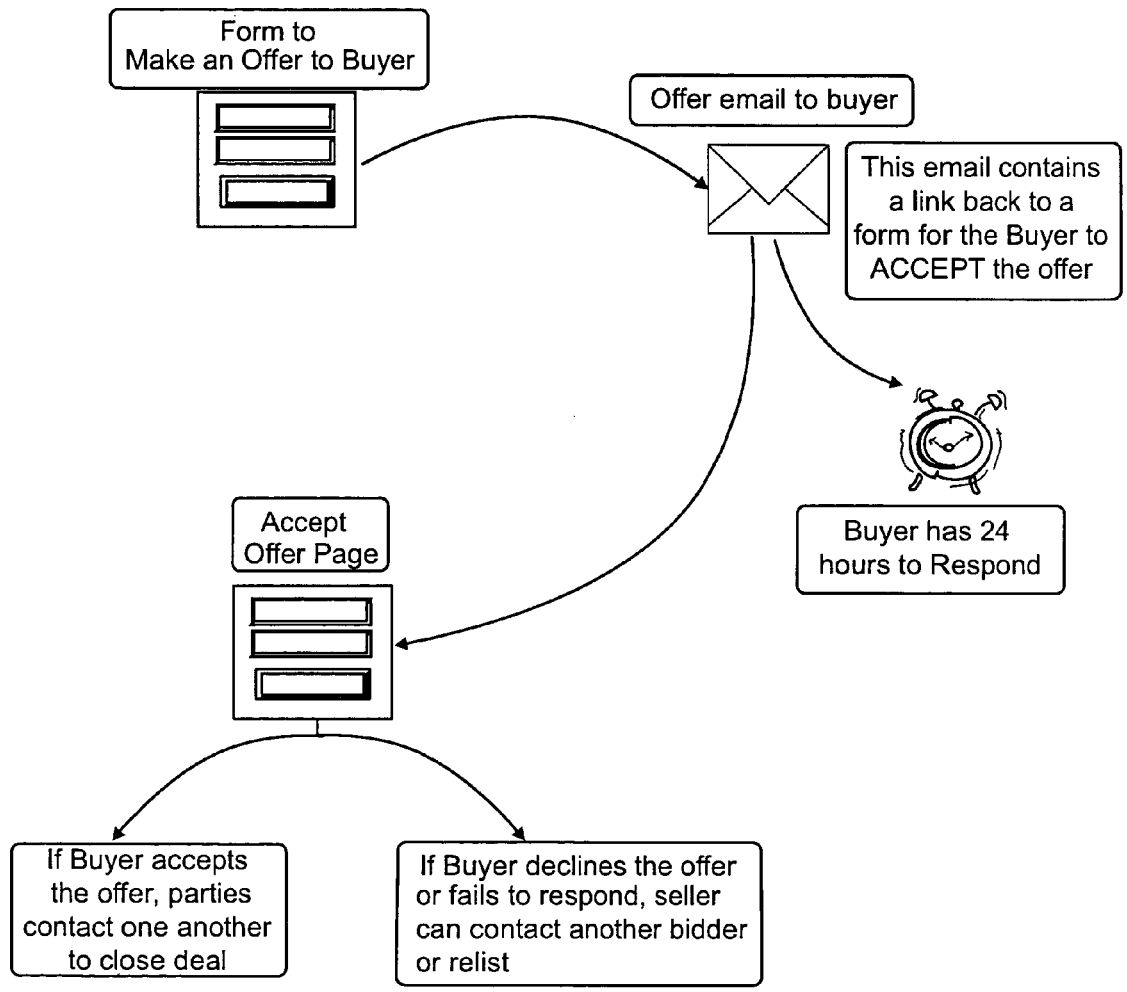
Figure 13B:

The exemplary FIG. 11C process is used after the end of an auction-style listing to allow the seller to extend an offer to any of the bidders. In this case, an e-mail was sent to the perspective buyer who needs to accept or decline it within a certain time period.

In one exemplary illustrative implementation, similar "offer to sell" functionality can also be invoked unilaterally at any time by the seller during or after an auction to offer to the current highest and/or other bidder(s) whether or not the highest bid satisfies the "closeness" threshold. See FIGS. 11B, 11C. Such "out of channel" transaction completions are encouraged since they may be more efficient than strict auction-style transaction completions in selling items.

Figure 18B:
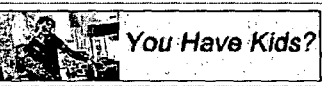

FIGS. 18A & 18B show exemplary screens allowing a seller to end an auction-style listing before the listing has been completed. These screens show that system 50 permits a seller to end an auction-style listing at any time for any of various reasons (e.g., already sold, decided not to sell, item is defective, etc.). The seller is also asked whether or not to cancel all bids—allowing the seller to cancel frivolous bids unilaterally. The FIG. 18A screen (which would be used by a dealer) provides additional options of allowing the seller to move the listing to a classified ad.

An additional interesting feature that may be useful in certain contexts is to allow the seller to manipulate the seller's "reserve" price (i.e., the minimum price the seller is willing to sell the item at) during bidding. For example, the seller might wish to lower his or her reserve price to below an already-existing top bid in order to drive a transaction. In such an instance, the system 50 can send an e-mail notification to the buyer saying in essence "the seller has lowered his reserve price to below your bid—do you still want the item or should be cancel your bid?" Such an e-mail or other notification is probably desirable since the bidder had previously received feedback from system 50 that his or her bid was still below the reserve price and may then have changed his or her plans and gone off to purchase or bid another similar item. In other exemplary arrangements, it may be desirable in certain contexts to allow a seller to raise his or her reserve price in order to obtain higher bids. For example, if bidding on an item is particularly active but the reserve price has not yet been met, the seller could take a change and increase the reserve price before any bidder has exceeded the reserve price in order to try and drive a higher final sales price. Many bidders assume that the seller's reserve price is a reasonable price for the item and may therefore be hesitant to bid much beyond the reserve price (except in the case of a bidding war). By notifying bidders in advance that the seller can manipulate reserve price information in the middle of an auction-style listing, the seller could be given additional flexibility in terms of changing the minimum price at which he or she will be obliged to sell the item.

Exemplary illustrative system 50 provides auction-style listing management tools 211 in addition to those described above. These tools 211 allow sellers and bidders to freely interact with one another and also provide additional functionality such as displaying historical information. See for example FIG. 1C ("my account" block 630, "my ratings" block 632, "cars I'm selling" block 624, "my settings" block 636, "my bids" block 638 including "cars I lost" block 642 and "cars I won" block 644, "my searches" block 640, and "cars I watch" block 642—all accessible in one example implementation from a "my page" block accessible through a sign-in block 606a).

Example Seller Rating Processing

In one exemplary illustrative arrangement, seller ratings allow users to learn about other users experiences with sellers. Ratings help prospective bidders decide whether to do business with a particular seller. The seller rating system also encourages seller and buyers to resolve any outstanding issues between the time the ratings are first submitted and the final posting. The seller rating system provides an incentive to sellers to operate with honesty, consideration and courtesy, and rewards them for doing so. In the exemplary implementation, any winning bidder—including "purchase now" bidders can write sellers based on their experiences. Not all winning bidders will complete all sales they bid on in the exemplary arrangement (e.g. some bids are conditional), but they may, nevertheless, submit seller ratings in the exemplary implementation. System 50 prompts winning bidders to post feedback within a certain time period after they have won a listing. To rate sellers, winning bidders may answer three simple questions described above. Winning bidders may also leave comments about their experiences with sellers. When a rating is posted, the system alerts the seller to review their rating. Seller ratings are, at this stage, visible only to the winning bidder and the seller. Ratings are editable within a certain amount of time period. During this time, sellers and winning bidders should work together to remove outstanding reasons for any unsatisfactory rating. After that certain time period has expired, the seller rating is published and added to the seller's profile. The seller rating is now viewable by all users of system 50. Once published, neither the poster nor the seller can change seller ratings in the exemplary embodiment. If the seller is content with the winning bidder's feedback, they may post it immediately rather than waiting the predetermined time period.

The average person only purchases a high-ticket item such as a house or motor vehicle relatively infrequently. In one exemplary embodiment, system 50 does not necessarily provide any feedback ratings on buyers (although they may be removed or suspended as discussed above). However, seller feedback may be used as driven by buyers' experiences with that seller in online transactions. Sellers may be given an incentive to receive positive feedback from buyers using the auction-style listings. In cases of negative feedback, sellers may be given opportunity to work the issue out with the user who has posted the negative feedback before the negative feedback is actually made public. In one exemplary arrangement, the buyer has the ability to express degrees of satisfaction with the transaction overall and the components of the dealer's handling of the transaction (e.g., responsiveness, price, accuracy, etc.). A feedback system consisting of a single "yes or no" recommendation may be insufficient for these types of needs.

In the exemplary arrangement, ratings are not instantly applied to a seller's rating. Instead, all feedback relating to a particular seller may be available for review by that seller for a certain amount of time (e.g., a week). The seller may receive email notification when new feedback is posted to maximize his or her time to review the rating. The seller may then have the option of allowing the feedback to be immediately posted in his or her permanent record, or to work with the buyer to satisfy any concerns. During the review time, the buyer will have the opportunity to alter his or her feedback. If the buyer does not alter his or her feedback in one exemplary arrangement, it is applied to the seller's rating history after the predetermined time period has expired. The seller may also have the opportunity to comment in response to any individual rating. Buyer attempts to blackmail a seller using feedback may be discouraged or prevented using various mechanisms.

Sellers who build up substantial negative feedback over the course of several listings may be contacted and issued warnings. Continually negative feedback may be cause for removal of the dealer's access to the product. Bidders will see seller's feedback ratings in full detail when they click on the seller's feedback rating on a listing. Sellers whose ratings reaching a certain point may be granted "trusted seller" status for display on all their listings. Such "trusted seller" thresholds may be accompanied by lower listing fees, special customer service treatment and/or other perks.

Figure 19:
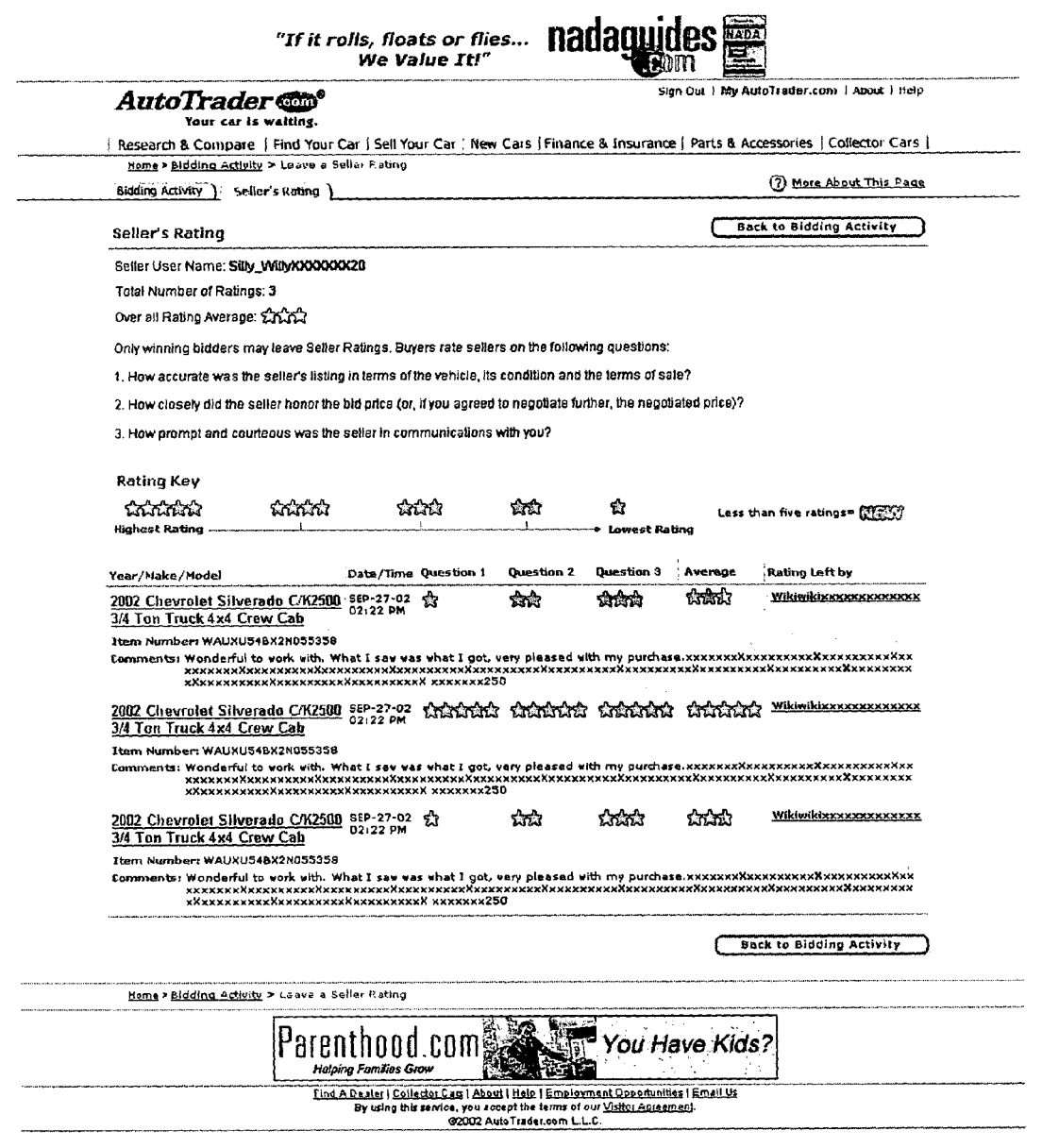
Figure 19A:
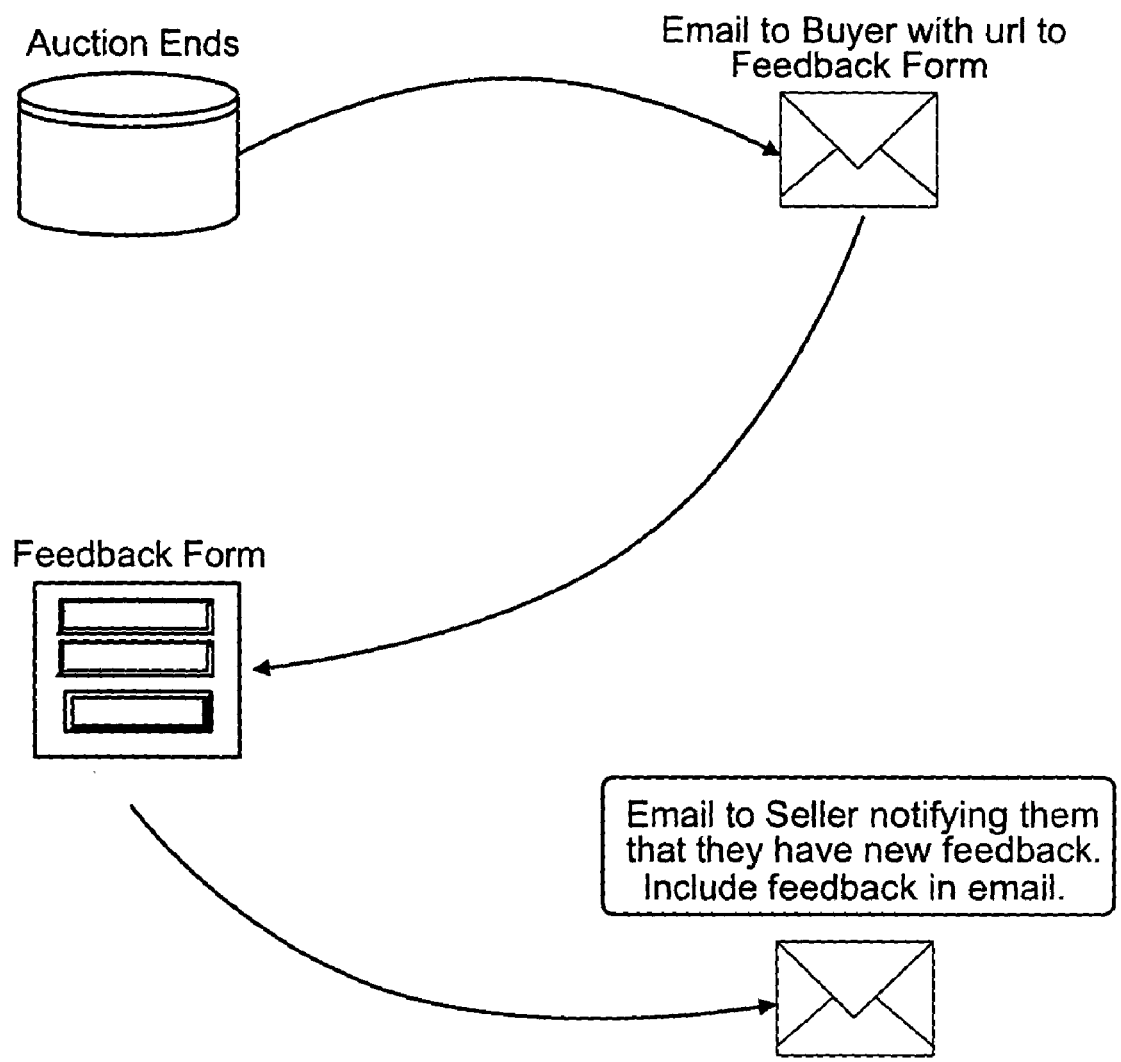
FIG. 19A shows an example "rate a seller" functionality at listing close.

FIG. 19 shows an example display of ratings associated with a seller and FIG. 19A shows an exemplary flowchart. As the flowchart shows, system 50 sends, in close to real-time, the winning bidder a URL to a feedback form for the bidder to complete. In one exemplary implementation, system 50 asks bidders to rate sellers based on bidder's answers to the following three questions:

1. How accurate was the seller's listing?
2. How closely did the seller honor the bid price?
3. How prompt and courteous was the seller in communicating with the buyer?

Figure 20:
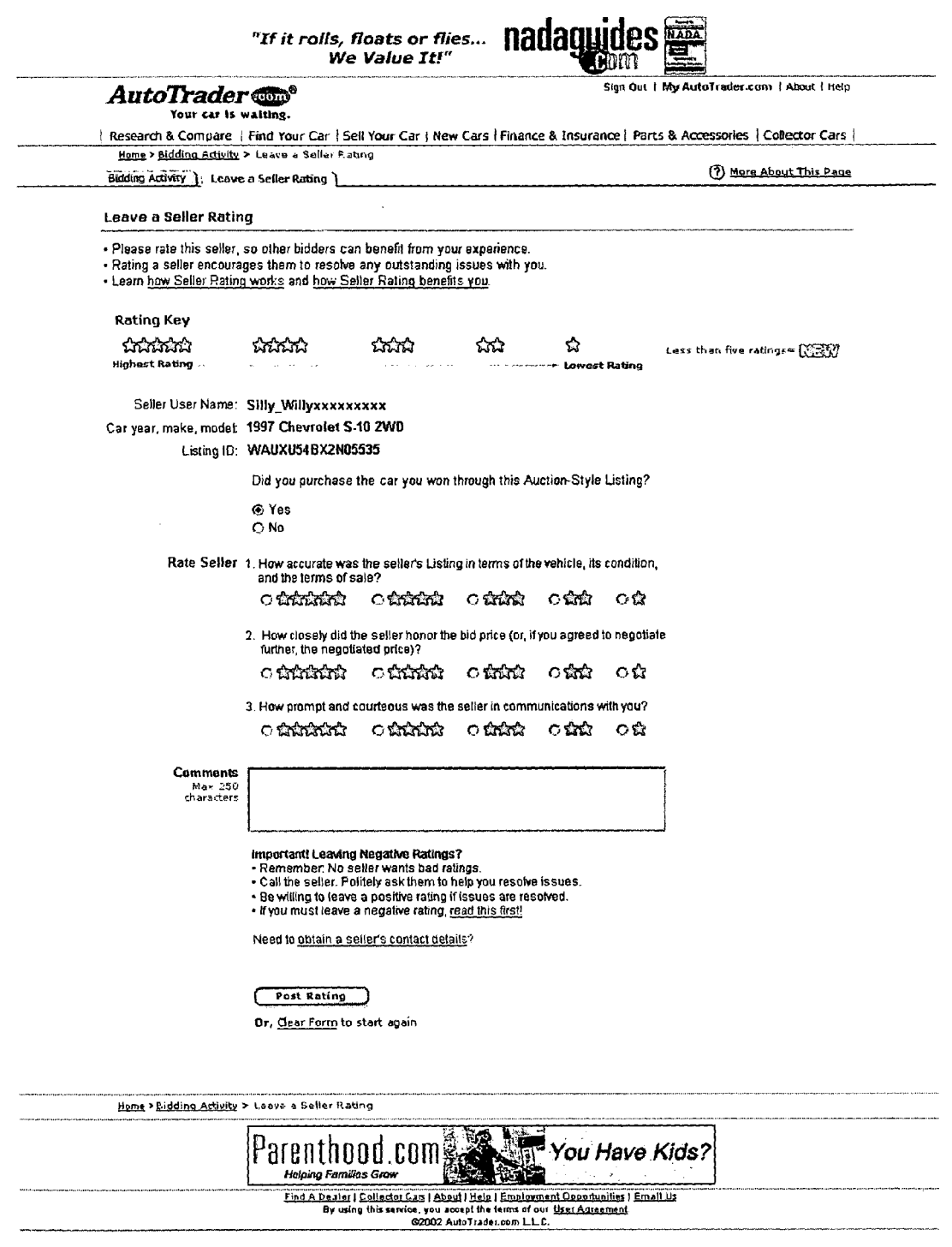
Figure 21:

FIGS. 20 & 21 show an example screen that a buyer can use to edit a seller's rating by answering the three questions (FIG. 19A blocks 490, 492). In the exemplary embodiment, the average of these three ratings is calculated to determine a rating value. The seller's overall rating is calculated, for example, as the average of all submitted ratings. Buyers can also display seller history and other items the seller is currently selling (FIG. 1C, blocks 626, 628).

Figure 24:
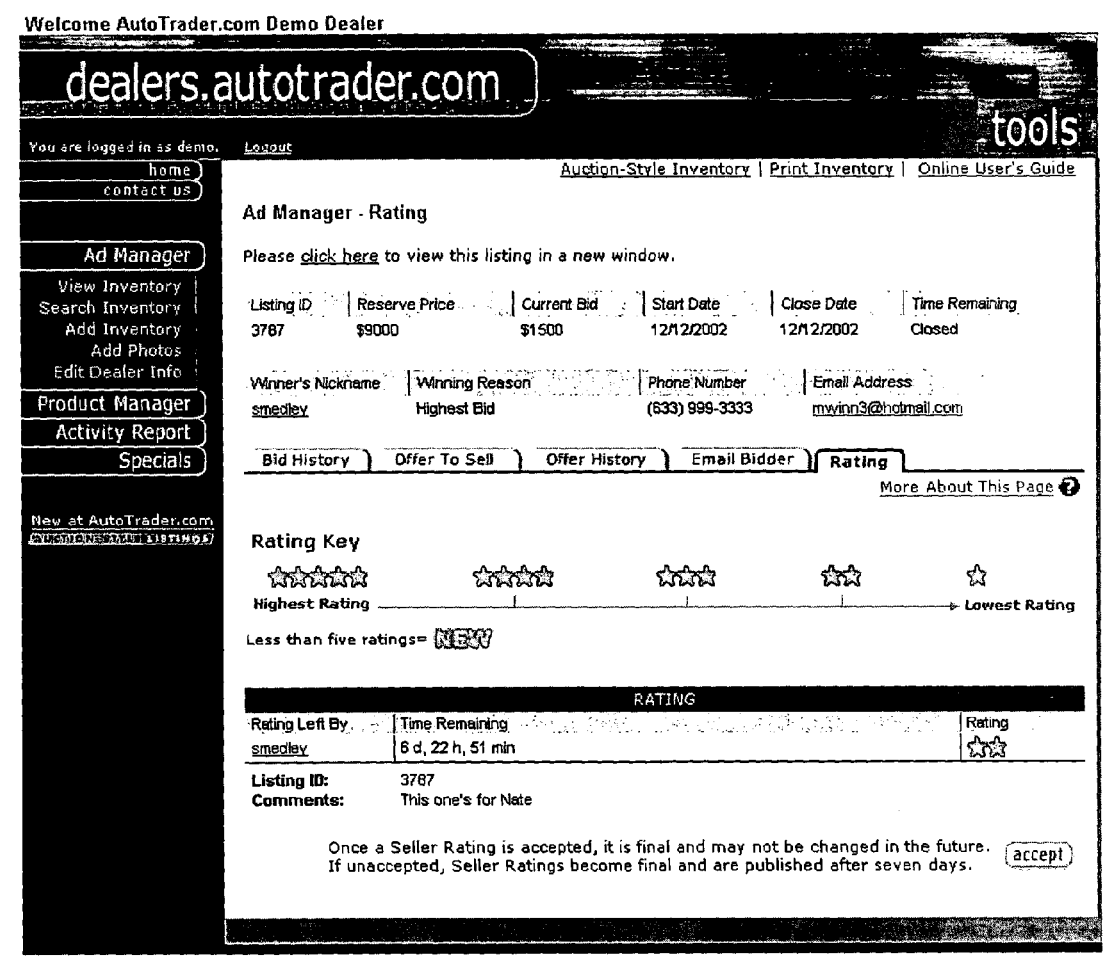
Figure 25:
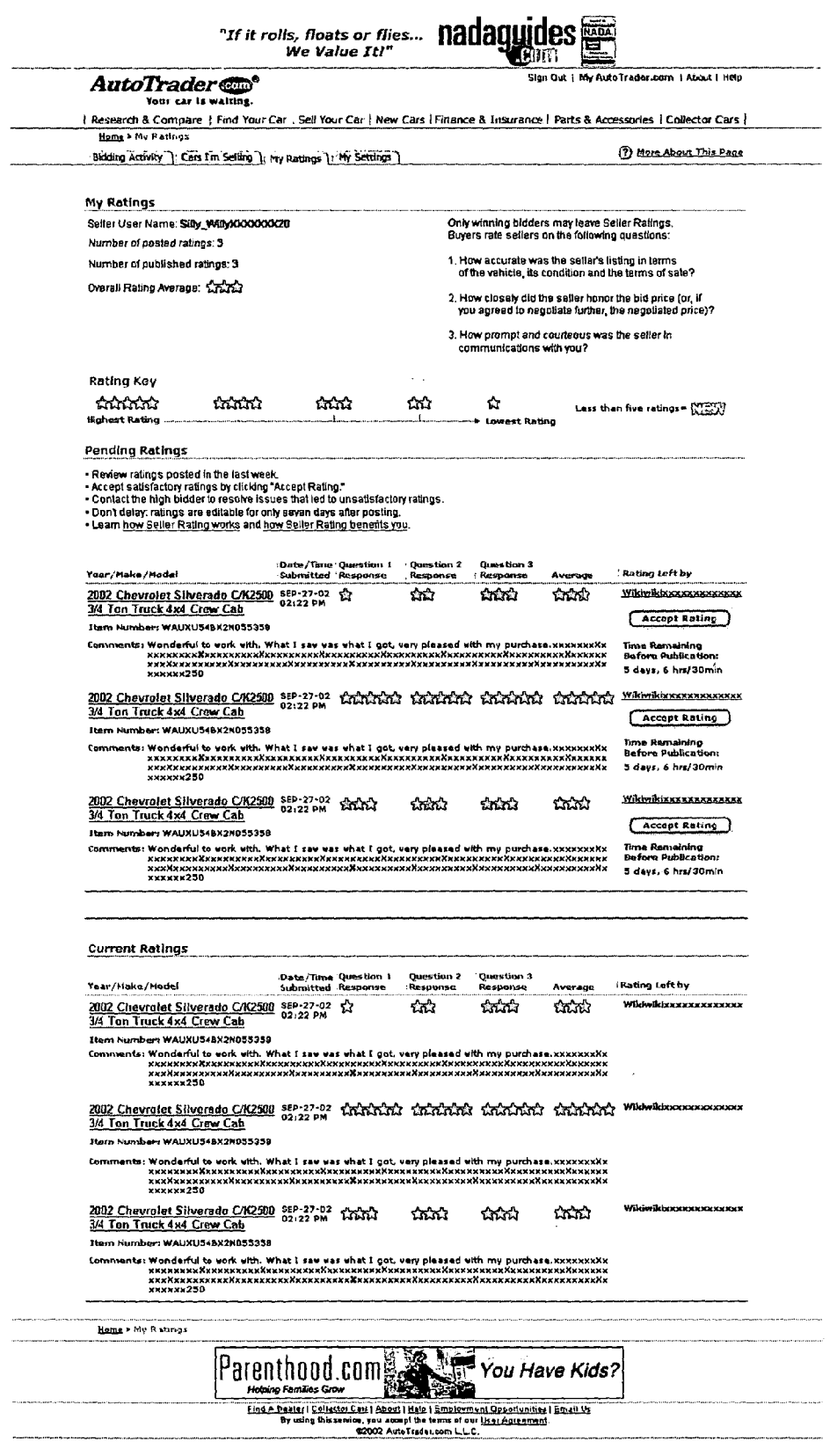

FIG. 22 shows an example notification that system 50 generates and sends to a seller who has been rated by a buyer (see also FIG. 19A block 494). Upon receiving such a notification, the seller can cause system 50 to display the "my ratings" screen shown in FIGS. 23, 24 and 25. These screens show ratings that have been submitted by a buyer but which have not yet been posted for other potential buyers to view. In one example non-limiting implementation, the seller has a predetermined time period (e.g., 7 days) to rectify problems with buyers and try to convince buyers to change negative ratings they submitted. If negative ratings are not rectified with the time period, they are published for any user of system 50 to view. FIG. 24 shows an exemplary further screen that allows sellers to "accept" ratings before the time period has expired so they can be published sooner.

Figure 1C:
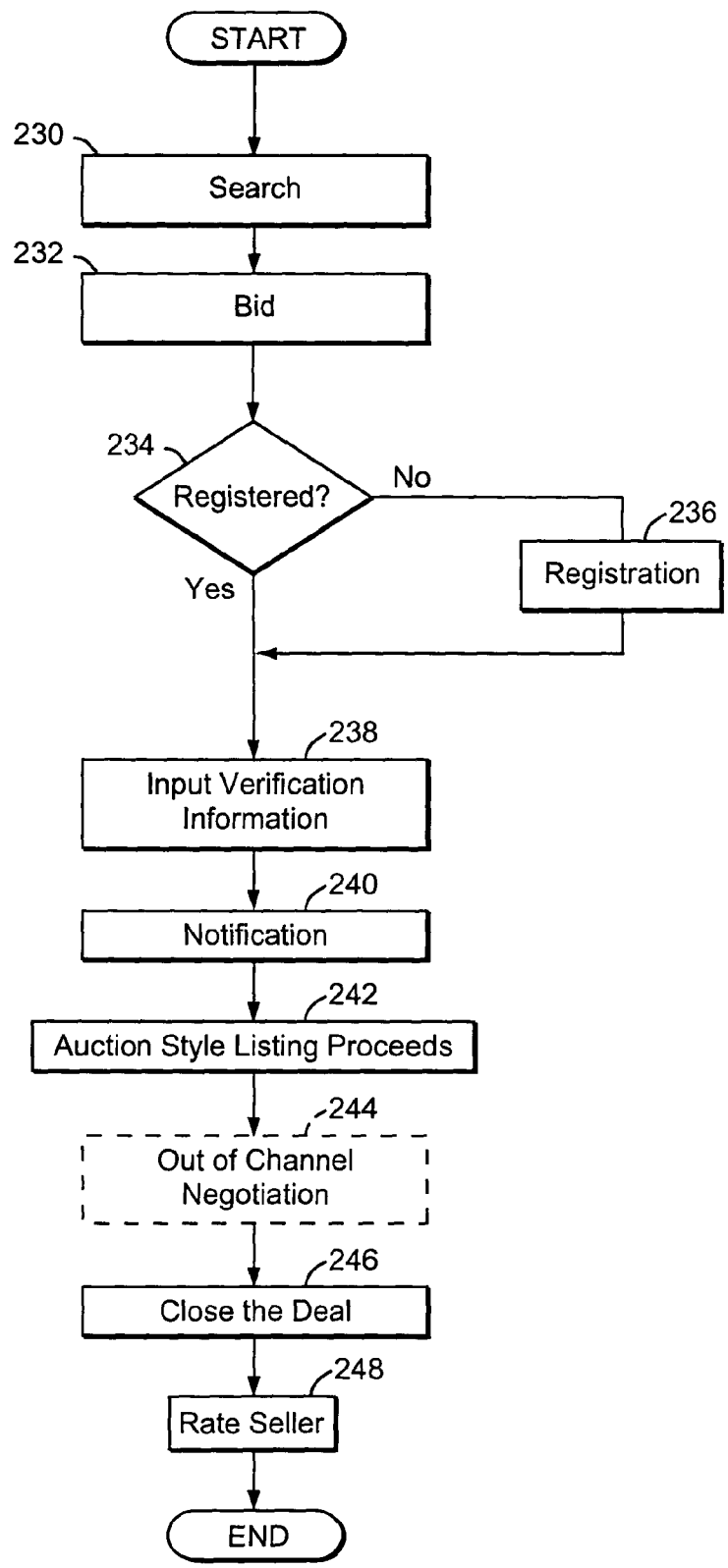
FIG. 1C shows example illustrative "submit a bid" functionality.

Any user 90 of system 50 can display the ratings associated with any seller to determine, based on past experience that other buyers have had with the seller, whether the seller is trustworthy (see also FIG. 1C block 624).

Example Third Party Service Offerings

Third party services may be used to augment the auction-style listing services. Such third party services may include for example:
  item identification tracking (e.g., vehicle identification number decoding/new car data provisioning for motor vehicles);
  history reports;
  price estimation;
  service contract cost estimation and/or bundled warranty;
  item inspection service;
  shipping providers with online cost estimator function;
  insurance cost estimate;
  escrow;
  transaction insurance;
  third party mediation services;
  identity verification services;
  online payment provider;
  other.

Example Reporting

Reporting may be provided to dealers including for example:
  number of items listed each week or other time period;
  number of items "sold online" each week or other time period;
  number of items reported sold online each week or other time period;
  number of relistings;
  number moved to classified listings at auction end;
  number removed from inventory at auction end;
  number of active current and new dealers;
  identification information of items listed;
  pricing data on dealer's listings including for example minimum sell price, buy now price, high bid price;
  bidding activity by listing (e.g., number of bids, number of unique bids, locality of bids (e.g., track by bidder zip code/city);
  feedback sessions initiated;
  feedback sessions completed;
  current feedback rating by seller;
  billing summaries for auction product by dealer;
  other.

Such reports may be summarized by a variety of methods e.g., sales representative, district, or region or in their entirety. For sale by owner reports may be generated similar to those listed above. It may be desirable to provide an ability to "snapshot" product activity (e.g., current count of items up for auction, sold items, month to date, etc.). It may also be desirable to collect consumer use data such as for example number of clicks/uniques to auction listings, number of leads generated, number of leads driven to other products, number of service partner session/uniques, etc.

Example Illustrative Non-Limiting Architecture

Figure 26:
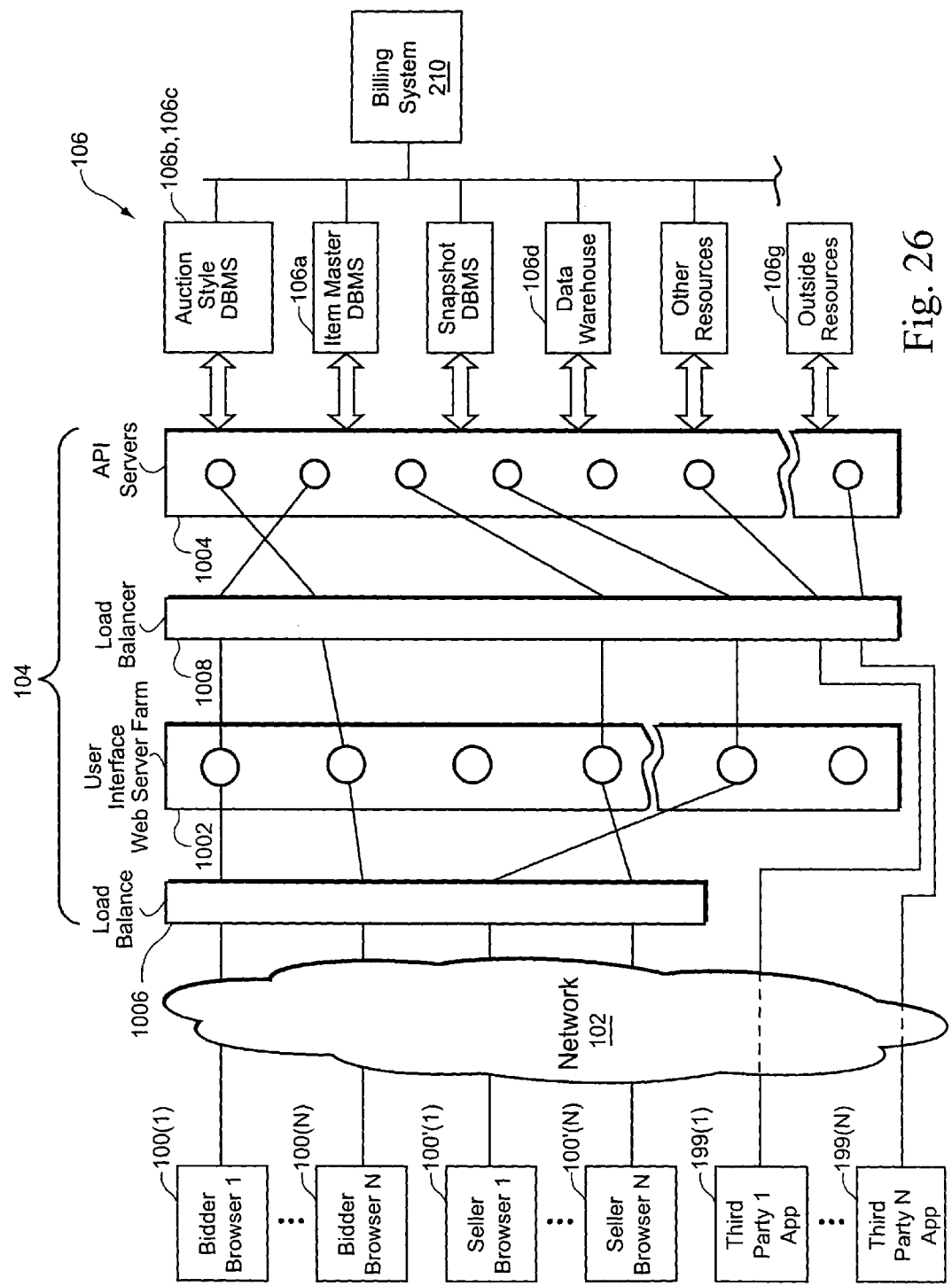
FIG. 26 shows an example more detailed system architecture.

FIG. 26 shows one example illustrative non-limiting implementation of system 50. In the example shown, online transaction servers 104 comprise the user interface web server array or "farm" 1002 and an array of API (application program interface) servers 1004. The pages described above are generated by user interface web servers 1002 in response to incoming http requests from bidder and seller web browsers 100. A load balancer 1006 routes incoming requests to available web servers 1002 in a way that distributes a load and provides a degree of fault-tolerance. In the example arrangement, web servers 1002 are "sticky" in a sense that cookies and other persistency mechanisms are used to route all requests from a given web browser back to the same web server to achieve consistency and efficiency. User interface web servers 1002 also provide templating languages and http support.

Web servers 1002 in the illustrative non-limiting examples may require information from databases 106 (e.g. auction-style information, item information, etc.) to generate and populate web pages for use by user browsers 100. In the example illustrative arrangement, these user interface web servers 1002 generate API calls requesting web and other service functions (e.g., information about groups of items and/or users, searches, certain calculations such as start, end and expiration times for listings, seller history based on ID, etc.). Any of a variety of different calling mechanisms (e.g., single object access protocol "SOAP", XML, RMI, HTTP "get post", or other transmission protocols) can be selected based on performance optimizations or for other reasons. User interface web servers 1002 provide these API calls to API servers 1004 via a load balancer 1008. Load balancer 1008 in the example illustrative arrangement provides "round robin" routing of API calls to API servers 1004 to evenly distribute loading and achieve speed performance and fault tolerance. API servers 1004 may be, if desired, separated into different categories (e.g., one set of API servers for the user community, another set for the dealer community) so that speed performance is maintained under unequal loading conditions. API servers 1004 communicate with resources at the "back end" (on the right hand side of FIG. 26) to satisfy the API requests from user interface web servers 1002 and respond to the API calls with the requested information (or with error messages if the requested information is not available).

In the example embodiment, "back end" consists of database management systems including for example an auction style GBMS 106b, 106c that stores auction-style listing related information (e.g., registered user information, seller ratings, scheduling and expiration, bidding amounts, etc.); an item master DBMS 106a that stores item related information (e.g., in one exemplary illustrative arrangement for both classified and auction-style listed items); a snapshot DBMS 106x which in the exemplary arrangement replicates the item master DBMS 106a; a data warehouse 106e, and other resources 106f. A single API call from user interface web servers 1002 can cause an API server 1004 to generate multiple SQL or other database calls to database system 106, gathers the various information and packaging in an appropriate form for applying to the user interface API call. One exemplary arrangement, API servers 1004 may be able to access outside resources 106g to any desired path (e.g. via network 102) to satisfy requests.

In one example arrangement, third party applications 199 may be able to access API servers 1004 directly to provide various services including for example listing design, value-added user services, etc. API servers 1004 can provide translation services if necessary to provide compatibility with third party applications.

The example arrangement, the API servers 1004 are built around real time operations so that most things happen immediately. JMS (part of the Java 2 Enterprise Edition) can be used to provide real time request queuing and response. In the example embodiment, messaging is implemented as a background process but is performed in close to real time as opposed to in a batch mode for example. Thus, generation of e-mails and other messaging happens substantially in real time with when the associated API call is made. System 50 performs some routine housekeeping operations on a non-real time scheduled basis (e.g., cleaning up data that has not been touched for a while, issuing acceptance from minors to dealers that they have received feedback and that the deadline for response/posting is coming up, etc.) but in the exemplary illustrative arrangement most events happen in real time or close to real time. Component reusability is used as much as possible for ease of design and flexibility, and extensive performance tuning and configuration is used to provide quick real time scalable responsivity under variable loading conditions.

While the illustrative exemplary technology described herein has been described in connection with what is presently considered to be the most practical and preferred embodiment, it is to be understood that the illustrative exemplary technology described herein is not to be limited to the disclosed embodiment. For example, while the preferred embodiment has been described in connection with an illustrative system for selling "big ticket" items such as motor vehicles, the techniques herein could be used for online auctions, offerings and listings for any type of goods or services of any value. While the preferred embodiment has been described in connection with an exemplary web-based system using Internet connectivity, any other type of connectivity and display technology could be used instead. The illustrative exemplary technology described herein is intended to cover various modifications and equivalent arrangements included within the scope of the claims.

We claim:

1. In an online network-connected computer system of the type that receives requests transmitted over a network from users and responds by providing responsive data over said network for display by said requesting users, a method of performing computer based processes to process online auction-style listings and provide associated responsive data for display, said method comprising:
    recording a predetermined listing end time for an auction style listing stored in a computer memory;
    receiving, from users over the network, bids with respect to said auction-style listing; and
    in response to a determination that the highest bid is less than a reserve price and the reserve price and the highest bid are close within a threshold, prompting at least a seller to issue a direct offer to a user with a highest bid before a listing expiration without revealing the highest bid value to the seller; and
    prompting the seller to issue direct offers to sell to any bidders after a listing expiration.

2. The online network-connected computer system of claim 1, wherein the method further comprises automatically suspending the auction style listing for a predetermined time when the seller issues the direct offer to sell to the user with the highest bid.

3. The online network-connected computer system of claim 2, wherein the method further comprises resuming the auction style listing when the user with the highest bid rejects the seller's direct offer to sell.

4. The online network-connected computer system of claim 2, wherein the auction style listing includes a notice that there is an outstanding offer when the auction is suspended.

5. The online network-connected computer system of claim 1, wherein the auction style listing automatically ends when the seller's direct offer to sell to the user with the highest bid is accepted.

6. The online network-connected computer system of claim 2, wherein the auction style listing resumes when a predetermined amount of time elapses after the seller makes the direct offer to sell to the user with the highest bid.

7. In an online network-connected computer system of the type that receives requests transmitted over a network from users and responds by providing data over said network for display by said requesting users, a method of performing computer based processes to provide data over the network relating to online auction-style listings, the method comprising:
    maintaining a database of items available for auction-style listing;
    receiving requests allowing sellers to specify whether items are to be listed in said database as conditional or binding transactions;
    in response to user requests received over the network, generating and sending data over the network representing displays of (a) the conditional or binding characteristic of an item listing, and (b) at least some other information relating to the item; and
    receiving, from users over the network, bids with respect to said auction-style listing; and
    in response to a determination that the highest bid is less than a reserve price and the reserve price and the highest bid are close within a threshold, prompting at least a seller to issue a direct offer to a user with a highest bid before a listing expiration without revealing the highest bid value to the seller; and prompting the seller to issue direct offers to sell to any bidders after a listing expiration.

8. The online network-connected computer system of claim 7, wherein the method further comprises automatically suspending the auction style listing for a predetermined time when the seller issues the direct offer to sell to the user with the highest bid.

9. The online network-connected computer system of claim 8, wherein the method further comprises resuming the auction style listing when the user with the highest bid rejects the seller's direct offer to sell.

10. The online network-connected computer system of claim 8, wherein the auction style listing includes a notice that there is an outstanding offer when the auction is suspended.

11. The online network-connected computer system of claim 7, wherein the auction style listing automatically ends when the seller's direct offer to sell to the user with the highest bid is accepted.

12. The online network-connected computer system of claim 8, wherein the auction style listing resumes when a predetermined amount of time elapses after the seller makes the direct offer to sell to the user with the highest bid.

13. In an online network-connected computer system of the type that receives requests transmitted over a network from users and responds by providing at least data over said network for display by said requesting users, a method of providing online listings comprising:

maintaining at least one database of items listed for sale;

sending, over the network, data representing a user interface display of at least some of said items in a classified advertising listing format;

sending, over the network, data representing a user interface display of at least others of said items in an auction-style listing format;

prompting sellers, through automatic interaction with the computer system, to select item listings and flexibly change selected item listings between said classified advertising and said auction-style listing formats; and receiving, from users over the network, bids with respect to said auction-style listing; and sending data over the network encouraging a seller to issue a direct offer to sell to the user with the highest bid before a listing expiration when the highest bid is less than a reserve price and the reserve price and the highest bid are close within a threshold without revealing the highest bid value to the seller.

14. The online network-connected computer system of claim 13, wherein the method further comprises automatically suspending the auction style listing for a predetermined time when the seller issues the direct offer to sell to the user with the highest bid.

15. The online network-connected computer system of claim 14, wherein the method further comprises resuming the auction style listing when the user with the highest bid rejects the seller's direct offer to sell.

16. The online network-connected computer system of claim 14, wherein the auction style listing includes a notice that there is an outstanding offer when the auction is suspended.

17. The online network-connected computer system of claim 13, wherein the auction style listing automatically ends when the seller's direct offer to sell to the user with the highest bid is accepted.

18. The online network-connected computer system of claim 14, wherein the auction style listing resumes when a predetermined amount of time elapses after the seller makes the direct offer to sell to the user with the highest bid.

* * * * *